US012769226B2

(12) United States Patent
Kawasumi et al.

(10) Patent No.: US 12,769,226 B2
(45) Date of Patent: Oct. 20, 2026

(54) IMAGE FORMING APPARATUS INCLUDING RETRACTABLE EXPOSURE PORTION AND RETRACTABLE DEVELOPING UNIT

(71) Applicant: CANON KABUSHIKI KAISHA, Tokyo (JP)

(72) Inventors: Ryoichi Kawasumi, Ibaraki (JP); Takehiro Ishidate, Tokyo (JP); Hiroki Takano, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/934,593

(22) Filed: Nov. 1, 2024

(65) Prior Publication Data

US 2025/0060688 A1 Feb. 20, 2025

Related U.S. Application Data

(63) Continuation of application No. 18/175,888, filed on Feb. 28, 2023, now Pat. No. 12,164,240.

(30) Foreign Application Priority Data

Mar. 10, 2022 (JP) ................................ 2022-037625

(51) Int. Cl.
*G03G 15/04* (2006.01)
*B41J 2/00* (2006.01)
(Continued)

(52) U.S. Cl.
CPC .......... *G03G 15/04054* (2013.01); *B41J 2/45* (2013.01); *G03G 21/1633* (2013.01);
(Continued)

(58) Field of Classification Search
CPC ............ G03G 15/011; G03G 15/0178; G03G 15/04054; G03G 15/04063;
(Continued)

(56) References Cited

U.S. PATENT DOCUMENTS

2009/0190953 A1 7/2009 Okabe
2010/0020301 A1 1/2010 Sugiyama et al.
(Continued)

FOREIGN PATENT DOCUMENTS

EP 1879083 A1 1/2008
EP 3862816 A1 8/2021
(Continued)

OTHER PUBLICATIONS

Extended European Search Report issued in European Appln. No. 23159016.7, mailed Jul. 19, 2023.
(Continued)

*Primary Examiner* — Robert B Beatty
(74) *Attorney, Agent, or Firm* — ROSSI, KIMMS & McDOWELL LLP

(57) ABSTRACT

An image forming apparatus includes: a photoconductor that rotates about a first axis; an exposure portion that includes a substrate that includes a plurality of light emitting portions for exposing a surface of the photoconductor, and a support portion for supporting the substrate, and that moves between an exposure position where the photoconductor is exposed and a retracted position where the photoconductor is retracted from the exposure position; and a rotational member that has a second axis along the first axis, and that moves the exposure portion between the retracted position and the exposure position by rotation about the second axis. A developing unit moves between a developing position and a separated position in response to a door opening.

6 Claims, 69 Drawing Sheets

(51) Int. Cl.

| | |
|---|---|
| ***B41J 2/45*** | (2006.01) |
| ***G03G 21/16*** | (2006.01) |
| ***G06K 15/00*** | (2006.01) |
| ***G06K 15/12*** | (2006.01) |
| *G03G 15/08* | (2006.01) |

(52) U.S. Cl.

CPC ..... *G06K 15/1247* (2013.01); *G03G 15/0872* (2013.01); *G03G 21/1676* (2013.01); *G03G 2215/0407* (2013.01)

(58) Field of Classification Search

CPC ............. G03G 21/1666; G03G 21/206; G03G 2215/0119; G03G 2215/0125; G03G 2215/0407; G03G 2215/0409; G03G 2215/0412; G03G 2215/0451; G03G 2215/0453; G03G 2215/0456; G03G 2221/1636; G03G 2221/1645; G06K 15/1247; G06K 15/1261; B41J 2/447; B41J 2/4473; B41J 2/45; B41J 29/377

USPC ........... 399/92, 118, 220; 347/117, 118, 129, 347/130, 152, 238, 242, 256, 257

See application file for complete search history.

(56) References Cited

U.S. PATENT DOCUMENTS

| | | | | |
|---|---|---|---|---|
| 2013/0016992 | A1 | 1/2013 | Watanabe | |
| 2013/0142538 | A1 | 6/2013 | Miwa et al. | |
| 2015/0293494 | A1 | 10/2015 | Tanaka | |
| 2015/0370219 | A1* | 12/2015 | Ogino | G03G 21/1676 399/110 |
| 2016/0070230 | A1 | 3/2016 | Kokubu et al. | |
| 2016/0209804 | A1* | 7/2016 | Katsumata | G03G 21/185 |
| 2017/0371292 | A1 | 12/2017 | Narita et al. | |
| 2018/0095406 | A1* | 4/2018 | Sato | G03G 21/1633 |
| 2018/0101131 | A1 | 4/2018 | Hosoi et al. | |
| 2019/0107807 | A1 | 4/2019 | Kamano et al. | |
| 2020/0012229 | A1* | 1/2020 | Zensai | G03G 15/0865 |
| 2020/0174420 | A1 | 6/2020 | Tamura et al. | |
| 2021/0302865 | A1 | 9/2021 | Kasuya et al. | |

FOREIGN PATENT DOCUMENTS

| | | | |
|---|---|---|---|
| JP | 2007140349 | A | 6/2007 |
| JP | 2009122391 | A | 6/2009 |
| JP | 2012068568 | A | 4/2012 |
| JP | 2015013377 | A | 1/2015 |
| JP | 2018001752 | A | 1/2018 |
| JP | 2018060091 | A | 4/2018 |

OTHER PUBLICATIONS

Extended European Search Report issued in European Appln. No. 24157522.4, mailed Jun. 20, 2024.

Office Action issued in U.S. Appl. No. 18/175,888, mailed Dec. 20, 2023.

Office Action issued in U.S. Appl. No. 18/175,888, mailed May 7, 2024.

Notice of Allowance issued in U.S. Appl. No. 18/175,888, mailed Aug. 21, 2024.

Communication pursuant to Article 94(3) EPC issued in European Appln. No. 23159016.7 mailed Sep. 30, 2025.

Office Action issued in European Appln. No. 24157522.4 mailed on Mar. 11, 2026.

Office Action issued in Chinese Appln. No. 202310213236.2 mailed Apr. 21, 2026.

* cited by examiner

X-X

X-X

Y-Y

Y-Y

Y3-Y3

LEFT SIDE IN FIG. 37

RIGHT SIDE IN FIG. 37

LEFT SIDE IN FIG. 40

RIGHT SIDE IN FIG. 40

IMAGE FORMING APPARATUS INCLUDING RETRACTABLE EXPOSURE PORTION AND RETRACTABLE DEVELOPING UNIT

BACKGROUND OF THE INVENTION

Field of the Invention

The present invention relates to an image forming apparatus including an exposure head that exposes a photoconductor.

Description of the Related Art

Conventionally, as techniques related to an exposure head used in an electrophotographic system image forming apparatus, techniques described in Japanese Patent Application Laid-Open No. 2007-140349 are known.

An exposure head described in Japanese Patent Application Laid-Open No. 2007-140349 includes a substrate in which a plurality of light emitting elements is aligned along the axial direction of a photoconductor, and a lens that condenses light emitted from the plurality of light emitting elements, and the light emitted from the plurality of light emitting elements is condensed through the lens to expose a photosensitive drum.

Therefore, the exposure head described in Japanese Patent Application Laid-Open No. 2007-140349 is disposed close to the photoconductor together with a developing device that develops a latent image formed on the photoconductor with toner. Therefore, the exposure head is disposed close to the developing device.

The exposure head includes a light emitting diode (LED) as a light emitting element. Alternatively, organic electro luminescence (EL) may be included as light emitting elements. The organic EL may be referred to as an organic light emitting diode (OLED).

Generally, since the photosensitive drum is a consumable, it is necessary to periodically replace the photosensitive drum. However, since the above-described exposure head is disposed close to the photoconductor, when the operator removes the photosensitive drum to replace the photosensitive drum, the photosensitive drum and the exposure head come into contact with each other, and there is a risk that a surface of the exposure head or the photosensitive drum is damaged.

In view of the above problems, an object of the present invention is to reduce a risk that a photosensitive drum and an exposure head come into contact with each other when the photosensitive drum is removed from the image forming apparatus.

SUMMARY OF THE INVENTION

An image forming apparatus according to the present invention includes: a photoconductor that rotates about a first axis; an exposure portion that includes a substrate including a plurality of light emitting portions for exposing a surface of the photoconductor, and a support portion for supporting the substrate, and that moves between an exposure position where the photoconductor is exposed and a retracted position where the photoconductor is retracted from the exposure position; and a rotational member that has a second axis along the first axis, and that moves the exposure portion between the retracted position and the exposure position by rotation about the second axis.

Further features of the present invention will become apparent from the following description of exemplary embodiments with reference to the attached drawings.

DESCRIPTION OF THE EMBODIMENTS

Hereinafter, embodiments of the present invention will be described with reference to the drawings. The dimensions, materials, shapes, relative arrangements, and the like of the components described below are not intended to limit the scope of the present invention only thereto, unless otherwise specified.

(Image Forming Apparatus)

Figure 1:
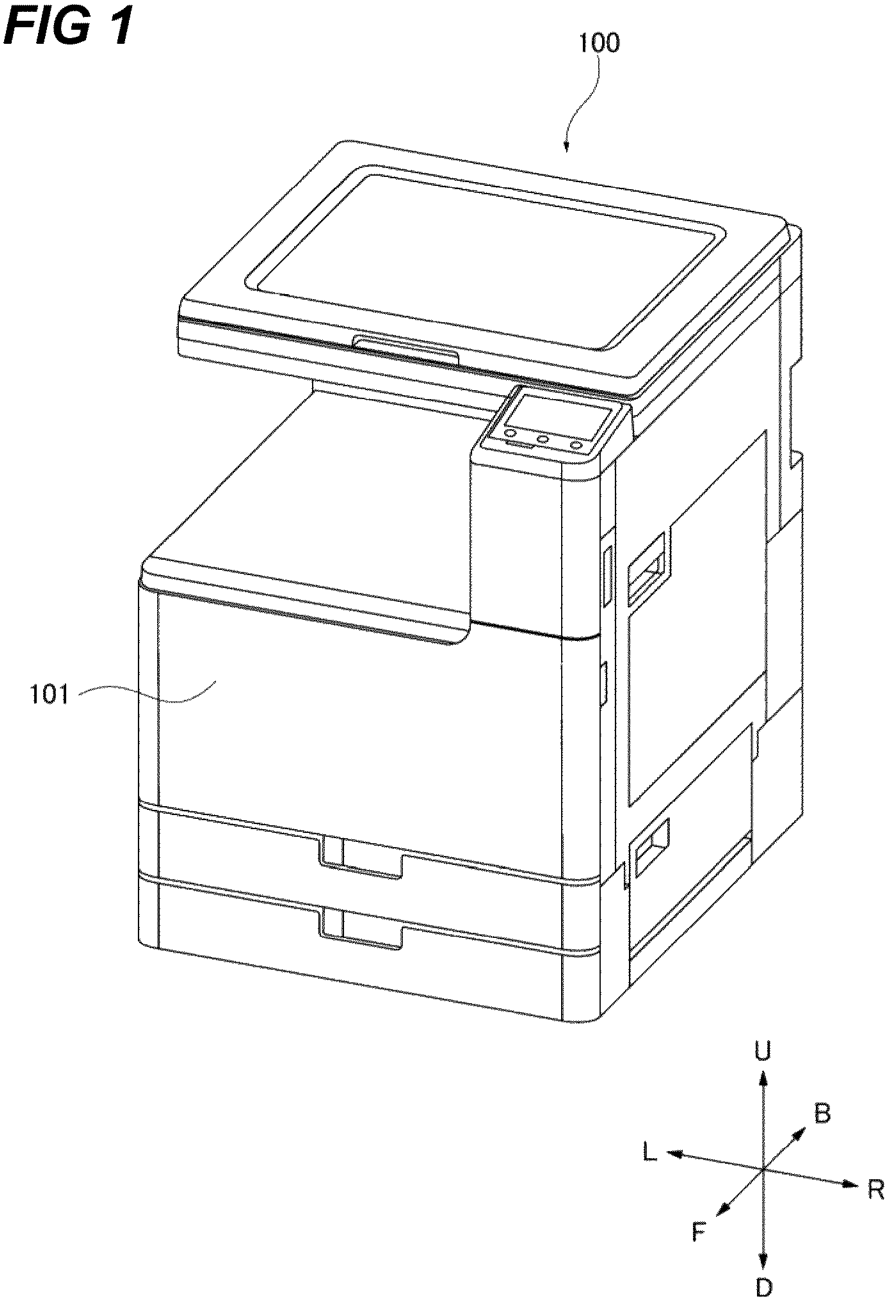
FIG. 1 is a perspective view of an image forming apparatus.
Figure 2:
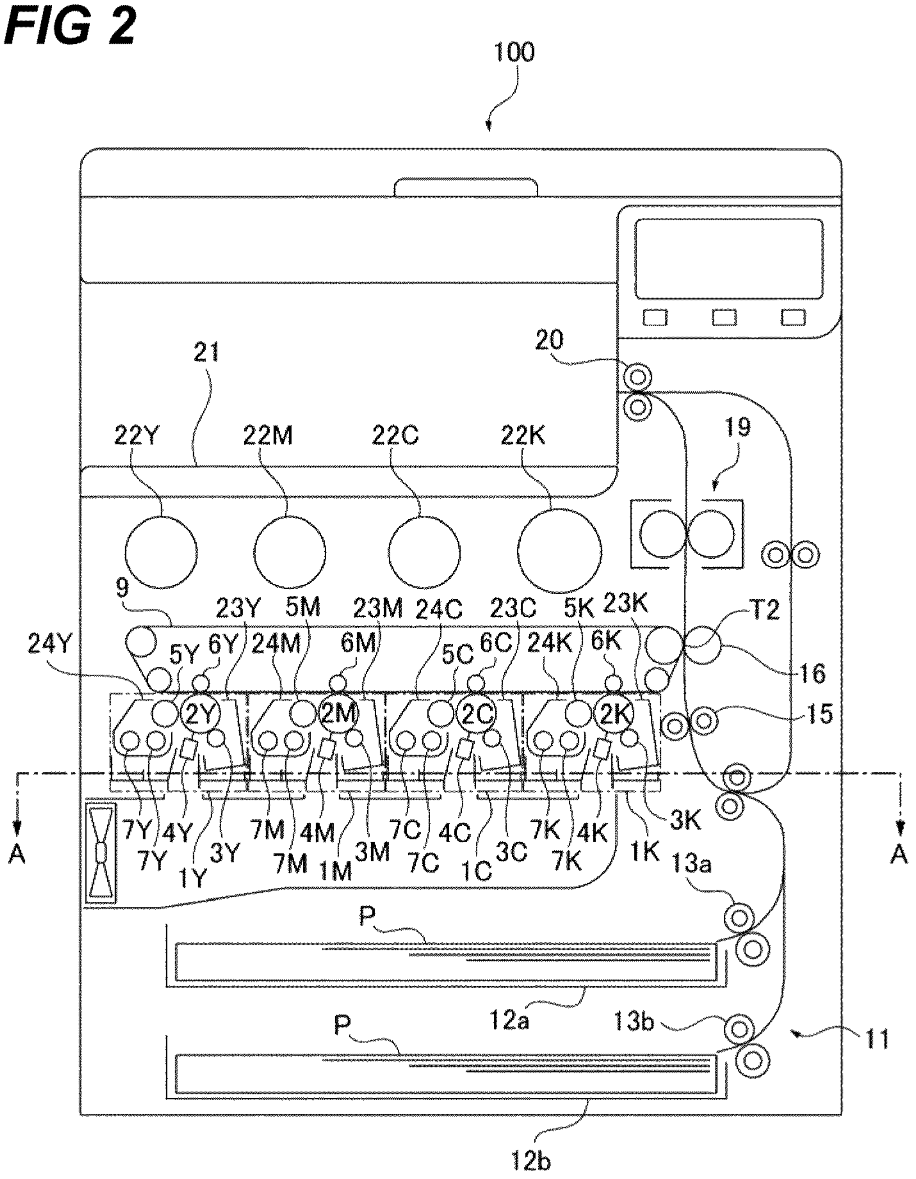
FIG. 2 is a schematic cross-sectional view of the image forming apparatus in FIG. 1.
Figure 3:
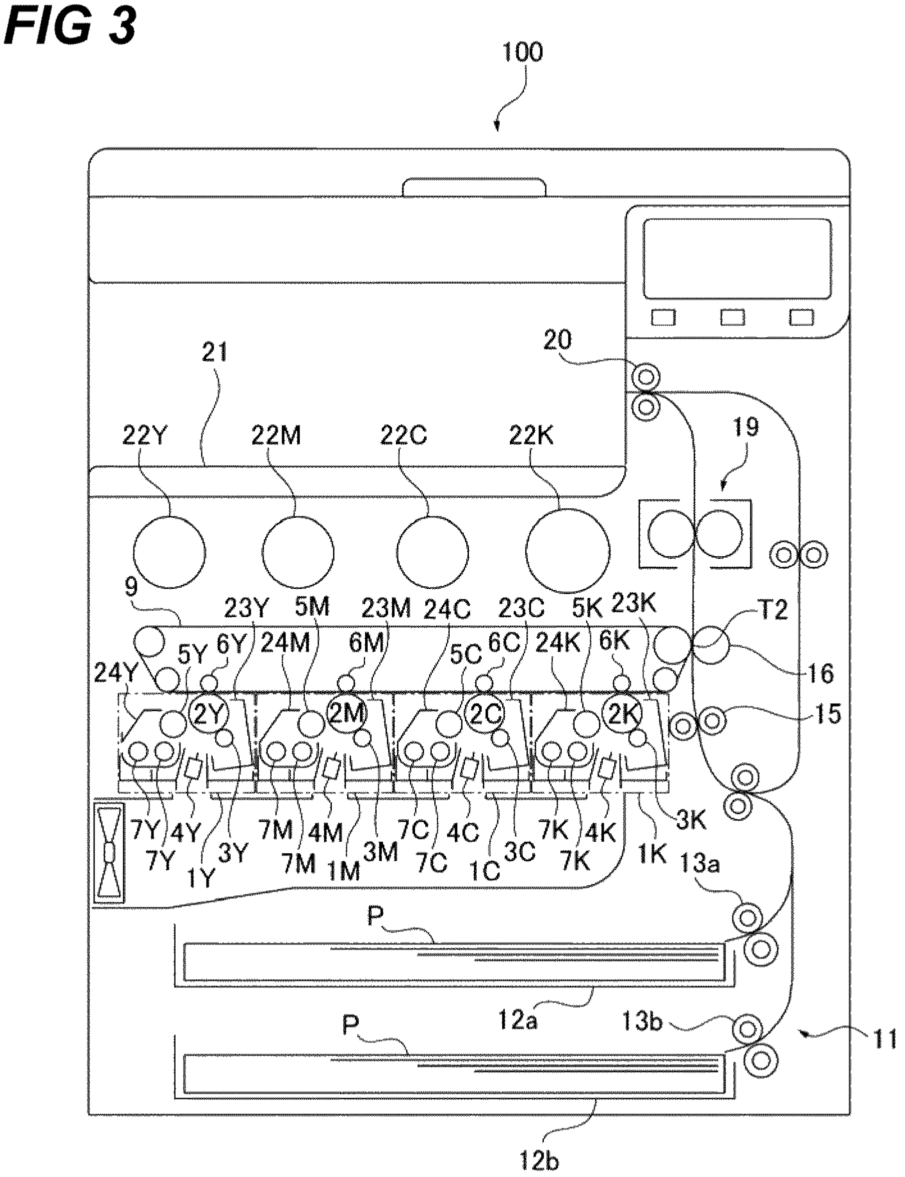
FIG. 3 is a schematic cross-sectional view of the image forming apparatus in FIG. 1.

First, a schematic configuration of an image forming apparatus 100 will be described with reference to FIGS. 1, 2, and 3. FIG. 1 is a perspective view of the image forming apparatus 100. FIGS. 2 and 3 are schematic cross-sectional views of the image forming apparatus in FIG. 1. The image forming apparatus 100 illustrated in FIGS. 1 to 3 is a copying machine including a reading device, but the embodiment may be another image forming apparatus such as a printer not including a reading device. Further, the embodiment is not limited to the color image forming apparatus including a plurality of photosensitive drums 2 as illustrated in FIGS. 2 and 3, and may be a color image forming apparatus including one photosensitive drum 2 or an image forming apparatus forming a monochrome image.

The image forming apparatus 100 illustrated in FIGS. 2 and 3 includes four image forming portions 1Y, 1M, 1C, and 1K (hereinafter, also collectively and simply referred to as "image forming portion 1") that form toner images of respective colors of yellow, magenta, cyan, and black.

The image forming portions 1Y, 1M, 1C, and 1K include photosensitive drums 2Y, 2M, 2C, and 2K (hereinafter, also collectively and simply referred to as a "photosensitive drum 2"), which are examples of photoconductors, respectively. The photosensitive drum 2 may be a photosensitive belt.

The image forming portions 1Y, 1M, 1C, and 1K include charging rollers 3Y, 3M, 3C, and 3K (hereinafter, also collectively and simply referred to as a "charging roller 3") as charging portions that respectively charge the photosensitive drums 2Y, 2M, 2C, and 2K.

In addition, the image forming portions 1Y, 1M, 1C, and 1K include light emitting diode (LED, hereinafter referred to as LED) exposure heads 4Y, 4M, 4C, and 4K (hereinafter, also collectively and simply referred to as an "exposure head 4") as exposure units that expose the photosensitive drums 2Y, 2M, 2C, and 2K.

Further, the image forming portions 1Y, 1M, 1C, and 1K include developing units 24Y, 24M, 24C, and 24K (hereinafter, also collectively and simply referred to as a "developing unit 24") as developing units that develop the electrostatic latent image on the photosensitive drum 2 with toner and develop the toner image of each color on the photosensitive drum 2. Note that Y, M, C, and K attached to the reference numerals indicate the colors of the toner.

The image forming apparatus 100 illustrated in FIGS. 2 and 3 is an image forming apparatus adopting a so-called "lower surface exposure system" in which the photosensitive drum 2 is exposed from below, that is, the exposure head 4 is disposed below the photosensitive drum 2. Hereinafter, a description will be given on the premise of an image forming apparatus adopting a lower surface exposure system. Note that, although not illustrated, as an embodiment, an image forming apparatus adopting an "upper surface exposure system" in which the photosensitive drum is exposed from above may be used.

The image forming apparatus 100 includes an intermediate transfer belt 9 to which a toner image formed on the photosensitive drum 2 is transferred, and a primary transfer roller 6 (Y, M, C, and K) that sequentially transfers the toner image formed on the photosensitive drum 2 to the intermediate transfer belt 9. The intermediate transfer belt 9 is disposed above the image forming portion 1. In addition to the intermediate transfer method using the intermediate transfer belt 9, a direct transfer method of directly transferring from the photosensitive drum 2 to a sheet may be used.

In addition, the image forming apparatus 100 includes a secondary transfer roller 16 as a transfer portion that transfers the toner image on the intermediate transfer belt 9 onto a recording sheet P conveyed from a feeding portion 11, and a fixing device 19 as a fixing unit that fixes the secondarily transferred image onto the recording sheet P.

Toner bottles 22Y, 22M, 22C, and 22K (hereinafter, also collectively and simply referred to as a "toner bottle 22") that accommodate replenishment toners of the respective colors are detachably replaceable units with respect to the image forming apparatus 100. The toner bottle 22 is disposed above the intermediate transfer belt 9. In the toner bottle 22, an appropriate amount of toner is appropriately supplied from the corresponding toner bottle to each developing unit included in the four image forming portions by a toner supply mechanism (not illustrated).

In addition, the image forming apparatus 100 includes the feeding portion 11 that feeds the recording sheet P. The feeding portion 11 includes sheet cassettes 12*a* and 12*b*, feeding rollers 13*a* and 13*b*, and a registration roller 15. The sheet cassettes 12*a* and 12*b* are disposed below the image forming portion 1. The recording sheets P accommodated in the sheet cassettes 12*a* and 12*b* are fed one by one by the feeding rollers 13*a* and 13*b*, and conveyed to a secondary transfer portion T2 at a predetermined timing by the registration roller 15.

(Image Forming Process)

Next, an image forming process of the image forming apparatus 100 will be briefly described. The charging roller 3Y charges the surface of the photosensitive drum 2Y. The exposure head 4Y exposes the surface of the photosensitive drum 2Y charged by the charging roller 3Y. As a result, an electrostatic latent image is formed on the photosensitive drum 2Y. Next, the developing unit 24Y develops the electrostatic latent image formed on the photosensitive drum 2Y with yellow toner. The yellow toner image developed on the surface of the photosensitive drum 2Y is transferred onto the intermediate transfer belt 9 by the primary transfer roller 6Y. Magenta, cyan, and black toner images are also formed by a similar image forming process, and are transferred so as to be superimposed on the intermediate transfer belt 9.

The toner image of each color transferred onto the intermediate transfer belt 9 is conveyed to the secondary transfer portion T2 by the intermediate transfer belt 9. The toner images conveyed to the secondary transfer portion T2 are collectively transferred to the recording sheet P conveyed from the feeding portion 11 by the secondary transfer roller 16. The recording sheet P to which the toner image has been transferred is conveyed to the fixing device 19. The fixing device 19 fixes the toner image on the recording sheet P by heat and pressure. The recording sheet P subjected to the fixing process by the fixing device 19 is discharged to a discharge tray 21 disposed above the toner bottle 22 by a discharge roller 20.

(Drum Unit and Developing Unit)

A replaceable drum unit 23 and the developing unit 24 in the image forming apparatus 100 of the present embodiment will be described by way of example.

Figure 4:
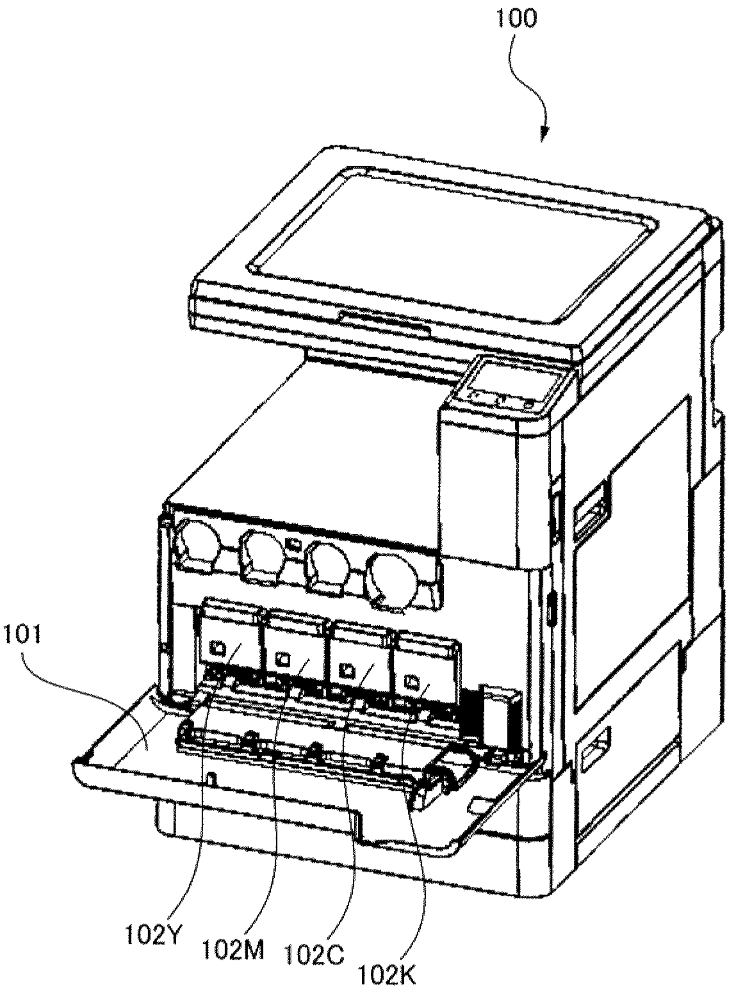
FIG. 4 is a perspective view of an image forming apparatus.
Figure 5:
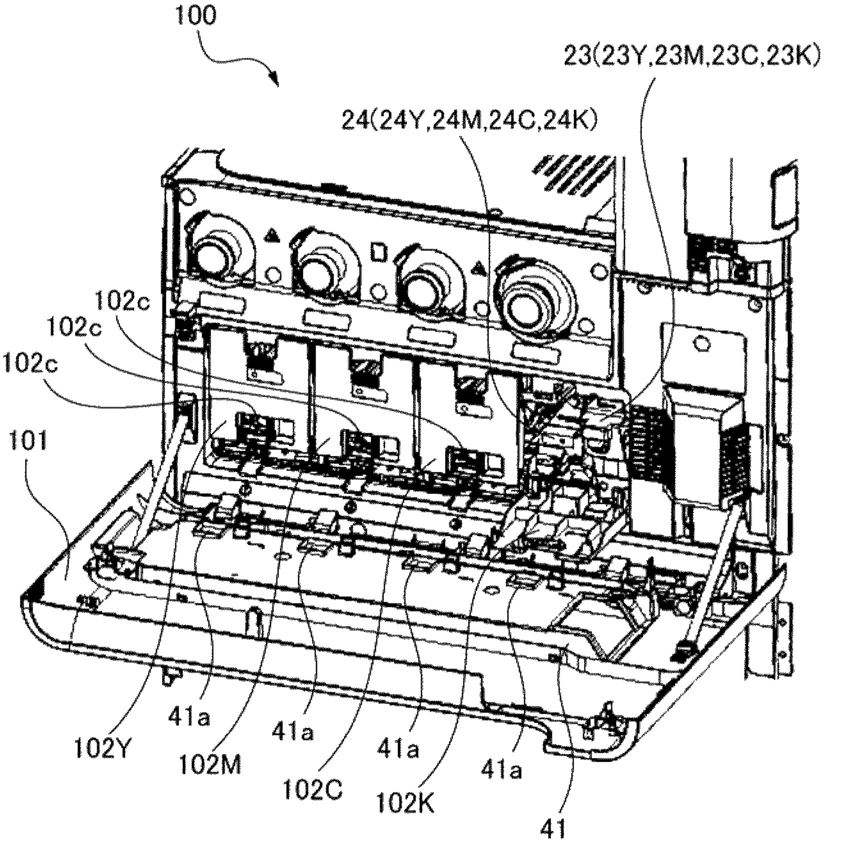
FIG. 5 is a partially enlarged perspective view of the image forming apparatus.
Figure 6:
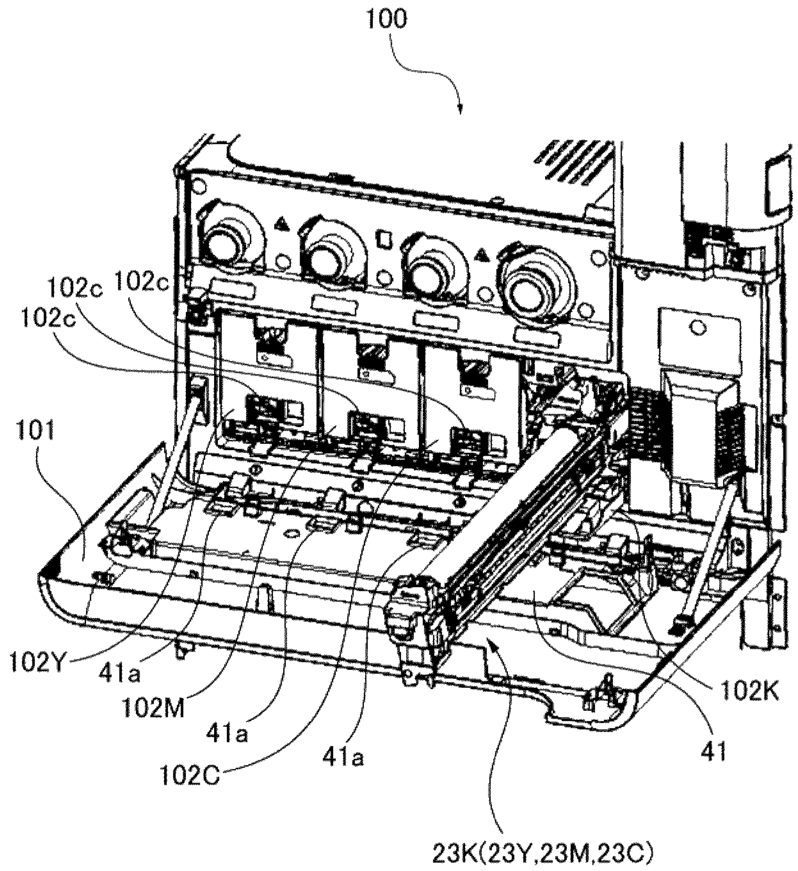
FIG. 6 is a partially enlarged perspective view of the image forming apparatus.
Figure 7:
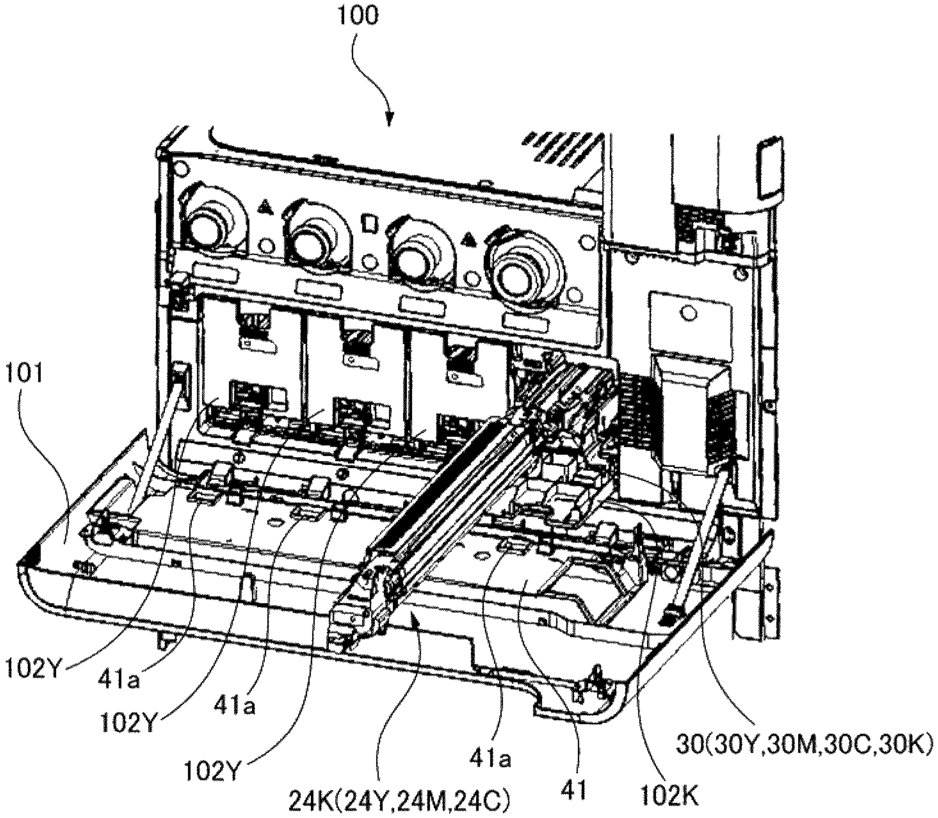
FIG. 7 is a partially enlarged perspective view of the image forming apparatus.

The photosensitive drum 2 and the charging roller 3 described above are integrally unitized (drum unit and drum cartridge) together with a cleaning device (not illustrated). An example of the configuration will be described with reference to FIGS. 4, 5, 6, and 7. FIGS. 4 and 5 are perspective views illustrating schematic structures around the drum unit 23 (Y, M, C, and K) and around the developing unit 24 (Y, M, C, and K) included in the image forming apparatus 100. FIG. 6 is a view illustrating how the drum unit 23 is inserted into and removed from the image forming apparatus 100 from the outside of the apparatus main body. FIG. 7 is a view illustrating how the developing unit 24 is inserted into and removed from the image forming apparatus 100 from the outside of the apparatus main body.

Drum units 23Y, 23M, 23C, and 23K (hereinafter, also collectively and simply referred to as a "drum unit 23") including the photosensitive drum 2 are attached to the image forming apparatus 100. The drum unit 23 is a cartridge to be replaced by an operator such as a user or a maintenance person. The drum unit 23 rotatably supports the photosensitive drum 2. Specifically, the photosensitive drum 2 is rotatably supported by the frame body of the drum unit 23. The drum unit 23 may not include the charging roller 3 or the cleaning device.

In addition, developing units 24Y, 24M, 24C, and 24K (hereinafter, also collectively and simply referred to as a "developing unit 24") separate from the drum unit 23, which is a photoconductor unit, are attached to the image forming apparatus 100. The developing unit 24 includes developing sleeves 5Y, 5M, 5C, and 5K (hereinafter, also collectively and simply referred to as a "developing sleeve 5") as developer carriers that carry the developer, and screws 7Y, 7M, 7C, and 7K (hereinafter, also collectively and simply referred to as a "screw 7") that supply the developer to the developing sleeve 5 and agitate the developer. The developing unit 24 is a cartridge in which the developing sleeve 5 and the screw 7 are integrated, and is detached from the apparatus main body of the image forming apparatus 100 and replaced by an operator as illustrated in FIGS. 5 and 7.

Here, the toner is circulated and conveyed at high speed by the screw 7 inside the developing unit 24. The rotation speed of the screw 7 is relatively very high with respect to the rotation speed of the developing sleeve 5 and the photosensitive drum 2, and coating on the developing sleeve 5 can be uniformly performed without unevenness.

Figure 8:
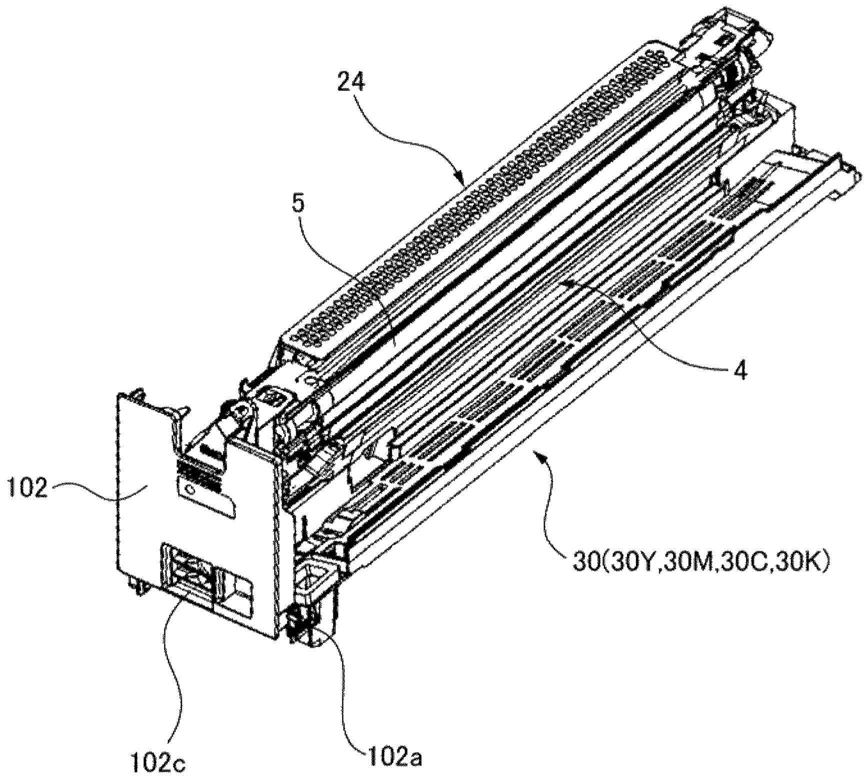
FIG. 8 is a perspective view of a cartridge tray.
Figure 9:
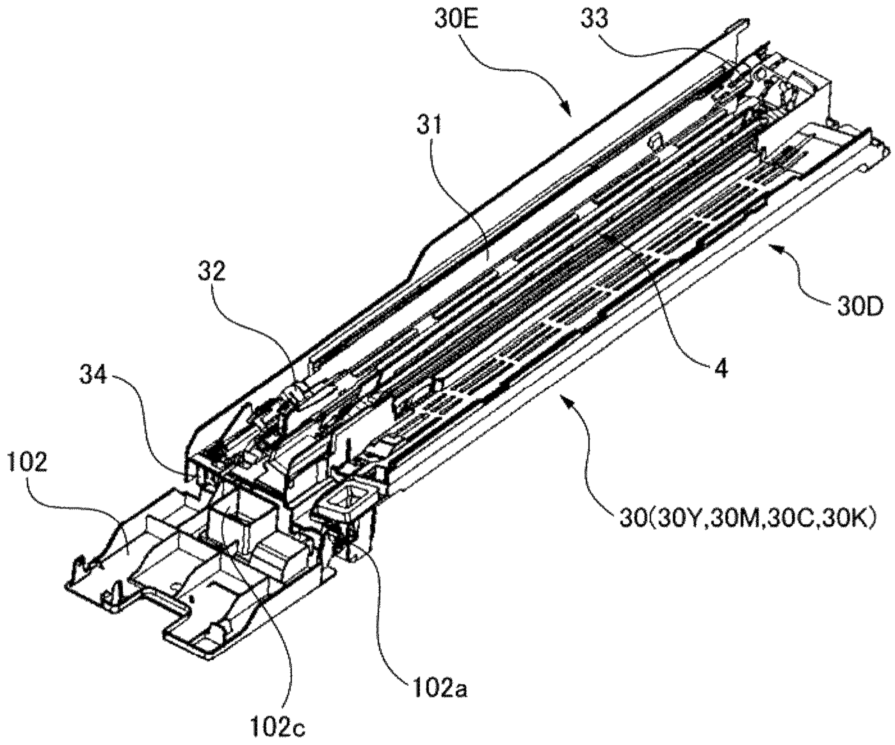
FIG. 9 is a perspective view of the cartridge tray.

In addition, the image forming apparatus 100 includes a cartridge tray 30 (30Y, 30M, 30C, and 30K) for each image forming portion (see FIGS. 8 and 9). The drum unit 23 and the developing unit 24 are supported by the cartridge tray 30 of each image forming portion, guided in the axial direction of the photosensitive drum, and inserted into and removed from the apparatus main body of the image forming apparatus 100.

Figure 34:
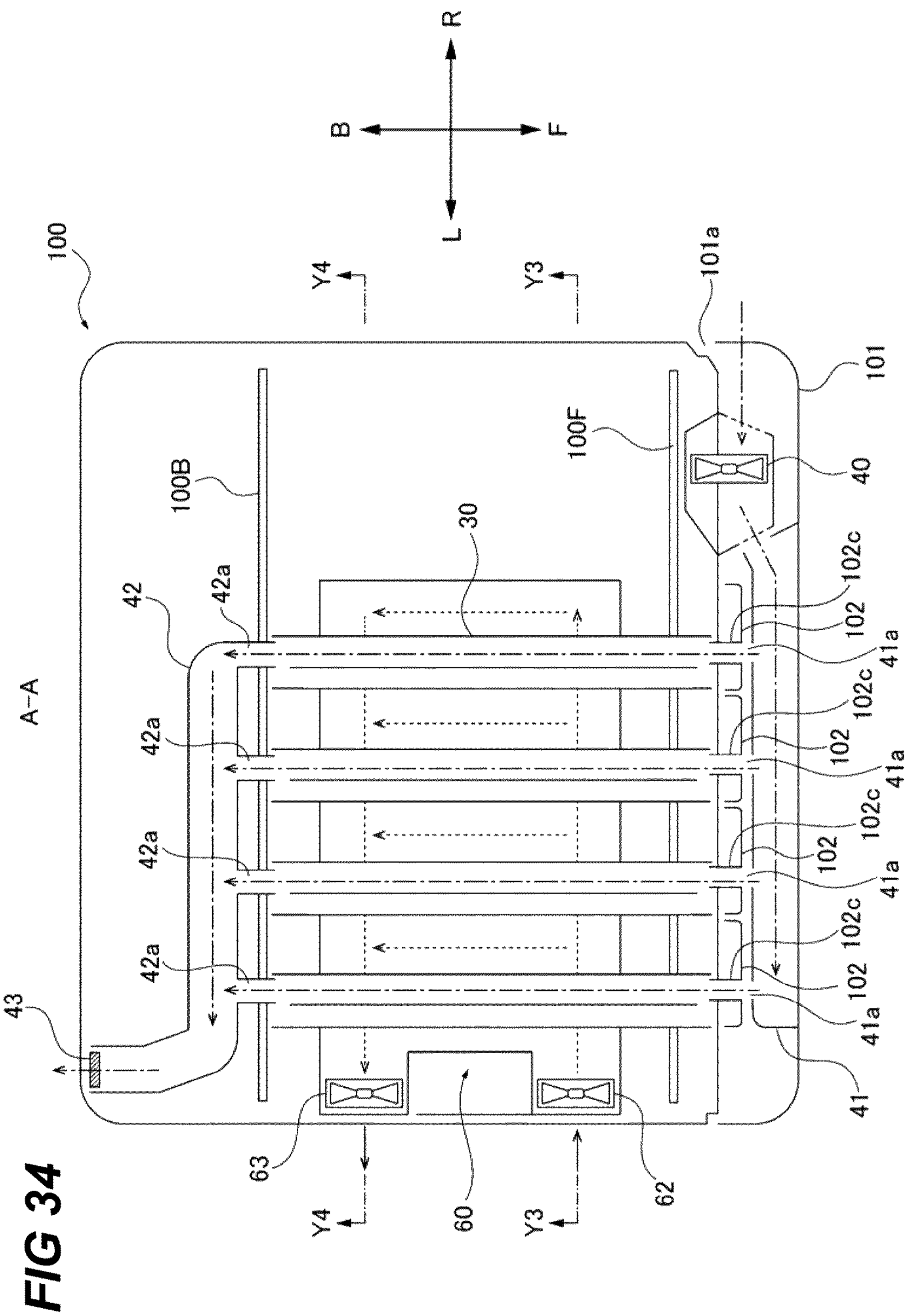
FIG. 34 is a cross-sectional view taken along line A-A in FIG. 2.

In addition, the image forming apparatus 100 includes a front plate 100F formed of a sheet metal and a back plate 100B similarly formed of a sheet metal (see FIG. 34). The front plate 100F is a side wall provided on the front side of the image forming apparatus 100. The front plate 100F forms a part of a housing of the apparatus main body on the front side of the apparatus main body of the image forming apparatus 100. The back plate 100B is a side wall provided on the back side of the image forming apparatus 100. The back plate 100B forms a part of the housing of the apparatus main body on the back side of the apparatus main body of the image forming apparatus 100. The front plate 100F and the back plate 100B are arranged to face each other on one side and the other side in the axial direction of the photosensitive drum, and a sheet metal (not illustrated) as a beam is bridged therebetween. Each of the front plate 100F, the back plate 100B, and the beam (not illustrated) constitutes a part of a frame body (housing) of the image forming apparatus. Here, regarding the image forming apparatus of the present embodiment or the constituent members thereof, the forward side or the front side is a side on which the drum unit 23 and the developing unit 24 are taken in and out (inserted and removed) with respect to the apparatus main body of the image forming apparatus 100.

One ends of the cartridge trays 30 are attached to the front plate 100F (see FIG. 34) and the other ends are attached to the back plate 100B (see FIG. 34) in the axial direction of the photosensitive drum. The cartridge tray 30 will be described later.

Since the drum unit 23 and the developing unit 24 deteriorate due to repetition of the image forming process, they take the form of a unit (cartridge) that can be maintained by replacement or attachment or detachment.

FIG. 3 illustrates the arrangement of the drum unit 23, the developing unit 24, and the exposure head 4 when replacement or attachment or detachment is performed. In the image forming apparatus illustrated in FIG. 3, unlike the image forming apparatus illustrated in FIG. 2, it can be seen that the developing unit 24 and the exposure head 4 are retracted and separated from the photosensitive drum 2.

This is because, when the state in which the developing unit 24 and the exposure head 4 are disposed close to the photosensitive drum 2 as illustrated in FIG. 2 is maintained, each unit may be damaged due to dynamic interference at the time of attachment and detachment of the unit, or the unit may not be taken out.

Therefore, at the time of attaching and detaching the unit, the developing unit 24 and the exposure head 4 are retracted from the photosensitive drum 2 and separated from each other as illustrated in FIG. 3 by a retraction mechanism by a development stay 31, a rotating arm 65, an elevating duct 69, and the like, which will be described later.

The drum unit 23 and the developing unit 24 are inserted and removed from the front side of the image forming apparatus 100, and are mounted at predetermined positions (mounting positions) of the apparatus main body of the image forming apparatus 100.

The image forming apparatus 100 includes inner doors 102Y, 102M, 102C, and 102K (hereinafter, also collectively and simply referred to as an "inner door 102") that cover front sides of both the drum unit 23 and the developing unit 24 mounted at the mounting positions. As illustrated in FIGS. 8 and 9, one end of the inner door 102 is fixed to the front side of the cartridge tray 30 by a hinge, and is rotatable with respect to the cartridge tray 30 by the hinge.

The inner door 102 is a member necessary for protecting each unit and making it difficult for the photosensitive drum 2 to be exposed to light in a process other than the image forming process, and is disposed at a position facing the front in the attachment and detachment direction of each color unit.

Furthermore, a front cover 101 forming an exterior of the apparatus is provided on the front side of the image forming apparatus 100. One end of the front cover 101 is fixed to the front side of the apparatus main body of the image forming apparatus 100 by a hinge, and is rotatable with respect to the apparatus main body of the image forming apparatus 100 by the hinge. The front cover 101 is provided on the front side of the inner door 102 in the axial direction of the photosensitive drum. In the closed state illustrated in FIG. 1, the front cover 101 covers the entire plurality of inner doors 102 arranged in the left-right direction to form an exterior on the front side of the apparatus.

Therefore, replacement work of the drum unit 23 and the developing unit 24 is performed by an operator in the following procedure. The operator opens the front cover 101 as illustrated in FIG. 4, then opens the inner door 102 as illustrated in FIG. 5, and takes out the drum unit 23 (FIG. 6) or the developing unit 24 (FIG. 7) in the apparatus main body. Then, the replacement work is completed by inserting a new drum unit 23 or developing unit 24, closing the inner door 102, and further closing the front cover 101.

The retraction mechanism of the developing unit 24 and the exposure head 4 retracts the developing unit 24 and the exposure head 4 from the photosensitive drum 2 in conjunction with the operation of opening the inner door 102. The retraction mechanism (the development stay 31, the rotating arm 65, and the elevating duct) will be described later.

Here, in the following description, the front plate side is defined as a front side (front side or forward side), and the back plate side is defined as a back side (back side or backward side) with respect to the apparatus main body. When the photosensitive drum 2K on which the electrostatic latent image related to the black toner image is formed is used as a reference, a side on which the photosensitive drum 2Y on which the electrostatic latent image related to the yellow toner image is formed is disposed is defined as a left side. When the photosensitive drum 2Y on which the electrostatic latent image related to the yellow toner image is formed is used as a reference, a side on which the photosensitive drum 2K on which the electrostatic latent image related to the black toner image is formed is disposed is defined as a right side. Furthermore, a direction perpendicular to the front-back direction and the left-right direction defined here and upward in the vertical direction is defined as an upward direction, and a direction perpendicular to the front-back direction and the left-right direction defined here and downward in the vertical direction is defined as a downward direction. The defined forward direction F, backward direction B, rightward direction R, leftward direction L, upward direction U, and downward direction D are illustrated in FIG. 1.

In addition, the axial direction of the photosensitive drum 2 described in the following description is a direction that coincides with the front-back direction (near-far direction) illustrated in FIG. 1. The longitudinal direction of the exposure head 4 also coincides with the front-back direction illustrated in FIG. 1. That is, the axial direction of the photosensitive drum 2 and the longitudinal direction of the exposure head 4 coincide with each other. In addition, one end side in the axial direction of the photosensitive drum 2 means a front side defined herein, and the other end side means a back side defined herein. One end side and the other end side in the front-back direction also correspond to the front side and the back side defined here. One end side in the left-right direction means the left side defined here, and the other end side means the right side defined here.

(Exposure Head)

Figure 10:
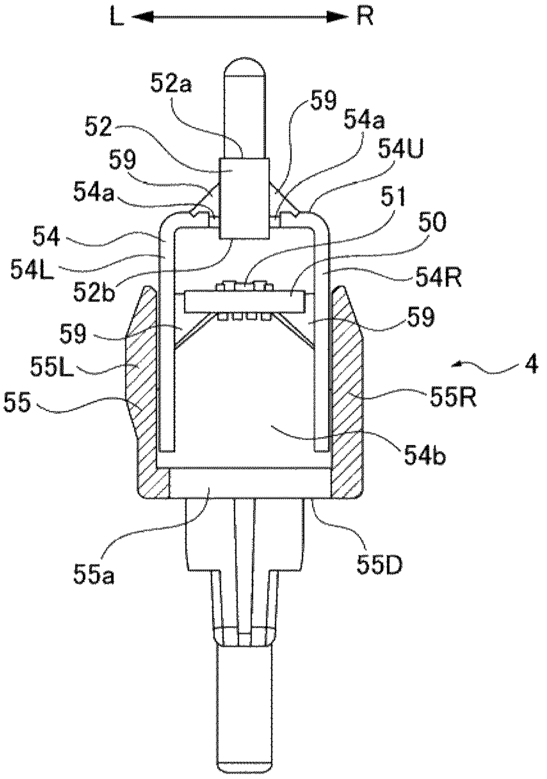
FIG. 10 is a cross-sectional view of an exposure head.
Figure 11:
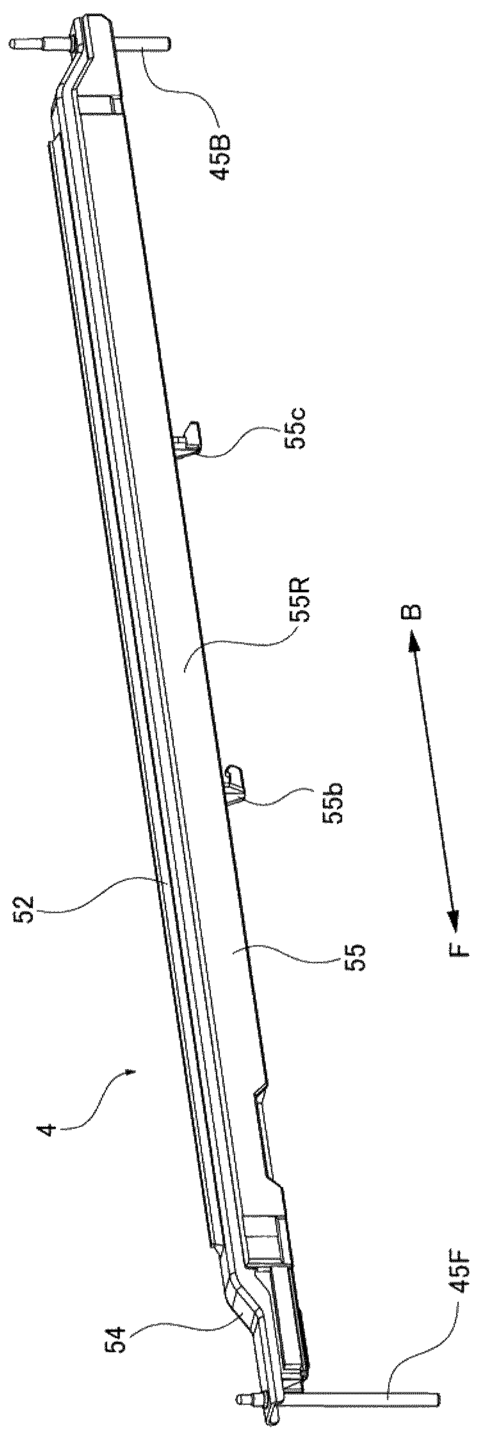
FIG. 11 is a perspective view of the exposure head.
Figure 12:
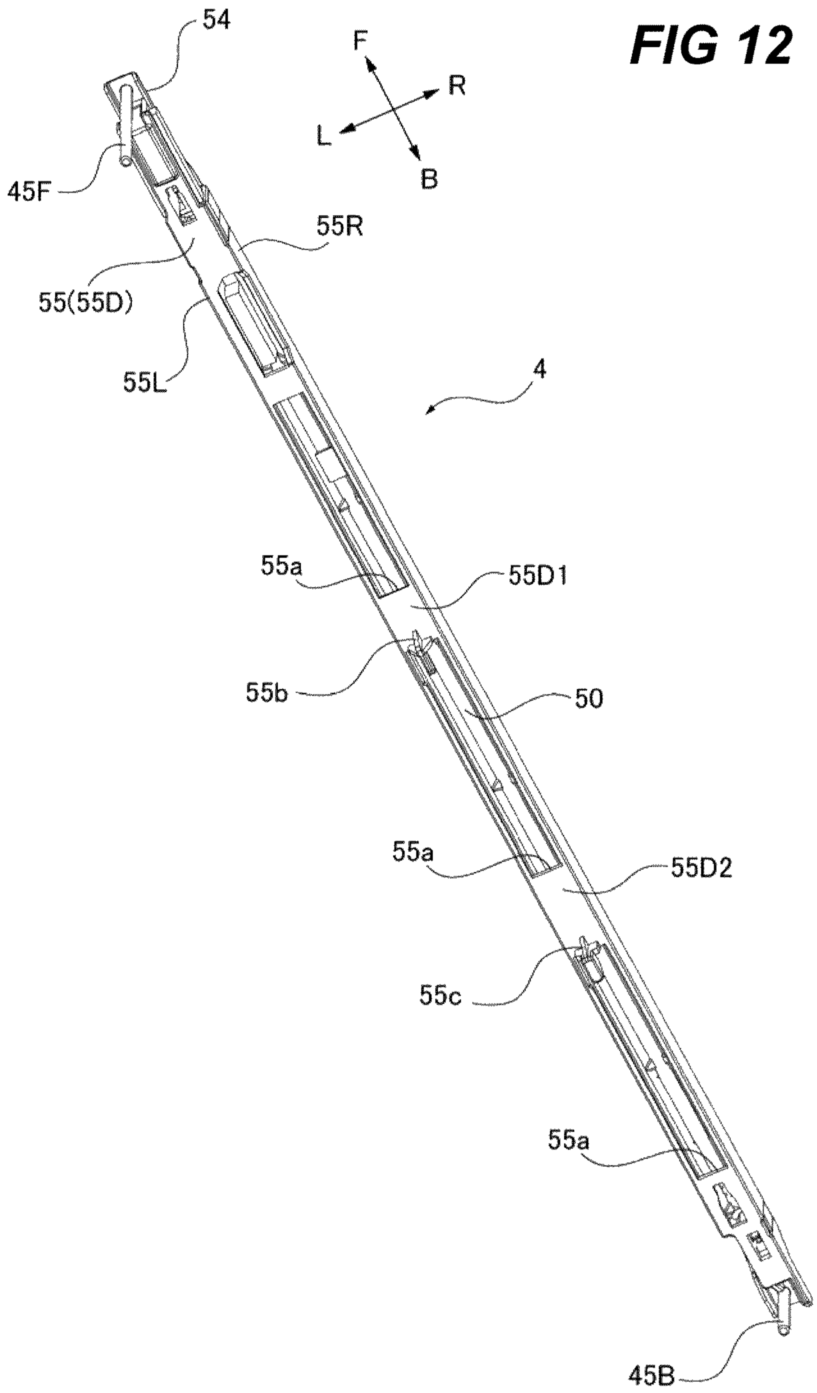
FIG. 12 is a perspective view of the exposure head.

Next, the exposure head 4 will be described with reference to FIGS. 10 to 19. FIG. 10 is a schematic cross-sectional view of the exposure head 4 included in the image forming apparatus of the present embodiment. FIG. 11 is a perspective view of the exposure head 4 as viewed from above. FIG. 12 is a perspective view of the exposure head 4 as viewed from below.

The exposure head 4 has an elongated shape (longitudinal shape) extending in the axial direction of the photosensitive drum 2. The exposure head 4 includes a substrate 50, a light emitting element mounted on the substrate 50, a lens array 52, and a holding member that holds the substrate 50 and the lens array 52. The holding member includes a housing 54 to be described later and a housing support member 55 that supports the housing 54. Here, the exposure head 4 includes an LED (Light Emitting Diode) 51 as a light emitting element that emits light.

(Substrate and Lens Array)

Figure 13A:
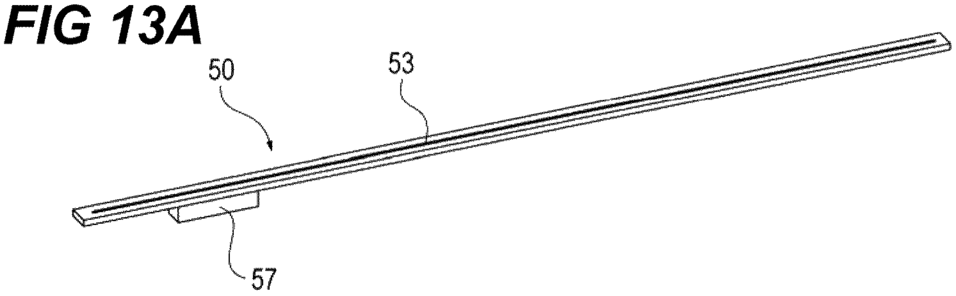
FIGS. 13A, 13B, and 13C are views showing a substrate in an exposure head.
Figure 13B:
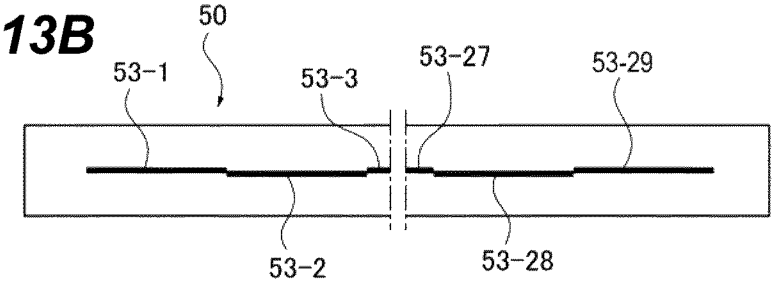
Figure 13C:
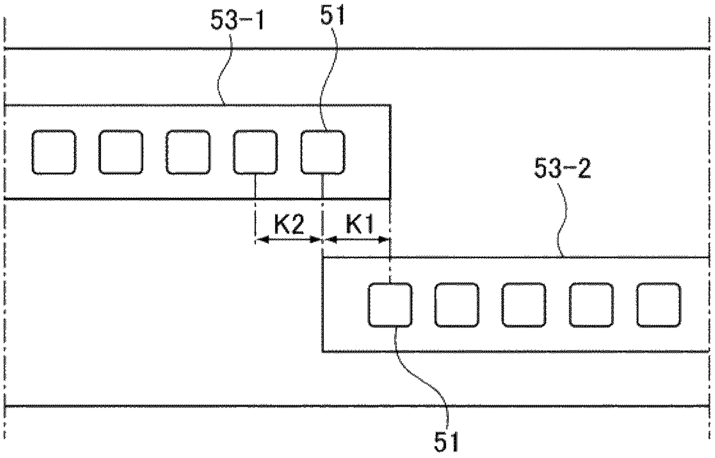
Figure 13D:
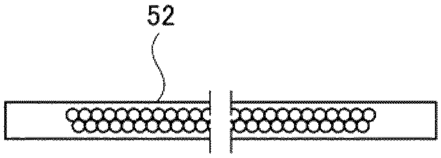
FIGS. 13D and 13E are views showing a lens array.
Figure 13E:
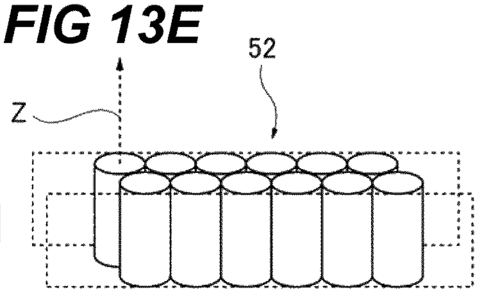
Figure 14:
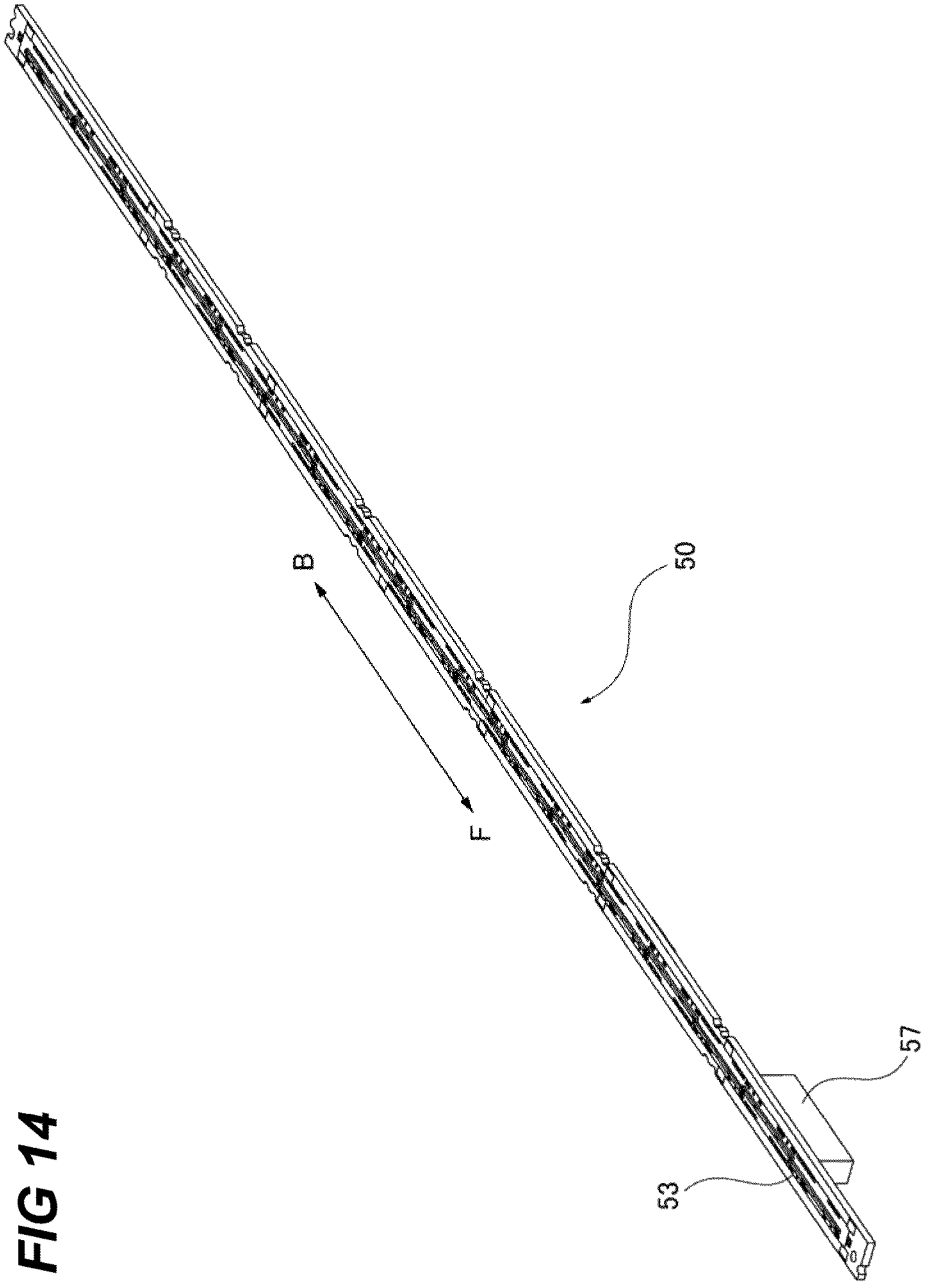
FIG. 14 is a perspective view of the substrate as viewed from a surface (substrate front surface) on which an LED is mounted.
Figure 15:
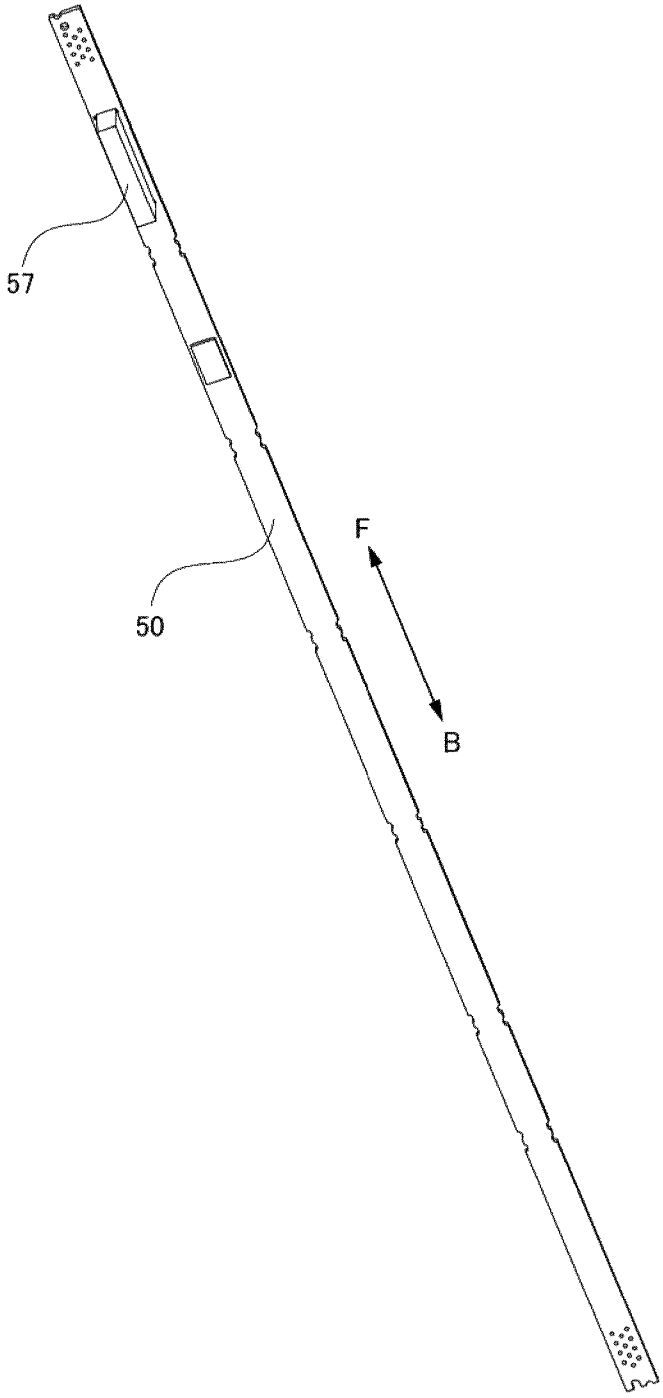
FIG. 15 is a perspective view of the substrate as viewed from a surface (substrate back surface) on which a connector is mounted.

Here, the substrate 50 and the lens array 52 of the exposure head 4 will be described with reference to FIGS. 13A to 13E, 14, and 15. First, the substrate 50 will be described. FIG. 13A is a schematic perspective view of the substrate 50. FIG. 13B illustrates an alignment of the plurality of LEDs 51 provided on the substrate 50, and FIG. 13C illustrates an enlarged view of FIG. 13B. FIG. 14 is a perspective view of the substrate as viewed from the surface (substrate front surface) on which the LED is mounted. FIG. 15 is a perspective view of the substrate as viewed from the surface (substrate back surface) on which the FFC connector is mounted. One side of the arrow in the drawing indicates the front side of the image forming apparatus 100, and the other side indicates the back side of the image forming apparatus 100.

An LED chip 53 is mounted on the substrate 50. As illustrated in FIGS. 13A, 14, and 15, the LED chip 53 is provided on one surface of the substrate 50, and a long FFC connector 57 is provided on the other surface. Here, one surface of the substrate 50 is a surface (upper surface, front surface) on a side where the LED chip 53 is provided. The other surface of the substrate is a surface (lower surface, back surface) opposite to the side where the LED chip 53 is provided.

The FFC connector 57 is attached to the other surface (lower surface, back surface) of the substrate 50 such that the longitudinal direction thereof is along the longitudinal direction of the substrate 50. The long FFC connector 57 is provided on the front side of the image forming apparatus 100 (one side in the longitudinal direction of the substrate 50). Wiring for supplying a signal to each LED chip 53 is provided on the substrate 50. One end of a flexible flat cable 58 (See FIG. 26, hereinafter FFC) as an example of a cable is connected to the FFC connector 57.

Note that a control circuit portion of the image forming apparatus 100 is provided with a substrate (not illustrated) including a controller and a connector. The other end of the FFC 58 is connected to the connector. That is, the FFC 58 electrically connects the substrate (control circuit portion) of the apparatus main body and the substrate 50 of the exposure head 4. A control signal (drive signal) is input to the substrate 50 of the exposure head 4 from the control circuit portion of the apparatus main body of the image forming apparatus 100 via the FFC 58 and the FFC connector 57. The control signal is transferred to each LED chip 53. The LED chip 53 is driven (light emission and turn-off operation) by the control signal input to the substrate 50.

The LED chip 53 mounted on the substrate 50 will be described in more detail. As illustrated in FIGS. 13B and 13C, LED chips 53-1 to 53-29 (29 pieces) in which the plurality of LEDs 51 (an example of the light emitting element) are arranged are aligned on one surface of the substrate 50. In each of the LED chips 53-1 to 53-29, 516 LEDs 51 are aligned in the longitudinal direction. In the longitudinal direction of the LED chip 53, the center-to-center distance k2 between the adjacent LEDs 51 corresponds to the recording resolution of the image forming apparatus 100. Since the recording resolution of the image forming apparatus 100 of the present embodiment is 1200 dpi, the LEDs 51 are aligned such that the center-to-center distance k2 of the adjacent LEDs 51 is 21.16 μm in the longitudinal direction of the LED chips 53-1 to 53-29. Therefore, the exposure range of the exposure head 4 of the present embodiment is about 314 mm. The length of the photosensitive layer in the axial direction of the photosensitive drum 2 is 314 mm or more. Since the length of the long side of the A4-size recording sheet and the length of the short side of the A3-size recording sheet are 297 mm, the exposure head 4 of the present embodiment has an exposure range in which an image can be formed on the A4-size recording sheet and the A3-size recording sheet.

The LED chips 53-1 to 53-29 are aligned in a staggered manner in the axial direction of the photosensitive drum 2. Specifically, the LED chips 53-1 to 53-29 are alternately arranged in two rows along the axial direction of the photosensitive drum 2. That is, as illustrated in FIG. 13B, the odd-numbered LED chips 53-1, 53-3, . . . 53-29 counted from the left side are mounted in a row in the longitudinal direction of the substrate 50. Further, the even-numbered LED chips 53-2, 53-4, . . . 53-28 counted from the left side are mounted in a row in the longitudinal direction of the substrate 50. The LED chip 53 is arranged in this manner. As a result, as illustrated in FIG. 13C, in the longitudinal direction of the LED chip 53, the center-to-center distance k1 of the LEDs 51 arranged at one end of one LED chip 53 and the other end of the other LED chip 53 in the different adjacent LED chips 53 can be made equal to the center-to-center distance k2 of the adjacent LEDs 51 on one LED chip 53.

In the present embodiment, the light emitting element is a semiconductor LED which is a light emitting diode, but may be, for example, an organic light emitting diode (OLED). This OLED is also called organic electro-luminescence (organic EL), and is a current-driven light emitting element. The OLEDs are arranged on a line along the main scanning direction (axial direction of the photosensitive drum 2) on a thin film transistor (TFT) substrate, for example, and are electrically connected in parallel by power supply wiring similarly provided along the main scanning direction.

Next, the lens array 52 which is a lens assembly will be described. FIG. 13D is a schematic view of the lens array 52 as viewed from the photosensitive drum 2 side. FIG. 13E is a schematic perspective view of the lens array 52. As illustrated in FIG. 13D, the lens array 52 condenses the light emitted from the light emitting element on the photosensitive drum 2. The lens array 52 is a lens assembly including a plurality of lenses. The plurality of lenses are arranged in two rows along the alignment direction of the plurality of LEDs 51. Each lens is alternately arranged such that one of the lenses in the other row is arranged so as to be in contact with both of the adjacent lenses in the alignment direction of the lenses in one row. Each lens is a cylindrical rod lens made of glass, and has a light incident surface 52*b* on which the light emitted from the LED 51 is incident and a light exit surface 52*a* from which the light incident from the light incident surface is emitted (see FIG. 10). The material of the lens is not limited to glass, and may be plastic. The shape of the lens is not limited to the cylindrical shape, and may be, for example, a polygonal prism such as a hexagonal prism.

A dotted line Z illustrated in FIG. 13E indicates the optical axis of the lens. The exposure head 4 is moved in a direction substantially along the optical axis of the lens (hereinafter, also referred to as an optical axis direction) indicated by the dotted line Z by a retraction mechanism (the rotating arm 65 and the elevating duct 69 in FIGS. 24 and 25) to be described later. The optical axis of the lens here means a line connecting the center of the light exit surface of the lens and the focal point of the lens. The lens array 52 is a lens assembly having a plurality of lenses, and the "optical axis" described above is an optical axis of any lens among the plurality of lenses. Here, strictly speaking, the plurality of lenses included in the lens array 52 may be slightly inclined to each other. This is due to tolerance during assembly. However, the deviation of the tolerance is not considered when the direction of the optical axis is defined. Therefore, it is considered that the optical axes of the plurality of lenses are in the same direction. The lens array 52 has a function of condensing the light emitted from the LED 51 on the surface of the photosensitive drum 2.

A mounting position of the lens array 52 with respect to the housing 54 is adjusted at the time of assembling the exposure head 4 such that a distance between the light emitting surface of the LED 51 and the light incident surface of the lens is substantially equal to a distance between the light exit surface of the lens and the surface of the photosensitive drum 2.

(Housing)

As illustrated in FIG. 10, the housing 54 holds the lens array 52 and the substrate 50. In the present embodiment, the housing 54 is a metal member formed by bending a plate material obtained by plating a galvanized steel plate or a cold-rolled steel plate.

The housing 54 is made of metal as described above. For example, the housing 54 is formed by pressing a sheet metal such as an iron thin plate into a U shape. Hereinafter, the shape of the housing 54 will be described.

As illustrated in FIG. 10, the housing 54 has a flat portion (opposing surface) 54U in which a first opening 54*a* into which the lens array 52 is inserted is formed. The flat portion 54U faces the photosensitive drum 2 in the optical axis direction of the lens of the lens array 52. Note that the flat portion 54U is not limited to a flat surface, and may be a slightly curved surface. The housing 54 has an extending portion 54R extending in a direction away from the photosensitive drum 2 from one side in the lateral direction of the flat portion 54U. The housing 54 has an extending portion 54L extending in a direction away from the photosensitive drum 2 from the other side in the lateral direction of the flat portion 54U.

The extending portion 54R and the extending portion 54L form a substrate support portion for supporting the substrate 50 inserted from a second opening 54*b* in the housing 54. The flat portion 54U and the substrate support portion (the extending portions 54R and 54L) are integrated to form the housing 54 that holds the lens array 52 and the substrate 50, and a cross section thereof is formed in a substantially U-shape. Since the housing 54 is formed in a substantially U shape, the second opening 54*b* is formed on the side opposite to the flat portion 54U. The second opening 54*b* is formed between the substrate support portions (the extending portions 54L and 54R) extending from the flat portion 54U to the side away from the photosensitive drum.

The substrate 50 is inserted from the second opening 54*b*, that is, from the lower side of the U-shaped housing 54, and is adhered to the inside of each substrate support portion (the inside of the extending portion 54L and the inside of the extending portion 54R) with an adhesive. Since the position of the substrate 50 in the focusing direction is determined by a jig (not illustrated), the exposure head 4 does not include a positioning unit in the focusing direction of the substrate 50.

In addition, the lens array 52 is also adhered to the flat portion 54U with an adhesive in a state of being inserted into the first opening 54*a* formed in the flat portion 54U. Note that the lens array 52 is fixed to the flat portion 54U (housing 54) after the position and inclination in the focusing direction are adjusted by a jig such that the distance in the focusing direction between all the LED chips 53 and the lens array 52 mounted on the substrate 50 becomes a predetermined value. The lens array 52 is fixed to the flat portion 54U at a plurality of positions in the longitudinal direction by an adhesive. That is, the exposure head 4 of the present embodiment has a plurality of adhering locations for adhering and fixing the lens array 52 inserted into the first opening 54*a* to the flat portion 54U in the longitudinal direction of the flat portion 54U.

Figure 16:
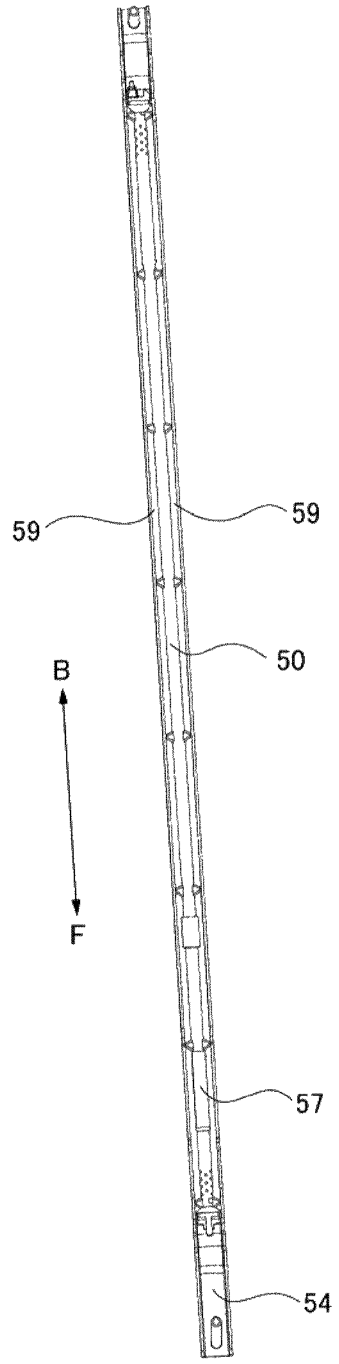
FIG. 16 is a perspective view of the exposure head with the substrate assembled to a housing as viewed from below.
Figure 17:
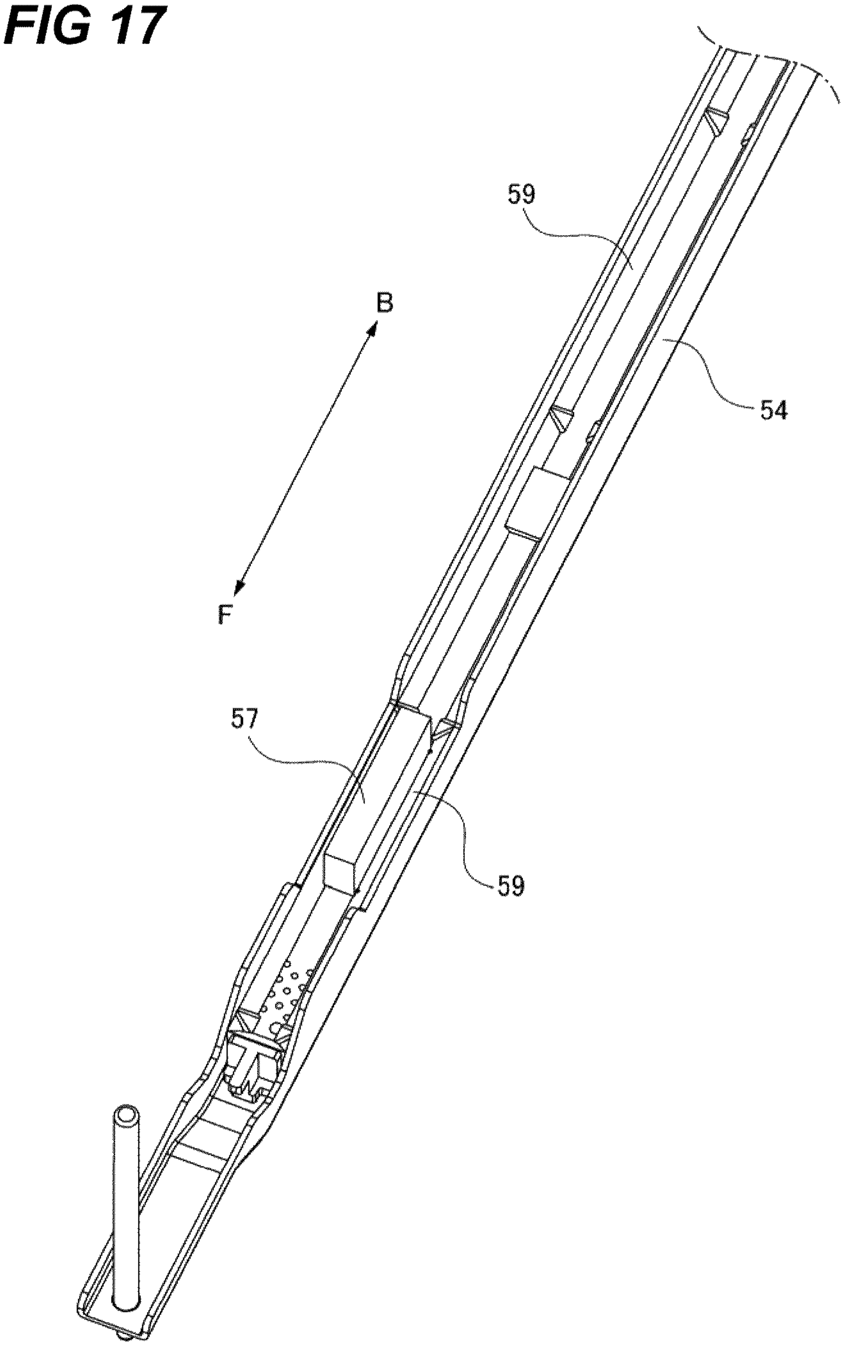
FIG. 17 is an enlarged view of a connector side of the exposure head in FIG. 16.

After the substrate 50 and the lens array 52 are positionally adjusted and fixed to the housing 54, a gap between the substrate 50 inserted into the second opening 54*b* and the housing 54 (the extending portions 54L and 54R) is sealed by a sealant 59 in the longitudinal direction as illustrated in FIGS. 16 and 17. FIG. 16 is a perspective view of a state in which the substrate 50 on which the LEDs 51 are mounted is assembled to the housing 54 as viewed from the lower side of the exposure head 4. FIG. 17 is an enlarged view of the front side of the exposure head illustrated in FIG. 16. This prevents the LED 51 from being contaminated by toner and dust from the outside. Here, the sealant 59 merely seals the gap (boundary portion) between the substrate 50 and the housing 54, and most of the FFC connector 57 and the substrate 50 are exposed.

Figure 18:
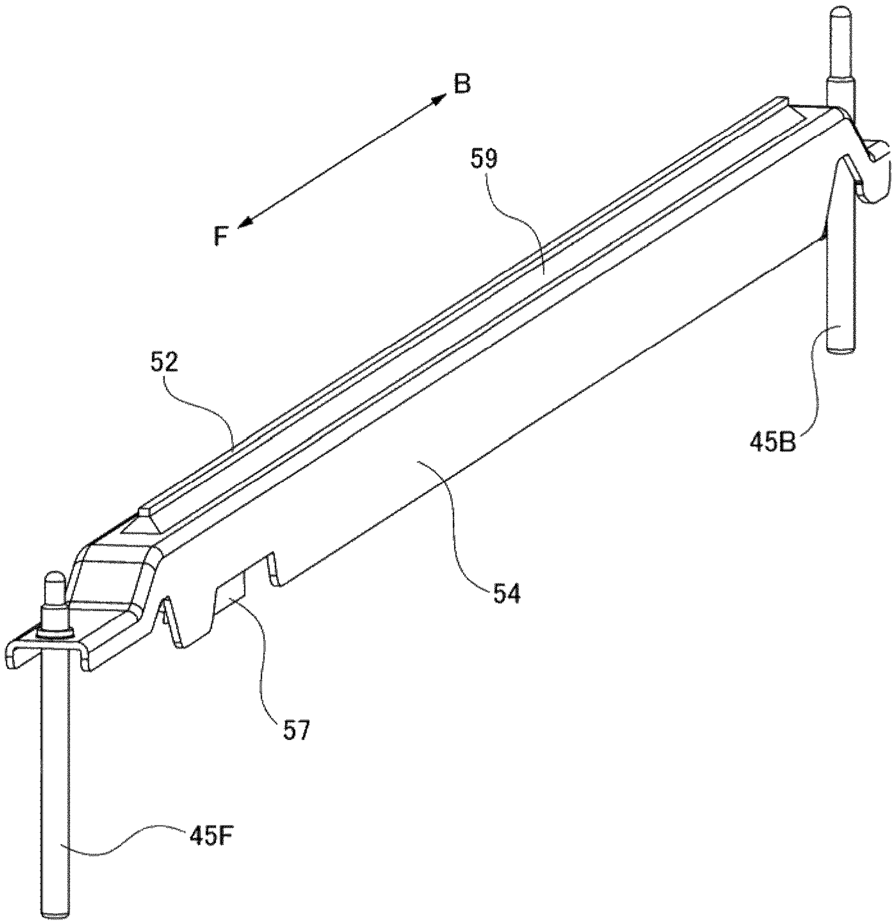
FIG. 18 is a perspective view illustrating the exposure head in a state where the lens array is assembled to the housing in FIG. 16.

Similarly, the sealant 59 is applied to a gap between the lens array 52 inserted into the first opening 54*a* and the housing 54 (flat portion 54U), and the gap is sealed by the sealant 59 in the longitudinal direction as illustrated in FIG. 18. FIG. 18 is a perspective view of the exposure head 4 in a state where the lens array 52 is assembled to the housing 54. More specifically, as illustrated in FIG. 10, the sealant 59 seals a gap between the side wall of the lens array 52 and the edge of the first opening 54*a* along the longitudinal direction of the housing 54. As a result, it is possible to reduce the possibility that dust such as toner flows in from the gap between the side wall of the lens array 52 and the first opening 54*a* and the light emitted from the LED 51 is blocked by the dust. Note that, as a matter of course, the gap sealed by the sealant 59 seals not only the gap between the side wall on one side of the lens array 52 and the edge of the first opening 54*a*, but also the gap between the side wall on the other side of the lens array 52 and the edge of the first opening 54*a*. The side wall on the other side of the lens array 52 refers to a side wall opposite to the side wall on one side of the lens array 52. Also here, a gap (boundary portion) between the housing 54 and the lens array 52 is sealed with the sealant 59. This prevents the LED 51 from being contaminated by toner and dust from the outside.

As described above, the substrate 50 and the lens array 52 are held by the housing 54, so that the LED 51 and the incident surface 52*b* of the lens face each other. As a result, the light emitted from the LED 51 is incident on the incident surface 52*b* of the lens, and is emitted from the exit surface 52*a* of the lens toward the photosensitive drum 2. Here, in the present embodiment, the light emitted from the three LEDs 51 (the plurality of LEDs 51) can pass through the same one lens. In addition, even light emitted from one LED 51 can pass through a plurality of lenses because the light travels radially. That is, the light emitted from the plurality of LEDs 51 passes through the lens array 52 (some of the plurality of lenses included in the lens array 52) to expose the photosensitive drum 2.

(Housing Support Member)

As illustrated in FIGS. 11 and 12, the housing support member 55 supports the housing 54 holding the substrate 50 and the lens array 52 in the longitudinal direction, and is provided integrally with the housing 54. The housing support member 55 is a member having a longitudinal shape extending in the axial direction of the photosensitive drum 2. The housing support member 55 is formed in a U shape as illustrated in FIG. 10. The housing support member 55 includes a left side wall 55L which is a first side wall, a right side wall 55R which is a second side wall facing the left side wall 55L, and a bottom surface portion 55D facing the flat portion 54U of the housing 54 between the left side wall 55L and the right side wall 55R. The bottom surface portion 55D of the housing support member 55 is provided with a plurality of openings 55*a* in the longitudinal direction which is the axial direction of the photosensitive drum 2.

The opening 55*a* of the housing support member 55 is provided at a position facing a surface (back surface of the substrate 50) of the substrate 50 opposite to the mounting surface (front surface of the substrate 50) on which the LED 51 is mounted. The opening 55*a* is provided between the left side wall 55L and the right side wall 55R in the lateral direction orthogonal to the longitudinal direction.

Figure 22:
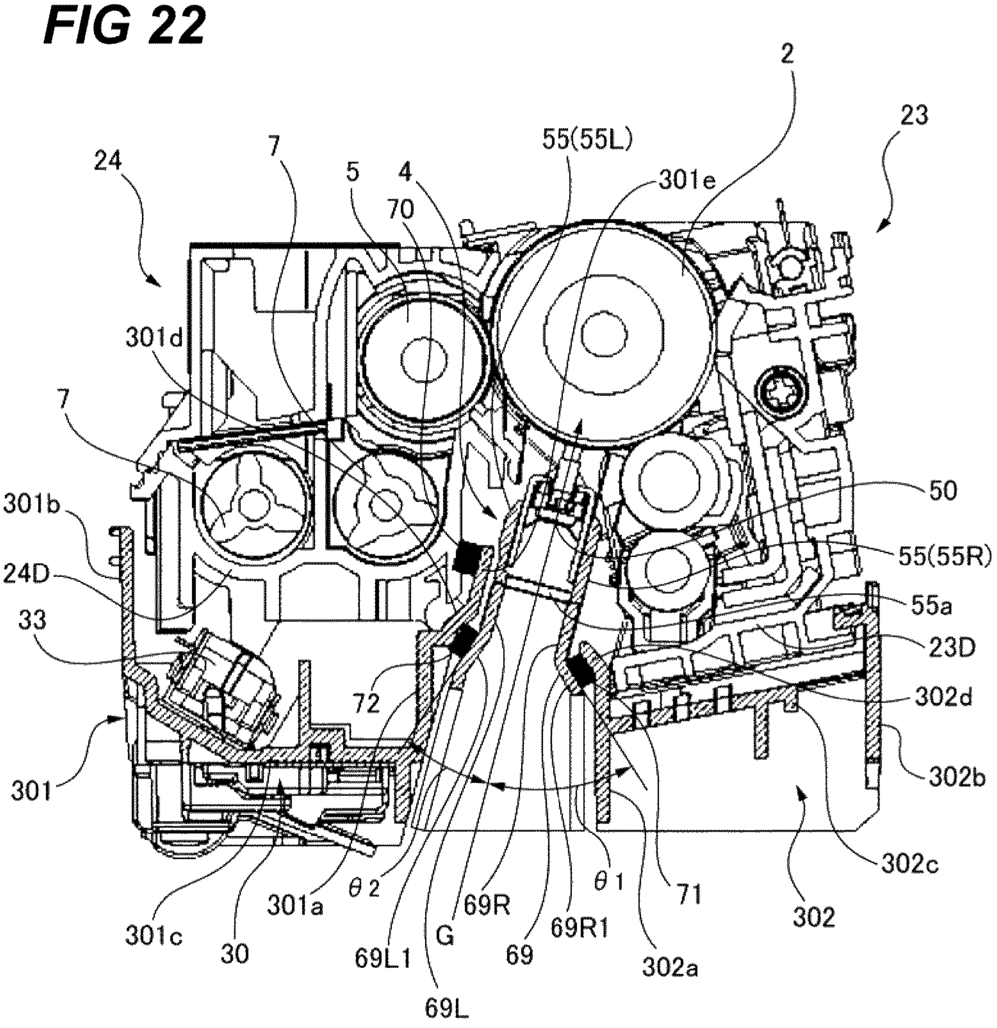
FIG. 22 is a cross-sectional view taken along line X-X in FIG. 20.

As illustrated in FIG. 22, the left side wall 55L which is the first side wall is provided between the housing 54 that holds the substrate 50 and the developing unit 24 which is a developing unit on one side in the lateral direction orthogonal to the axial direction of the photosensitive drum 2. As illustrated in FIG. 11, the left side wall 55L is provided across the axial direction of the photosensitive drum 2 so as to separate the housing 54 and the developing unit 24.

As illustrated in FIG. 22, the right side wall 55R which is the second side wall is provided between the housing 54 and the drum unit 23 which is an adjacent portion adjacent to the housing 54 on the other side in the lateral direction. Similarly to the left side wall, the right side wall 55R is provided across the axial direction of the photosensitive drum 2 so as to separate the housing 54 and the drum unit 23.

By providing the housing support member 55 integrally with the housing 54, the airflow sent from a duct unit 60 described later is blown to the back surface of the substrate 50 through the opening 55*a* between the left side wall 55L and the right side wall 55R of the housing support member 55. Moreover, the airflow blown onto the back surface of the substrate 50 is blown in a direction orthogonal to the back surface of the substrate 50.

As described above, the airflow blown from the opening 55*a* of the housing support member 55 to the back surface of the substrate 50 is separated from the developing unit 24 adjacent to the exposure head 4 by the left side wall 55L and separated from the drum unit 23 by the right side wall 55R. Therefore, the airflow for cooling the exposure head 4 introduced into the back surface of the substrate 50 does not leak to the side of the developing unit 24 adjacent to the exposure head 4, and the toner of the developing unit 24 can be prevented from scattering inside the image forming apparatus.

(Engagement Claw)

As illustrated in FIGS. 11 and 12, the exposure head 4 includes an engagement claw 55*b* and an engagement claw 55*c* which are first engagement portions. The engagement claw 55*b* and the engagement claw 55*c* are provided on the housing support member 55 of the exposure head 4, and engage with the elevating duct 69 by snap-fitting.

In the housing support member 55 of the exposure head 4, a bottom surface portion 55D between the opening 55*a* at one end (front side) in the longitudinal direction and the opening 55*a* adjacent thereto is defined as a first bottom surface portion 55D1. Similarly, the bottom surface portion 55D between the opening 55*a* at the other end (back side) in the longitudinal direction and the opening 55*a* adjacent thereto is defined as a second bottom surface portion 55D2. The engagement claw 55*b* that engages with the elevating duct 69 is provided on the lower surface of the first bottom surface portion 55D1. The engagement claw 55*c* that engages with the elevating duct 69 is provided on the lower surface of the second bottom surface portion 55D2. The first bottom surface portion 55D1 and the second bottom surface portion 55D2, that is, the bottom surface portion 55D, are facing portions facing an upper surface portion 69U of the elevating duct 69.

The engagement claws 55*b* and 55*c* as the first engagement portions are formed on the bottom surface portion 55D so as to protrude toward the elevating duct 69 in the moving direction of the elevating duct 69 described later, and are further formed to extend in the axial direction of the photosensitive drum 2 orthogonal to the protruding direction.

Specifically, the engagement claws 55*b* and 55*c* of the exposure head 4 are formed so as to protrude toward the elevating duct 69, and have a substantially L shape formed so as to extend in the axial direction of the photosensitive drum 2 orthogonal to the protruding direction. As will be described later, by sliding the exposure head 4, the substantially L-shaped claw ends of the engagement claws 55*b* and 55*c* are engaged with the edges of the engagement holes 69*b* and 69*c* by snap-fitting and integrated with the elevating duct 69.

(Shielding Wall)

Figure 19:
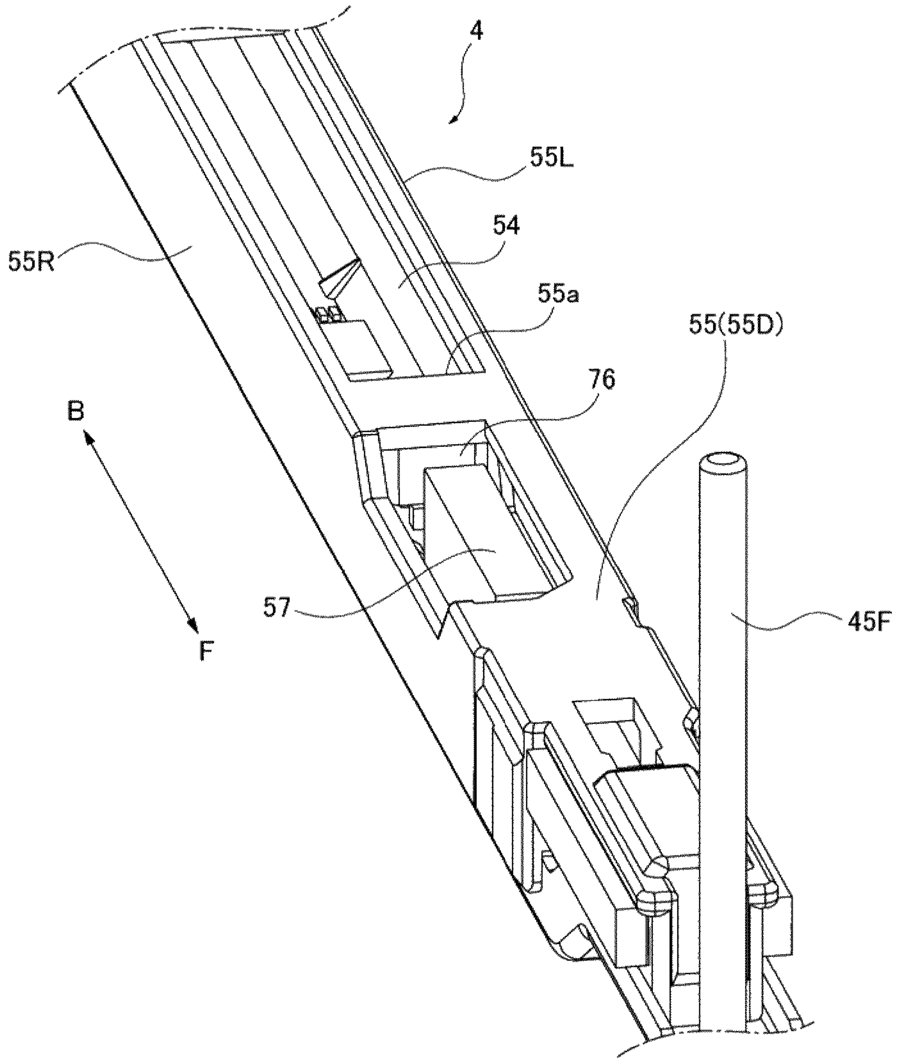
FIG. 19 is a perspective view of the connector side of the exposure head in which the housing and a housing support member are integrally configured as viewed from below.

The housing support member 55 includes a shielding wall 76. The shielding wall 76 will be described with reference to FIG. 19. FIG. 19 is a perspective view of the exposure head 4 in which the housing 54 and the housing support member 55 are integrally formed as viewed from below.

The housing support member 55 includes the shielding wall 76 for partitioning a connector region where the FFC connector 57 is disposed on the back surface of the substrate 50 and a duct region where the opening 55*a* on the back side in the front-back direction is present from the connector region for the reason described later.

The connector 57 is disposed at a position deviated to one end side from the center in the longitudinal direction of the substrate 50. On the other hand, a plurality of openings 55*a* is formed further on the other end side than the connector 57 in the longitudinal direction of the substrate 50. The shielding wall 76 is provided so as to partition the opening 55*a* and the connector 57.

The shielding wall 76 is provided on the bottom surface portion 55D of the housing support member 55. The shielding wall 76 is provided on the surface side of the bottom surface portion 55D facing the back surface of the substrate 50 so as to protrude in the direction of the back surface of the substrate 50. The shielding wall 76 is provided between the left side wall 55L and the right side wall 55R of the housing support member 55. The shielding wall 76 partitions a duct region on the back surface of the substrate 50 held by the housing 54 and a connector region of the FFC connector 57 mounted on the substrate 50 between the left side wall 55L and the right side wall 55R. Here, the duct region on the back surface of the substrate 50 is a region facing the opening 55*a* provided in the bottom surface portion 55D of the housing support member 55, and is a region (range La illustrated in FIG. 20) communicated with the opening portion 61 of the duct unit 60 through a closed space formed by the elevating duct 69 and the cartridge tray 30 to be described later. The connector region mounted on the back surface of the substrate 50 is a region on the back surface of the substrate where the FFC connector 57 is mounted, is a region outside the duct region (range La) in the axial direction of the photosensitive drum 2, is a region further on the front side than the duct region in the front-back direction, and is a region indicated by a range Lc in FIG. 20.

Figure 20:
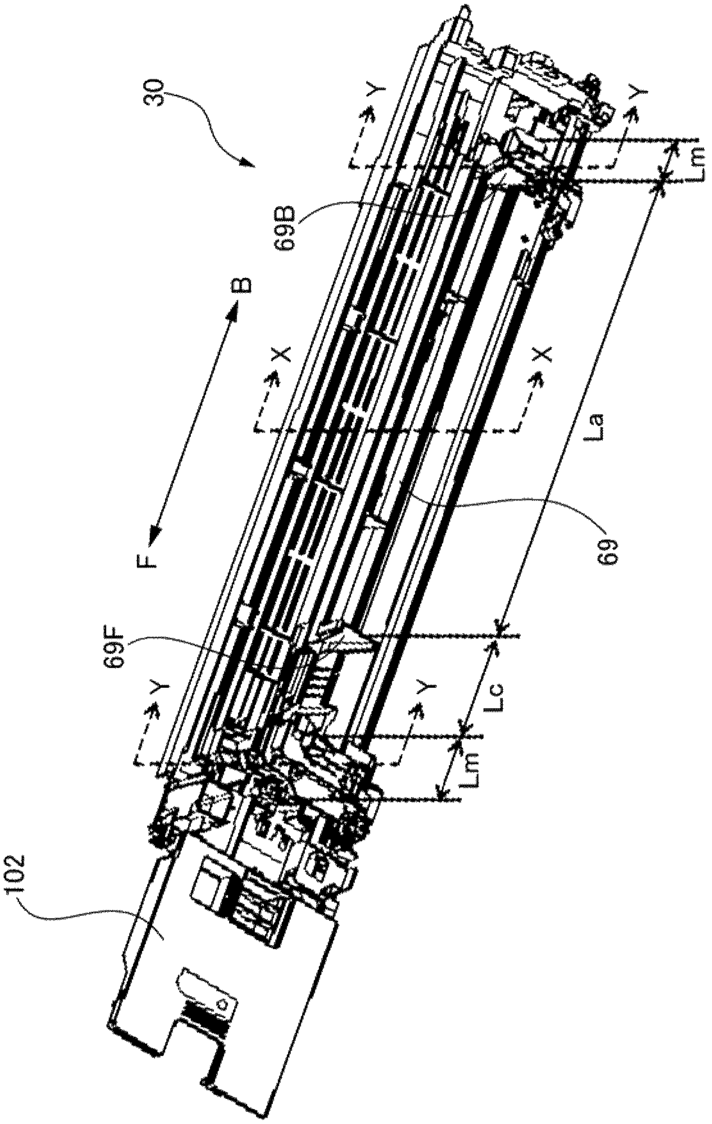
FIG. 20 is a perspective view of the cartridge tray.

As described above, the shielding wall 76 that partitions the range La (duct region) and the range Lc (connector region) illustrated in FIG. 20 is provided in the housing support member 55. As a result, the air blown to the back surface of the substrate 50 held by the housing 54 from the opening 55*a* of the housing support member 55 is prevented from leaking in the direction of the FFC connector 57 and the cooling capacity for the substrate 50 is prevented from deteriorating.

The shielding wall 76 partitions the duct region and the connector region such that the connector region is outside the duct region and on one end side in the axial direction of the photosensitive drum 2. Further, the shielding wall 76 partitions the duct region and the connector region such that the connector region is on the front side in the front-back direction of the image forming apparatus 100. Therefore, the FFC connector 57 is disposed as far forward as possible in order to make the range La as long as possible. As a result, the air blown to the back surface of the substrate 50 is blocked by the FFC 58 connected to the FFC connector 57, and is prevented from flowing in an unintended direction. In other words, the air blown toward the exposure head 4 from the duct unit 60 to be described later is blown to the back surface of the substrate 50 without being blocked by the FFC 58 connected to the FFC connector 57. The air blown against the back surface of the substrate 50 tends to flow in the space between the left side wall 55L and the right side wall 55R of the housing support member 55 along the longitudinal direction of the substrate 50. At this time, the airflow in the direction toward the connector region is blocked by the shielding wall 76, and the airflow blown against the back surface of the substrate 50 flows through the duct region from one side (front side) to the other side (back side). Therefore, the airflow blown from the duct unit 60 to be described later to the back surface of the substrate 50 can flow in an intended direction, and scattering of toner in the image forming apparatus due to the airflow flowing in an unintended direction can be prevented.

Figure 26:
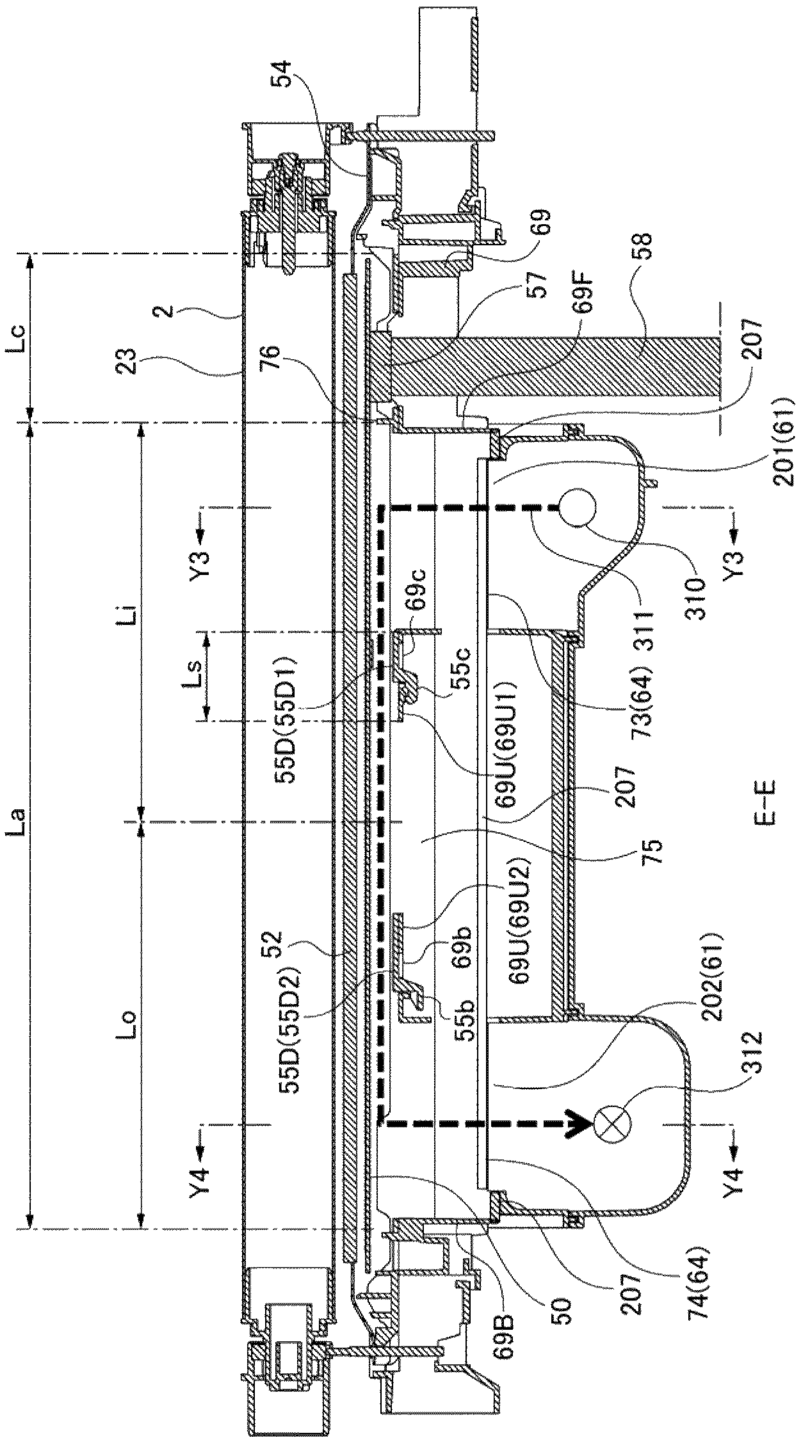
FIG. 26 is a cross-sectional view of an exposure cooling airflow in a direction perpendicular to an optical axis.

In FIG. 26, a range Li and a range Lo are ranges when the range La that is the duct region is divided into two equal parts of the intake side and the exhaust side. The range Li is a range on the intake side when the range La is divided into two equal parts of the intake side and the exhaust side. The range Lo is a range on the exhaust side when the range La is divided into two equal parts of the intake side and the exhaust side. A range Ls is a range in which the cross-sectional area of the airflow in the duct is locally narrowed in the range Li on the intake side in the range La that is the duct region.

As described above, the exposure head 4 is configured as an integrated head unit by the substrate including the LED, the lens array including the plurality of lenses, the housing 54, and the housing support member 55.

(Elevating Duct)

Figure 23:
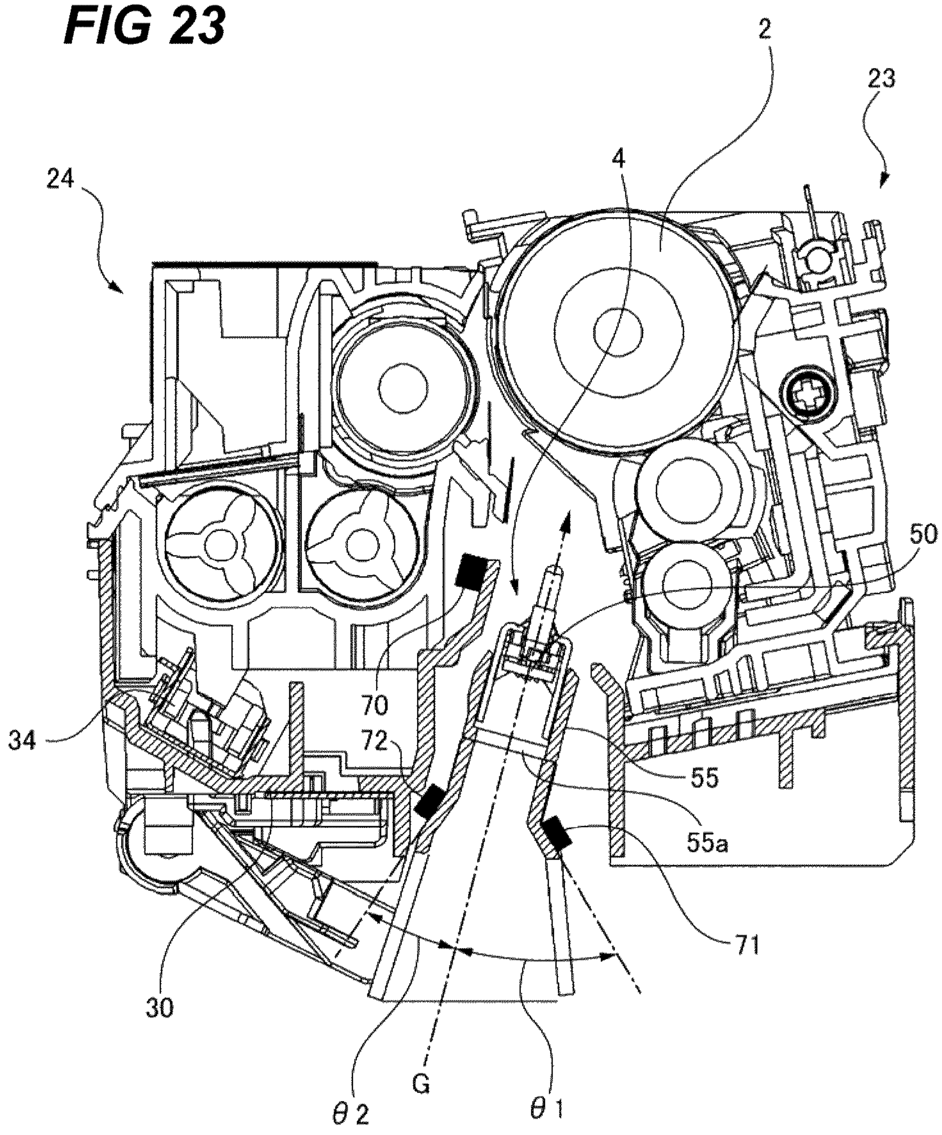
FIG. 23 is a cross-sectional view taken along line X-X in FIG. 20.
Figure 27:
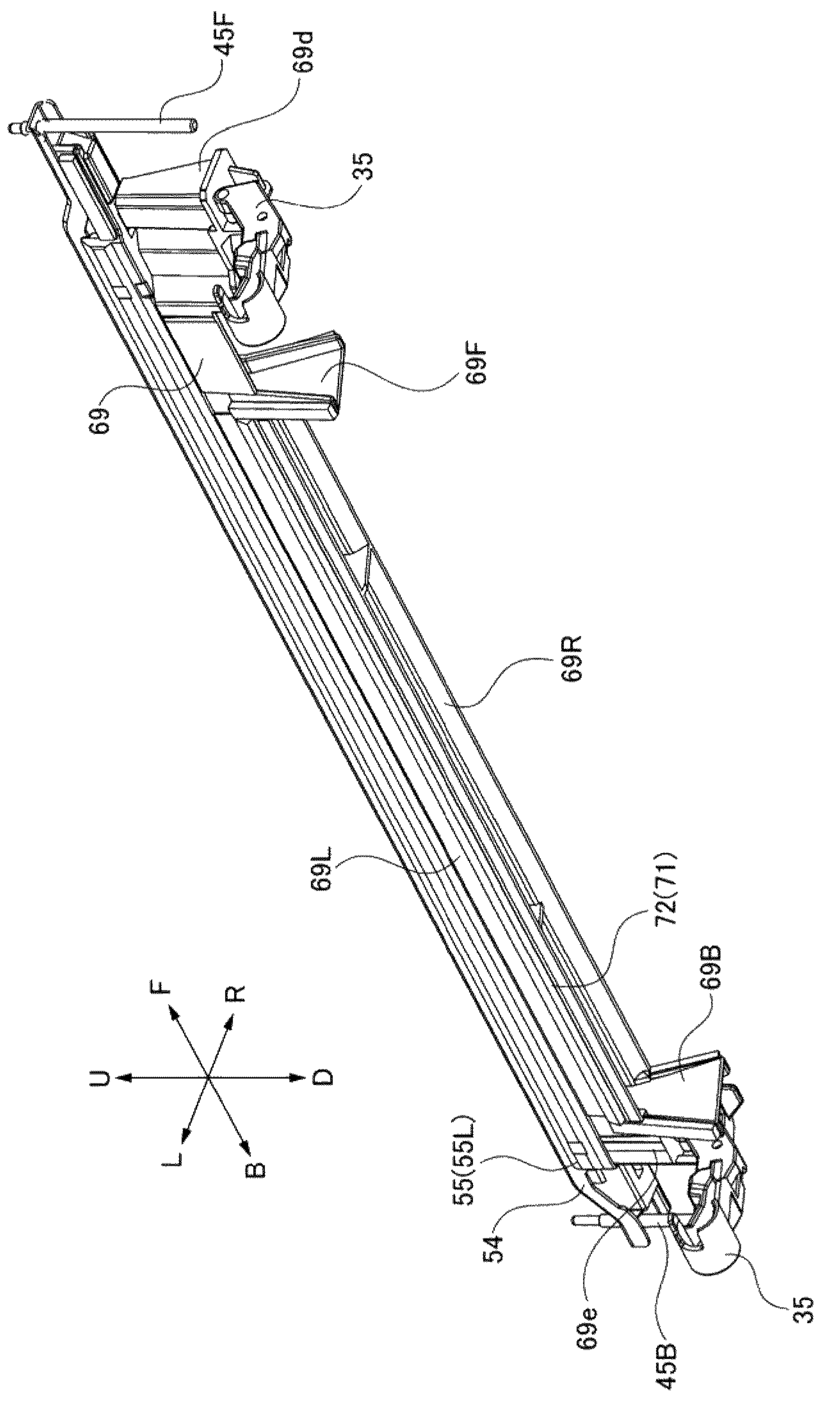
FIG. 27 is a perspective view of the exposure head, the elevating duct, and a rotating arm.
Figure 28:
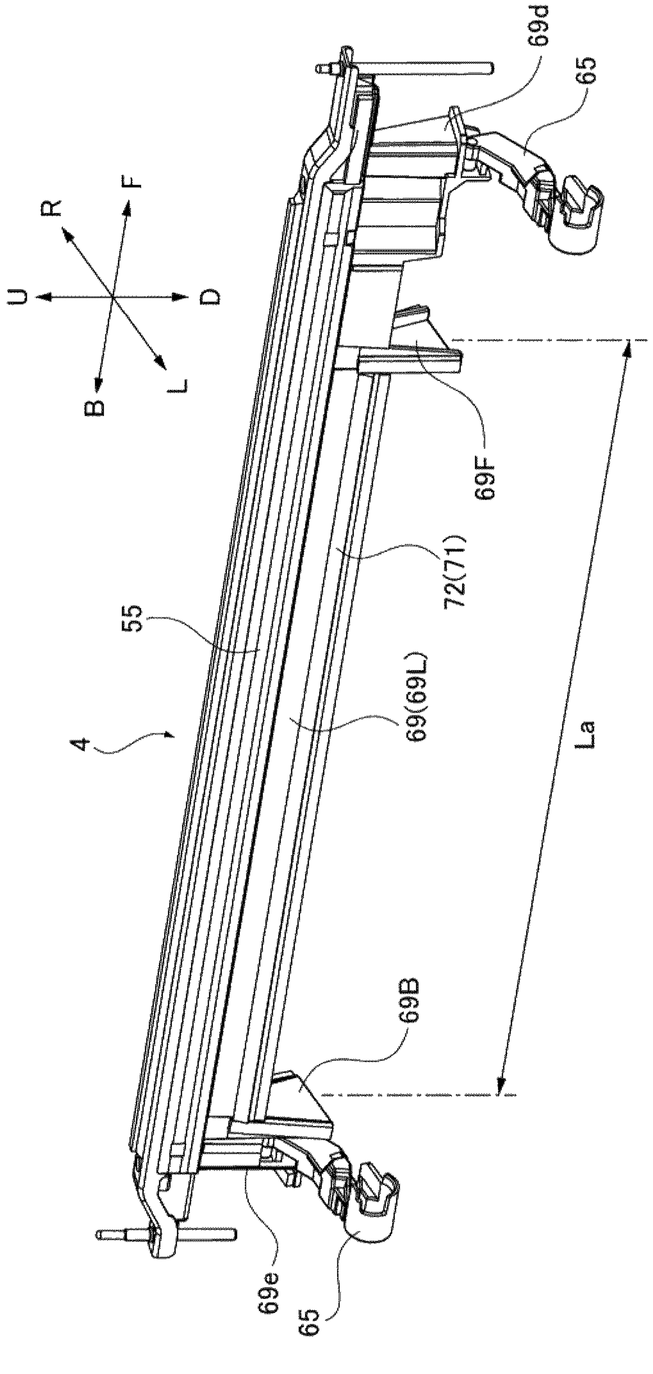
FIG. 28 is a perspective view of the exposure head, the elevating duct, and the rotating arm.

The image forming apparatus 100 includes the elevating duct 69. The elevating duct 69 will be described with reference to FIGS. 22, 23, 27, and 28. FIGS. 22 and 23 are cross-sectional views taken along line X-X in FIG. 20. FIGS. 27 and 28 are perspective views of the exposure head 4, the elevating duct 69, and the rotating arm 65.

The elevating duct 69 is an exposure support member that detachably supports the exposure head 4, and is provided in the apparatus main body of the image forming apparatus 100 together with a cartridge tray 30 to be described later.

The elevating duct 69 is provided between a developing support member 301 that supports the developing unit 24 of the cartridge tray 30 to be described later and a drum support member 302 that supports the drum unit 23. The elevating duct 69 is provided to be movable between an exposure position (see FIGS. 22 and 24) at which the photosensitive drum 2 is exposed and a retracted position (see FIGS. 25 and 23) retracted from the exposure position between the developing support member 301 and the drum support member 302 of the cartridge tray 30. Both end portions of the elevating duct 69 in the longitudinal direction are supported from below by the rotating arm 65 to be described later. The elevating duct 69 is moved in a direction (first direction, moving direction) orthogonal to the axial direction of the photosensitive drum 2 integrally with the exposure head 4 by the rotating arm 65. The elevating duct 69 is moved to the exposure position or the retracted position by the rotation of the rotating arm 65.

The elevating duct 69 has a longitudinal shape extending in the front-back direction (the axial direction of the photosensitive drum) similarly to the exposure head 4 so as to be able to support the entire exposure head 4, and a central portion thereof has a shape having openings in the vertical direction. The elevating duct 69 forms a duct in which one opening 69*a* communicates with the opening 55*a* of the exposure head 4 and the other opening portion 64 communicates with the opening portion 61 of the duct unit 60. The elevating duct 69 forms a part of a duct that cools the exposure head 4 while supporting the exposure head 4.

The elevating duct 69 has an upper surface portion 69U (see FIG. 26) facing the bottom surface portion 55D of the housing support member 55. The upper surface portion 69U of the elevating duct 69 is provided with a plurality of openings 69*a* in the longitudinal direction which is the axial direction of the photosensitive drum 2. The elevating duct 69 includes a duct left wall 69L, a duct right wall 69R facing the duct left wall 69L, a duct front wall 69F, and a duct back wall 69B facing the duct front wall 69F. The duct left wall 69L, the duct right wall 69R, the duct front wall 69F, and the duct back wall 69B are provided integrally with the upper surface portion 69U so as to surround the periphery of the upper surface portion 69U, that is, so as to surround the opening 69*a* provided in the upper surface portion 69U. As a result, the elevating duct 69 has a shape in which the upper surface portion 69U, the duct left wall 69L, the duct right wall 69R, the duct front wall 69F, and the duct back wall 69B are integrally formed and an opening is provided in the vertical direction. The elevating duct 69 forms a duct (closed space) that allows an airflow from the duct unit 60 described later to flow to the exposure head 4 through between the duct walls and the opening 69*a* of the upper surface portion 69U.

The plurality of openings 69*a* is provided at positions facing the plurality of openings 55*a* provided in the bottom surface portion 55D of the housing support member 55, respectively. In other words, similarly to the opening 55*a* of the housing support member 55, the opening 69*a* of the elevating duct 69 is provided at a position facing the back surface of the substrate 50. In other words, the elevating duct 69 has the opening 69*a* communicating with the opening 55*a* of the exposure head 4.

The duct left wall 69L, which is the first duct wall, is provided on the left side, which is one side in the lateral direction orthogonal to the axial direction of the photosensitive drum 2, through the opening 69*a*. That is, the duct left wall 69L is provided along the axial direction of the photosensitive drum 2 from the duct front wall 69F to the duct back wall 69B at a position facing the developing unit 24 as a developing unit.

The duct left wall 69L has a first inclined surface 69L1 inclined in a direction away from the duct right wall 69R from the upstream side to the downstream side in the moving direction from the exposure position to the retracted position. The first inclined surface 69L1 is similarly inclined from the duct front wall 69F to the duct back wall 69B. The first inclined surface 69L1 is provided at a position facing the developing support member 301 on the duct left wall 69L, and forms a predetermined angle θ2 with respect to the moving direction (direction of arrow G illustrated in FIG. 22).

The duct right wall 69R, which is the second duct wall, is provided on the right side, which is the other side in the lateral direction, through the opening 69*a*. That is, the duct right wall 69R is provided along the axial direction of the photosensitive drum 2 from the duct front wall 69F to the duct back wall 69B at a position facing the drum unit 23 which is an adjacent portion adjacent to the elevating duct 69.

The duct right wall 69R has a second inclined surface 69R1 inclined in a direction away from the duct left wall 69L from the upstream side to the downstream side in the moving direction from the exposure position to the retracted position. The second inclined surface 69R1 is similarly inclined from the duct front wall 69F to the duct back wall 69B. The second inclined surface 69R1 is provided at a position facing the drum support member 302 on the duct right wall 69R, and forms a predetermined angle θ1 with respect to the moving direction (direction of arrow G illustrated in FIG. 22).

The duct front wall 69F, which is a third duct wall, is provided outside the plurality of openings 69*a* provided in the upper surface portion 69U in the axial direction of the photosensitive drum.

The duct back wall 69B, which is a fourth duct wall, is provided outside the plurality of openings 69*a* provided in the upper surface portion 69U in the axial direction of the photosensitive drum.

The plurality of openings 69*a* provided in the upper surface portion 69U of the elevating duct 69 are provided between the duct left wall 69L and the duct right wall 69R and between the duct front wall 69F and the duct back wall 69B.

In other words, the elevating duct 69 is formed in a hollow shape having no opening at a position facing the developing unit 24 and the drum unit 23 and having an opening in the vertical direction by these duct walls.

Accordingly, the elevating duct 69 allows an air flow generated by the duct unit 60 described later to flow to the back surface of the substrate 50 of the exposure head 4 through the opening portion 64 described later and the opening 69*a* between the duct left wall 69L and the duct right wall 69R. Therefore, the elevating duct 69 can allow the airflow from the duct unit 60 to flow to the back surface of the substrate 50 of the exposure head 4 without leaking the airflow to the side of the adjacent developing unit 24 or drum unit 23, and the scattering of the toner inside the apparatus can be reduced.

Further, the duct front wall 69F and the duct back wall 69B extend downward further than the duct left wall 69L and the duct right wall 69R in the moving direction. In other words, the duct front wall 69F and the duct back wall 69B are ribs protruding in the direction of the duct unit 60 described later on both outer sides in the longitudinal direction of the opening 69*a* communicating with the exposure head 4.

The elevating duct 69 integrally supports the exposure head 4 and communicates with the duct unit 60 to be described later, thereby forming a duct (a part of a second cooling duct) that allows an airflow from the duct unit 60 to flow to the exposure head 4 through the opening 69*a*. The duct walls 69F and 69B as the ribs form a part of the duct at the exposure position.

The duct front wall 69F and the duct back wall 69B form an opening portion 64 (see FIG. 21) communicating with an opening portion 61 (see FIG. 35) of the duct unit 60 described later together with the cartridge tray 30 described later.

Further, the elevating duct 69 includes a first engagement portion 69*d* and a second engagement portion 69*e* which are engaged with the rotating arm 65 at both end portions in the longitudinal direction. The first engagement portion 69*d* is provided outside the duct front wall 69F on one end side in the longitudinal direction. Further, the first engagement portion 69*d* is provided outside a region provided with the FFC connector 57 located outside the duct front wall 69F on one end side in the longitudinal direction. The second engagement portion 69*e* is provided outside the duct back wall 69B on the other end side in the longitudinal direction.

Therefore, the region (range Lm in FIG. 20) where the first engagement portion 69*d* is provided and the region (range Lm in FIG. 20) where the second engagement portion 69*e* is provided are provided outside the duct region (range La in FIG. 20) where the opening 69*a* is surrounded by the duct wall. In other words, the duct region (range La in FIG. 20) where the opening 69*a* is surrounded by the duct wall is provided between the region (range Lm in FIG. 20) where the first engagement portion 69*d* is provided and the region (range Lm in FIG. 20) where the second engagement portion 69*e* is provided.

A region (range Lc in FIG. 20) where the FFC connector 57 is provided is provided outside the duct region (range La in FIG. 20) where the opening 69*a* is surrounded by the duct wall to form a duct, and between the duct region and the region (range Lm in FIG. 20) where the first engagement portion 69*d* is provided.

In addition, the range La forming the duct includes most of the substrate 50 on which the LED 51 is mounted, and the exposure head 4 can be sufficiently cooled by blowing the airflow to the range La. Note that the range Lc is a mounting portion of the FFC connector 57 of a signal line that transmits a drive signal to the substrate 50 on which the LED 51 is mounted. The range Lc is not provided with an opening for forming a duct, but is configured to enable necessary and sufficient cooling in the range La as described above.

As a result, the air taken in from the outside of the apparatus by the duct unit 60 to be described later is blown against the back surface of the substrate 50 from the opening 55*a* of the exposure head 4 through the elevating duct 69 (see FIG. 37). The airflow blown from the opening 55*a* of the exposure head 4 to the back surface of the substrate 50 is exhausted to the outside of the apparatus by the duct unit 60 through the elevating duct 69 (see FIG. 39).

(Engagement Hole)

As illustrated in FIG. 26, the elevating duct 69 has an engagement hole 69*b* and an engagement hole 69*c* which are second engagement portions. The engagement hole 69*b* and the engagement hole 69*c* which are the second engagement portions are engaged with the engagement claw 55*b* and the engagement claw 55*c* which are the first engagement portions of the exposure head 4 by snap-fitting.

In the elevating duct 69, the upper surface portion 69U between the opening 69*a* at one end (front side) in the longitudinal direction and the opening 69*a* adjacent thereto is defined as a first upper surface portion 69U1. Similarly, the upper surface portion 69U between the opening 69*a* at the other end (back side) in the longitudinal direction and the opening 69*a* adjacent thereto is defined as a second upper surface portion 69U2. The first upper surface portion 69U1 is provided with the engagement hole 69*b* to be engaged with the engagement claw 55*b* of the exposure head 4. The second upper surface portion 69U2 is provided with the engagement hole 69*c* to be engaged with the engagement claw 55*c* of the exposure head 4. The first upper surface portion 69U1 and the second upper surface portion 69U2, that is, the upper surface portion 69U are support portions that face the bottom surface portion 55D of the exposure head 4 (housing support member 55) and detachably support the exposure head 4.

The engagement holes 69*b* and 69*c* as the second engagement portions are formed in the upper surface portion 69U facing the exposure head 4 at positions corresponding to the engagement claws 55*b* and 55*c*.

Thus, the exposure head 4 is configured to be detachable from the image forming apparatus 100. The exposure head 4 is moved (in the downward direction D illustrated in FIG. 49) so that the engagement claws 55*b* and 55*c* of the exposure head 4 are dropped inside the engagement holes 69*b* and 69*c* of the elevating duct 69, respectively, and the bottom surface portion 55D of the exposure head 4 abuts against the upper surface portion 69U of the elevating duct 69. That is, the exposure head 4 is moved in the direction orthogonal to the axial direction with respect to the elevating duct 69 to engage the engagement claws 55*b* and 55*c* with the engagement holes 69*b* and 69*c* in the protruding direction.

Thereafter, by moving the exposure head 4 along the upper surface portion 69U of the elevating duct 69 (backward direction B illustrated in FIG. 52), the engagement claws 55*b* and 55*c* of the exposure head 4 are respectively engaged with the engagement holes 69*b* and 69*c* of the elevating duct 69 by snap-fitting.

That is, the exposure head 4 is moved in the axial direction with respect to the elevating duct 69 to engage the engagement claws 55*b* and 55*c* with the engagement holes 69*b* and 69*c* in the extending direction orthogonal to the protruding direction. In this manner, the exposure head 4 is connected to the elevating duct 69 in the image forming apparatus 100, and the exposure head 4 is integrated with the elevating duct 69. The procedure of detaching the exposure head 4 from the elevating duct 69 is reverse to the procedure described above. The replacement and attachment or detachment configuration of the exposure head will be described later in detail.

(Cartridge Tray)

Figure 21:
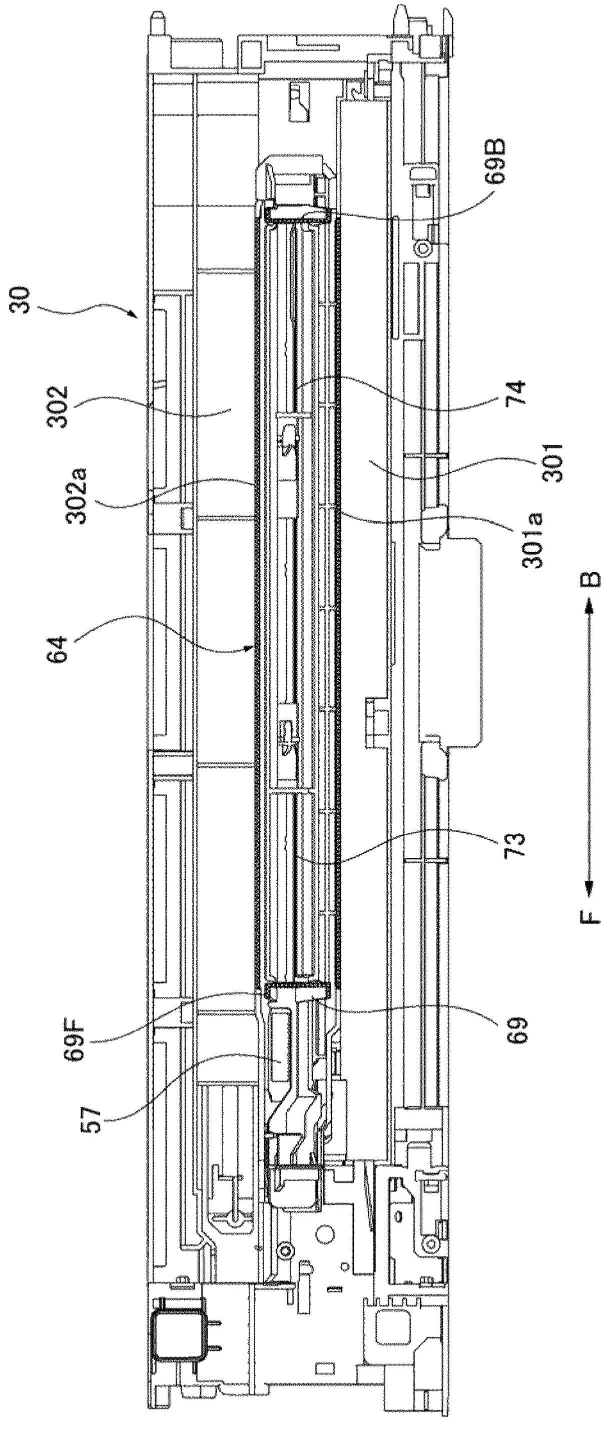
FIG. 21 is a bottom view of the cartridge tray and an elevating duct.

The image forming apparatus 100 includes the cartridge tray 30. The cartridge tray 30 will be described with reference to FIGS. 8, 9, 20, 22, and 21. FIGS. 8, 9, and 20 are perspective views of the cartridge tray 30. FIG. 21 is a view of the cartridge tray 30 as viewed from the lower surface.

The cartridge tray 30 is a support member that supports the drum unit 23 and the developing unit 24 described above, and guides and supports the attaching and detaching operation along the axial direction of the photosensitive drum 2. The cartridge tray 30 axially supports a rotation shaft 102*a* of the inner door 102 such that the inner door 102 is rotatable within a predetermined range.

The cartridge tray 30 is provided for each image forming portion. Each cartridge tray 30 includes the developing support member 301 that guides and supports the attaching and detaching operation of the developing unit 24 along the axial direction of the photosensitive drum 2, and the drum support member 302 that guides and supports the attaching and detaching operation of the drum unit 23 along the axial direction of the photosensitive drum 2. In the cartridge tray 30, the developing support member 301 and the drum support member 302 are integrally formed. The cartridge tray 30 is not limited to a configuration to be provided for each image forming portion.

The elevating duct 69 is movably disposed between the developing support member 301 and the drum support member 302 of the cartridge tray 30. In the elevating duct 69, the first engagement portion 69*d* and the second engagement portion 69*e* at both ends in the longitudinal direction are supported by the rotating arm 65 from below between the developing support member 301 and the drum support member 302. Although described later, the rotating arm 65 is rotatably provided on the developing support member 301 of the cartridge tray 30. The exposure head 4 is detachably attached to the elevating duct 69 movably arranged on the cartridge tray 30. In other words, the cartridge tray 30 is a support member that supports the exposure head 4, and guides and supports the attaching and detaching operation along the axial direction of the photosensitive drum 2.

(Developing Support Member)

The developing support member 301 is a developing support member that guides and supports the attaching and detaching operation of the developing unit 24 along the axial direction of the photosensitive drum, and is a member having a longitudinal shape extending in the axial direction of the photosensitive drum 2. The developing support member 301 includes a first developing guide portion 301*a*, a second developing guide portion 301*b* facing the first developing guide portion 301*a*, and a developing bottom surface portion 301*c* provided between the first developing guide portion 301*a* and the second developing guide portion 301*b*. In the developing support member 301, the first developing guide portion 301*a*, the second developing guide portion 301*b*, and the developing bottom surface portion 301*c* are integrally formed.

The developing bottom surface portion 301*c* faces the bottom surface portion 24D of the frame body of the developing unit 24 with a space therebetween, and is provided over the longitudinal direction which is the axial direction of the photosensitive drum 2. The first developing guide portion 301*a* is provided on one end side in the lateral direction orthogonal to the longitudinal direction of the developing bottom surface portion 301*c*, and is provided between the elevating duct 69 and the developing unit 24 so as to separate the elevating duct 69 and the developing unit 24. The second developing guide portion 301*b* is provided on the other end side in the lateral direction of the developing bottom surface portion 301*c*, and is provided so as to face the first developing guide portion 301*a*. The first developing guide portion 301*a* and the second developing guide portion 301*b* abut on the frame body of the developing unit 24, and guide, in the longitudinal direction, the developing unit 24 inserted and removed in the longitudinal direction.

The first developing guide portion 301*a* includes a facing portion 301*d* facing the first inclined surface 69L1 of the elevating duct 69. The facing portion 301*d* has a first tray inclined surface which is inclined similarly to the first inclined surface 69L1 of the elevating duct 69.

The first developing guide portion 301*a* includes a partition wall portion 301*e* on the downstream side of the facing portion 301*d* in the moving direction from the retracted position to the exposure position of the elevating duct 69. The partition wall portion 301*e* is provided between the exposure head 4 and the developing unit 24 so as to separate the exposure head 4 located at the exposure position illustrated in FIG. 22 from the developing unit 24. The partition wall portion 301*e* is an end portion (upper end portion) on the developing sleeve side in the first developing guide portion 301*a*.

As illustrated in FIGS. 2, 8, and 22, the developing support member 301 (cartridge tray 30) is disposed immediately below the developing unit 24. The upper surface of the developing support member 301 (cartridge tray 30) and the bottom surface of the developing unit 24 form a duct that is a closed space, and function as an intermediate path of a development cooling airflow to be described later in addition to a guide of the attaching and detaching operation of the developing unit.

As will be described later, in the duct (closed space) formed by the upper surface of the cartridge tray 30 (developing support member 301) and the upper surface of the developing unit 24, the opening on one end side (front side) in the longitudinal direction communicates with an opening 41*a* of a front-side duct 41 that takes in air from the outside of the apparatus through the opening 102*c* of the inner door 102. Further, the duct has an opening on the other end side (back side) in the longitudinal direction that communicates with an opening 42*a* of a back-side duct 42 that exhausts air to the outside of the apparatus. The duct between the developing unit 24 and the developing support member 301 forms one closed space communicating with the front-side duct 41 and the back-side duct 42 (see FIG. 34).

(Drum Support Member)

The drum support member 302 is a photoconductor support member that guides and supports the attaching and detaching operation of the drum unit 23 along the axial direction of the photosensitive drum, and is a member having a longitudinal shape extending in the axial direction of the photosensitive drum 2. The drum support member 302 includes a first drum guide portion 302*a*, a second drum guide portion 302*b* facing the first drum guide portion 302*a*, and a drum bottom surface portion 302*c* provided between the first drum guide portion 302*a* and the second drum guide portion 302*b*. In the drum support member 302, the first drum guide portion 302*a*, the second drum guide portion 302*b*, and the drum bottom surface portion 302*c* are integrally formed.

The drum bottom surface portion 302*c* faces the bottom surface portion 23D of the frame body of the drum unit 23 and is provided over the longitudinal direction which is the axial direction of the photosensitive drum 2. The first drum guide portion 302*a* is provided on one end side in the lateral direction orthogonal to the longitudinal direction of the drum bottom surface portion 302*c*, and is provided between the elevating duct 69 and the drum unit 23 so as to separate the elevating duct 69 and the drum unit 23. The second drum guide portion 302*b* is provided on the other end side in the lateral direction of the drum bottom surface portion 302*c*, and is provided so as to face the first drum guide portion 302*a*. Each of the first drum guide portion 302*a* and the second drum guide portion 302*b* abuts on the frame body of the drum unit 23 and guides, in the longitudinal direction, the drum unit 23 inserted and removed in the longitudinal direction.

The first drum guide portion 302*a* includes a facing portion 302*d* facing the second inclined surface 69R1 of the elevating duct 69. The facing portion 302*d* has a second tray inclined surface which is inclined similarly to the second inclined surface 69R1 of the elevating duct 69.

(Relationship Between Cartridge Tray and Elevating Duct)

Here, a relationship between the cartridge tray 30 and the elevating duct 69 will be described.

The elevating duct 69 is movably disposed between the first developing guide portion 301*a* and the first drum guide portion 302*a* in the cartridge tray 30, and is moved between the exposure position illustrated in FIG. 24 and the retracted position illustrated in FIG. 25 by rotation of the rotating arm 65 described later. That is, the first developing guide portion 301*a* and the first drum guide portion 302*a* of the cartridge tray 30 function as guide members that guide the elevating duct 69 in the moving direction thereof.

When the exposure head 4 is detachably mounted, the opening 55*a* of the exposure head 4 and the opening 69*a* of the elevating duct 69 communicate with each other and the elevating duct 69 is integrated with the exposure head 4. The elevating duct 69 is separated from the developing unit 24 by the first developing guide portion 301*a* of the cartridge tray 30, and is separated from the drum unit 23 by the first drum guide portion 302*a* of the cartridge tray 30. Further, a gap between the elevating duct 69 and the first developing guide portion 301*a* is sealed by a seal 72 which is a sealing member described later at the exposure position illustrated in FIG. 22. Similarly, a gap between the elevating duct 69 and the first drum guide portion 302*a* is sealed by a seal 71 which is a sealing member described later at the exposure position illustrated in FIG. 22.

In this manner, the cartridge tray 30 and the elevating duct 69 disposed between the first developing guide portion 301*a* and the first drum guide portion 302*a* of the cartridge tray 30 form a duct that is a closed space communicating with the opening 55*a* of the exposure head 4.

(Relationship Among Cartridge Tray, Elevating Duct, and Duct Unit)

Further, the cartridge tray 30 and the elevating duct 69 form the opening portion 64 communicating with the opening portion 61 of the duct unit 60 on a side facing the duct unit 60 to be described later.

The opening portion 64 formed by the cartridge tray 30 and the elevating duct 69 will be described with reference to FIGS. 22 and 21.

As illustrated in FIG. 21, the opening portion 64 formed by the cartridge tray 30 and the elevating duct 69 is formed by the developing support member 301, the drum support member 302, and the elevating duct 69 between the developing support member 301 and the drum support member 302. More specifically, the opening portion 64 is formed by the developing guide portion 301*a* of the developing support member 301, the drum guide portion 302*a* of the drum support member 302, and the duct front wall 69F and the duct back wall 69B of the elevating duct 69 between the developing guide portion 301*a* and the drum guide portion 302*a*.

In this manner, the cartridge tray 30 and the elevating duct 69 form the opening portion 64 communicating with the opening portion 61 of the duct unit 60 on the side facing the duct unit 60 to be described later. Then, by attaching the duct unit 60 to be described later to the image forming apparatus 100, the opening portion 61 of the duct unit 60 is pressed from below against the opening portion 64 formed by the cartridge tray 30 and the elevating duct 69. As a result, the opening portion 64 formed by the cartridge tray 30 and the elevating duct 69 communicates with the opening portion 61 of the duct unit.

Note that a space between the opening portion 64 formed by the cartridge tray 30 and the elevating duct 69 and the opening portion 61 of the duct unit is sealed by a sealing member 207 to be described later.

(Relationship Between Rib of Elevating Duct and Duct Unit)

Further, the duct front wall 69F and the duct back wall 69B which are ribs of the elevating duct 69 will be described in detail.

Figure 37:
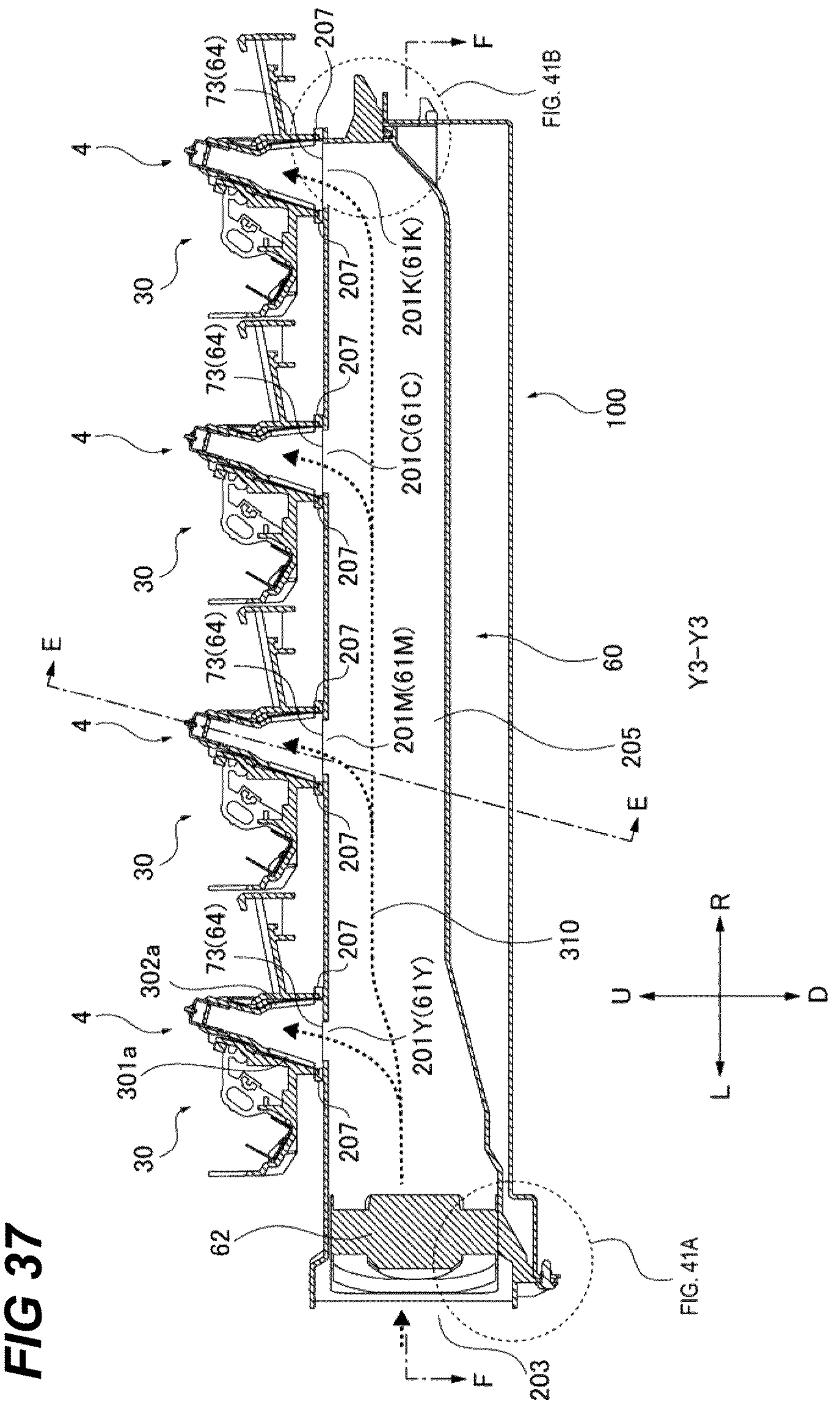
FIG. 37 is a cross-sectional view of an intake side of the exposure cooling airflow.

As will be described later, among the sealing members 207 provided in the opening portion 61 of the duct unit 60, the sealing member 207 provided in the longitudinal direction is sandwiched between the duct unit 60 and the first developing guide portion 301*a* and the first drum guide portion 302*a* of the cartridge tray 30 facing the duct unit to seal the space therebetween, as illustrated in FIG. 37. The first developing guide portion 301*a* and the first drum guide portion 302*a* of the cartridge tray 30 are disposed on both side surfaces in the left-right direction of the elevating duct 69 (see FIG. 22).

Therefore, the sealing of the left and right ends of the opening of the elevating duct 69, that is, the boundary with the duct unit 60 in the longitudinal direction in the range La illustrated in FIG. 20 is performed by sealing the space between the duct unit 60 and the cartridge tray 30 with the sealing member 207. Therefore, the sealed state is always maintained without being affected by the moving operation of the elevating duct 69.

On the other hand, at the front end and the back end of the opening of the elevating duct 69, that is, at the boundary between the range La and the range Lc and the boundary between the range La and the range Lm illustrated in FIG. 20, another sealing configuration is required. This is because the boundary between the front end and the back end of the opening of the elevating duct 69 and the duct unit 60 cannot be sealed as between the cartridge tray 30 and the duct unit 60.

In the present embodiment, front and back ends between with the opening portion 61 (see FIG. 35) of the duct unit 60 are sealed by the duct front wall 69F and the duct back wall 69B illustrated in FIG. 28.

Figure 29:
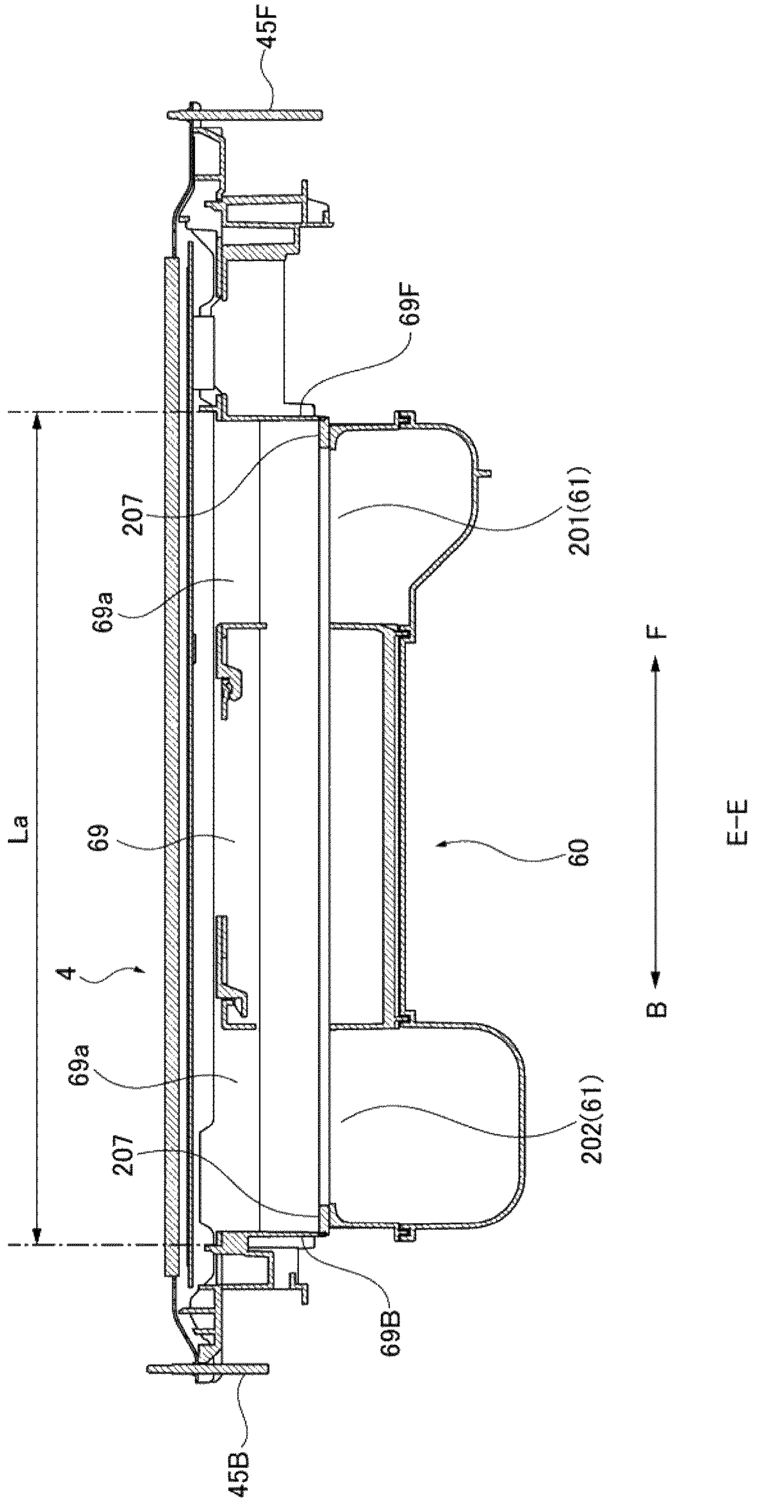
FIG. 29 is a cross-sectional view taken along line E-E in FIG. 37.
Figure 30:
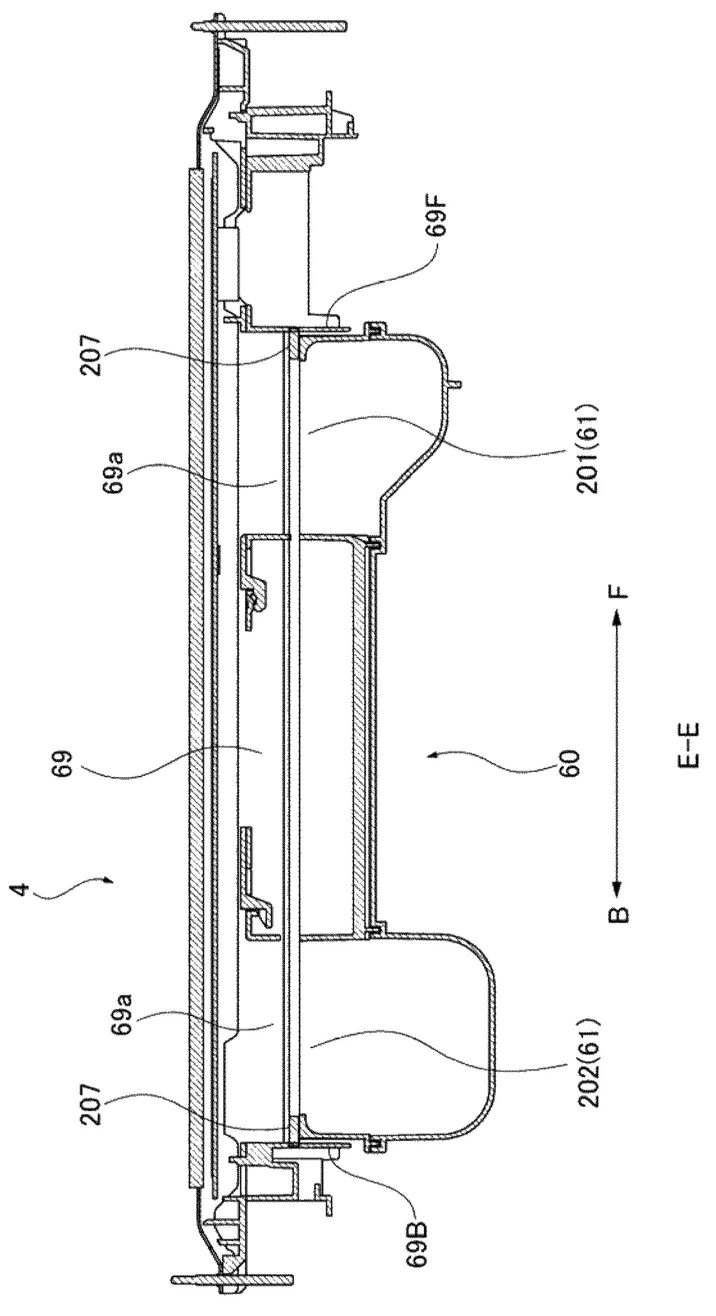
FIG. 30 is a cross-sectional view taken along line E-E in FIG. 37.

FIGS. 29 and 30 illustrate cross sections of the exposure head 4, the elevating duct 69, and the duct unit 60. The position of the cross section illustrated in FIGS. 29 and 30 is a position in the direction of arrow E-E illustrated in FIG. 37, and the cartridge tray 30 is not illustrated. FIG. 29 is a cross-sectional view illustrating the arrangement of the elevating duct 69 moved to the exposure position. FIG. 30 is a cross-sectional view illustrating the arrangement of the elevating duct 69 moved to the retracted position.

The duct front wall 69F and the duct back wall 69B of the elevating duct 69 are disposed outside the duct region (range La in FIG. 20) where the opening 69*a* of the elevating duct 69 is provided in the axial direction of the photosensitive drum 2. The duct front wall 69F and the duct back wall 69B have such lengths as to protrude toward the duct unit 60 to be described later and to overlap a side surface of the duct unit 60 in a moving direction of the elevating duct 69 (see FIGS. 29 and 30). The duct front wall 69F and the duct back wall 69B have such lengths that the duct front wall 69F and the duct back wall 69B overlap the side surfaces of the sealing member 207 provided in the opening portion 61 of the duct unit 60 when the exposure head 4 is at the exposure position. Both at the exposure position shown in FIG. 29 and at the retracted position shown in FIG. 30, the side surfaces of the duct front wall 69F and the duct back wall 69B on the opening 69*a* side come into contact with the side surface on the outer side in the longitudinal direction of the sealing member 207 provided in the opening portion 61 of the duct unit 60 described later. In other words, the duct front wall 69F and the duct back wall 69B have such lengths that the side surface on the opening 69*a* side comes into contact with the side surface on the outer side in the longitudinal direction of the sealing member 207 provided in the opening portion 61 of the duct unit 60 described later at the exposure position illustrated in FIG. 22.

In the exposure position shown in FIG. 29, in the elevating duct 69, the side surface of the duct front wall 69F and the side surface of the duct back wall 69B form the front and back end walls of the range La. The sealing between the duct front wall 69F and the duct back wall 69B and the duct unit 60 is performed by bringing side surfaces of the sealing member 207 on the upper surface of the duct unit 60 into contact with side surfaces of the duct front wall 69F and the duct back wall 69B.

In the retracted position illustrated in FIG. 30, the elevating duct 69 is retracted such that the side surface of the duct front wall 69F and the side surface of the duct back wall 69B overlap the outside of the side surface of the duct unit 60, and does not interfere with the duct unit 60.

As illustrated in FIG. 28, the duct left wall 69L and the duct right wall 69R included in the elevating duct 69 are shorter in length in the moving direction (UD axial direction) than the duct front wall 69F and the duct back wall 69B. The duct left wall 69L and the duct right wall 69R of the elevating duct 69 have such lengths that they do not protrude below the cartridge tray 30 when the exposure head 4 is at the retracted position (see FIG. 23).

In other words, the duct left wall 69L and the duct right wall 69R of the elevating duct 69 in the range La illustrated in FIG. 20 are lower in height in the moving direction than the duct front wall 69F and the duct back wall 69B at both end portions outside the range La. FIG. 28 is a perspective view illustrating a state in which the exposure head 4 and the elevating duct 69 are engaged and integrated. As shown in FIG. 28, in the front-back direction, the duct left wall 69L (and the duct right wall 69R) in the range La is configured to be low with the duct front wall 69F and the duct back wall 69B as boundaries.

This is to prevent the lower ends of the duct left wall 69L and the duct right wall 69R in the range La of the elevating duct 69 from protruding from the cartridge tray 30 and from entering the inside of the duct unit 60 even by the retracting operation of the elevating duct 69 from the photosensitive drum 2.

Even if the duct left wall 69L and the duct right wall 69R in the range La of the elevating duct 69 are configured to enter the inside of the duct unit 60 without being lowered, sealing is possible. In this case, the third opening portion 201 and the fourth opening portion 202 on the upper surface of the duct unit 60 need to have a size that allows the retracted elevating duct 69 to enter, and further, a space for housing the retracted elevating duct 69 inside the duct unit 60 is required. This is a restriction on the shape of the duct unit 60. In addition, there are restrictions on the assembly order of the duct units 60. Therefore, it is desirable that the duct left wall 69L and the duct right wall 69R in the range La of the elevating duct 69 be kept lower than the duct front and back walls and not protrude downward from the cartridge tray 30 at the retracted position of the exposure head 4.

With such a configuration, when the exposure head 4 is moved to the retracted position, the lower ends of the duct left wall 69L and the duct right wall 69R do not enter the inside of the duct unit 60 and do not hinder the movement.

With such a configuration, the elevating duct 69 which is moved integrally with the exposure head 4 forms a duct which guides air from the duct unit 60 to the exposure head 4, and has a sealing property with respect to the duct unit 60, so that toner scattering into the image forming apparatus can be reduced.

The configuration in which the duct front wall 69F and the duct back wall 69B of the elevating duct 69 overlap the side surface on the outer side of the opening portion 61 of the duct unit 60 at the retracted position illustrated in FIG. 30 is exemplified. However, the present invention is not limited thereto. For example, among the duct left wall 69L, the duct right wall 69R, the duct front wall 69F, and the duct back wall 69B, only the duct front wall 69F and the duct back wall 69B may enter the inside of the opening portions 201 and 202 of the duct unit 60.

(Development Stay)

Figure 31:
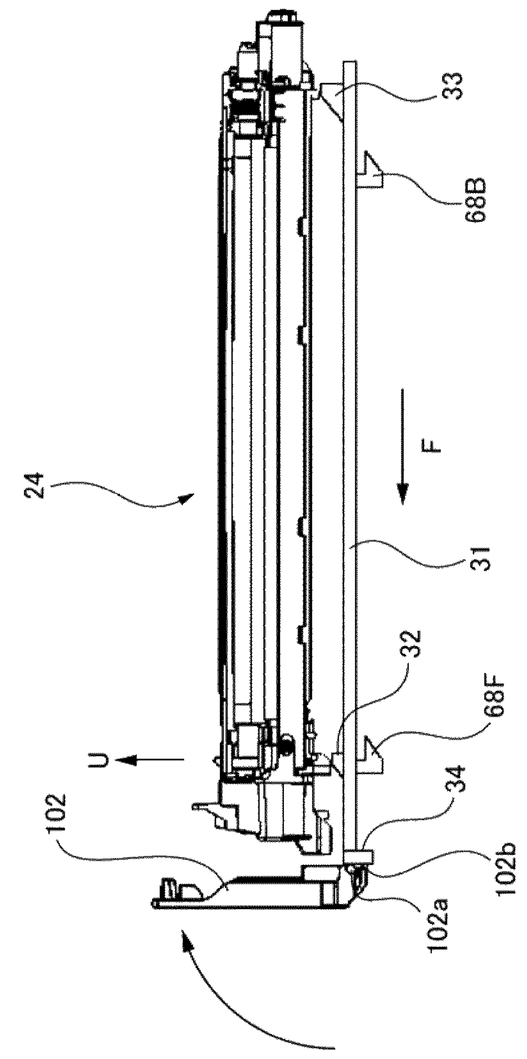
FIG. 31 is a side view of a development stay.
Figure 32:
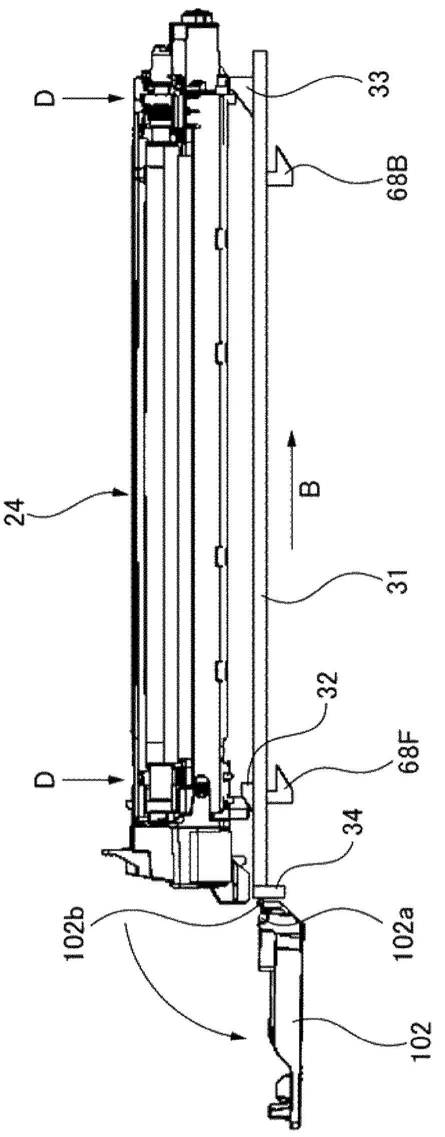
FIG. 32 is a side view of the development stay.

The cartridge tray 30 includes a development stay 31 slidable along the axial direction of the photosensitive drum 2. The development stay 31 will be described with reference to FIGS. 31 and 32. FIGS. 31 and 32 are side views of the development stay 31 as viewed from the right direction.

The development stay 31, which is a sliding member, is provided movably with respect to the developing support member 301 of the cartridge tray 30. The development stay 31 is provided on the developing bottom surface portion 301*c* of the developing support member 301 so as to be movable in the axial direction of the photosensitive drum 2. The development stay 31 has an elongated shape (longitudinal shape) extending in the axial direction of the photosensitive drum 2, and includes a development pressurizing frame 32, a development pressurizing frame 33, a development stay link 34, an arm retracting member 68F, and an arm retracting member 68B.

The development stay link 34 is fixed to the front end portion of the development stay 31 and is engaged with the inner door 102 axially supported by the cartridge tray 30. The development pressurizing frame 32 is fixed to one side (front side) in the longitudinal direction of the development stay 31, and the development pressurizing frame 33 is fixed to the other side (back side) in the longitudinal direction of the development stay 31. The development pressurizing frame 32 and the development pressurizing frame 33 are provided at positions facing the developing unit 24.

In a state where the inner door 102 is opened, a link engagement portion 102*b* engaged with the development stay link 34 is located closer to the back end (the lower end in the opened state) of the inner door 102 than the rotation shaft 102*a*. Therefore, according to the rotation of the inner door 102, the link engagement portion 102*b* of the inner door 102 moves in the rotation direction along a locus of a circle whose radius is the distance between the rotation shaft 102*a* and the link engagement portion 102*b*. That is, as illustrated in FIG. 32, by opening the inner door 102, the link engagement portion 102*b* also rotates and moves to the apparatus back side.

As a result, the development stay link 34 engaged with the link engagement portion 102*b* of the inner door 102 is slid in the direction of the arrow B which is the back side of the apparatus, and the two development pressurizing frames 32 and 33 integrally configured through the development stay 31 are also slid in the direction of the arrow B. This means that, as illustrated in FIG. 32, the two development pressurizing frames 32 and 33 are out of the position where the developing unit 24 is held. When the development pressurizing frames 32 and 33 deviate from the holding position, the developing unit 24 moves in a direction of an arrow D, which is a direction in which the development pressurizing frames are retracted from the photosensitive drum 2 by their own weight.

From the above description, it can be understood that the developing unit 24 retracts from the photosensitive drum 2 in conjunction with the operation of opening the inner door 102. When the inner door 102 is closed, the developing unit 24 is moved in the direction of the photosensitive drum 2 and pressed through a procedure reverse to the opening operation.

In this manner, the development stay 31 is slid and moved in the front-back direction by the development stay link 34 engaged with the link engagement portion 102*b* in conjunction with the opening and closing operation of the inner door 102. The development stay 31 moves the developing unit 24 to a developing position (see FIG. 22) where the developing sleeve 5 is close to the photosensitive drum 2 at the time of development and a separated position (see FIG. 23) where the developing sleeve 5 is separated from the photosensitive drum 2 at the time of non-development by sliding movement in the front-back direction.

As illustrated in FIG. 31, the development stay 31 is slid in the forward direction F in conjunction with the operation of closing the inner door 102. At this time, the developing unit 24 is moved upward (arrow U) along the inclined surface of the development pressurizing frame 32 and the development pressurizing frame 33 of the development stay 31. As a result, the developing sleeve 5 of the developing unit 24 is moved in a direction approaching the photosensitive drum 2 of the drum unit 23.

Also, as illustrated in FIG. 32, the development stay 31 is slid in the backward direction B in conjunction with the operation of opening the inner door 102. At this time, the developing unit 24 is moved downward (arrow D) along the inclined surface of the development pressurizing frame 32 and the development pressurizing frame 33 of the development stay 31. As a result, the developing sleeve 5 of the developing unit 24 is moved in a direction away from the photosensitive drum 2 of the drum unit 23, and the developing sleeve 5 is separated from the photosensitive drum 2 as compared with the time of development.

Furthermore, the development stay 31 includes the arm retracting member 68F for rotating the rotating arm 65, which is a rotational member to be described later, and the arm retracting member 68B. The arm retracting member 68F and the arm retracting member 68B are integrally formed with the development stay 31. The arm retracting member 68F is fixed to one side (apparatus front side) in the longitudinal direction of the development stay 31, and is provided on a surface on the opposite side of the development pressurizing frame 32. The arm retracting member 68B is fixed to the other side (apparatus back side) in the longitudinal direction of the development stay 31, and is provided on a surface on the opposite side of the development pressurizing frame 33. The arm retracting member 68F and the arm retracting member 68B are moved in the same direction as the development stay 31 is slid in the front-back direction in conjunction with the operation of opening and closing the inner door 102, and rotate the rotating arm 65.

The development stay 31 releases the engagement with the rotating arm 65 by moving to one side in the axial direction. As a result, the rotating arm 65 is rotated in one direction to move the exposure head 4 to the exposure position integrally with the elevating duct 69. On the other hand, the development stay 31 is engaged with the rotating arm 65 by moving to the other side in the axial direction. As a result, the rotating arm 65 is rotated in the other direction to move the exposure head 4 to the retracted position integrally with the elevating duct 69.

(Rotating Arm)

Figure 24:
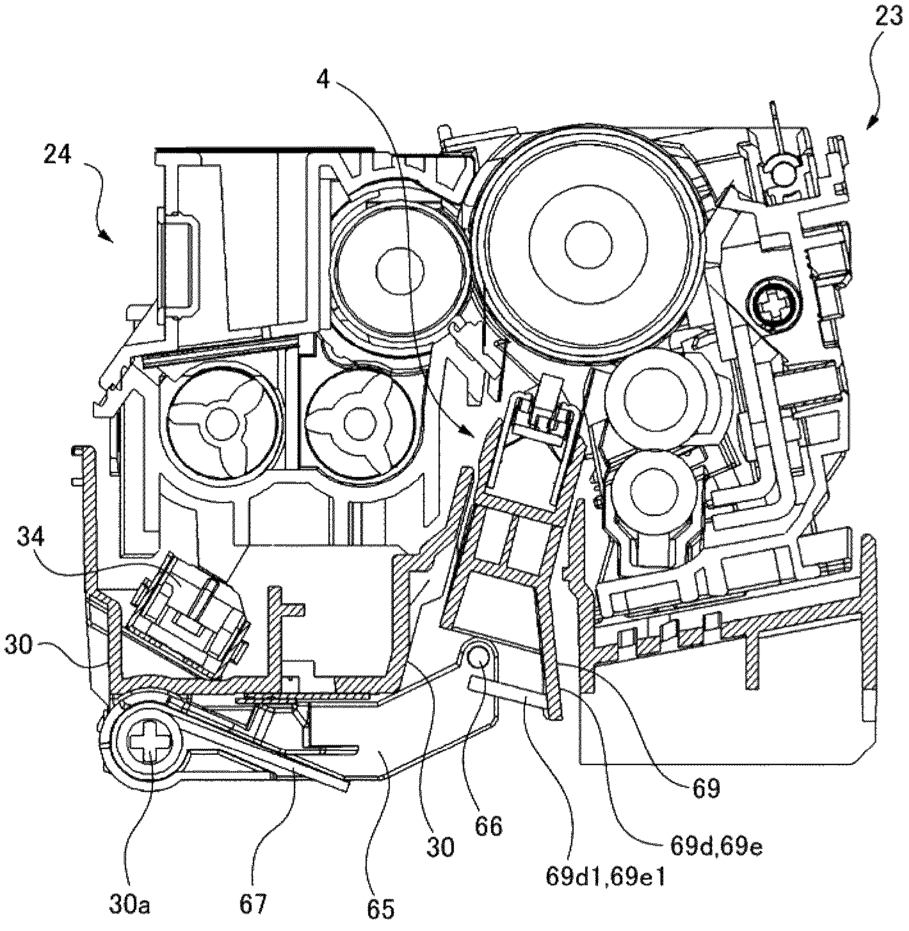
FIG. 24 is a cross-sectional view taken along line Y-Y in FIG. 20.
Figure 25:
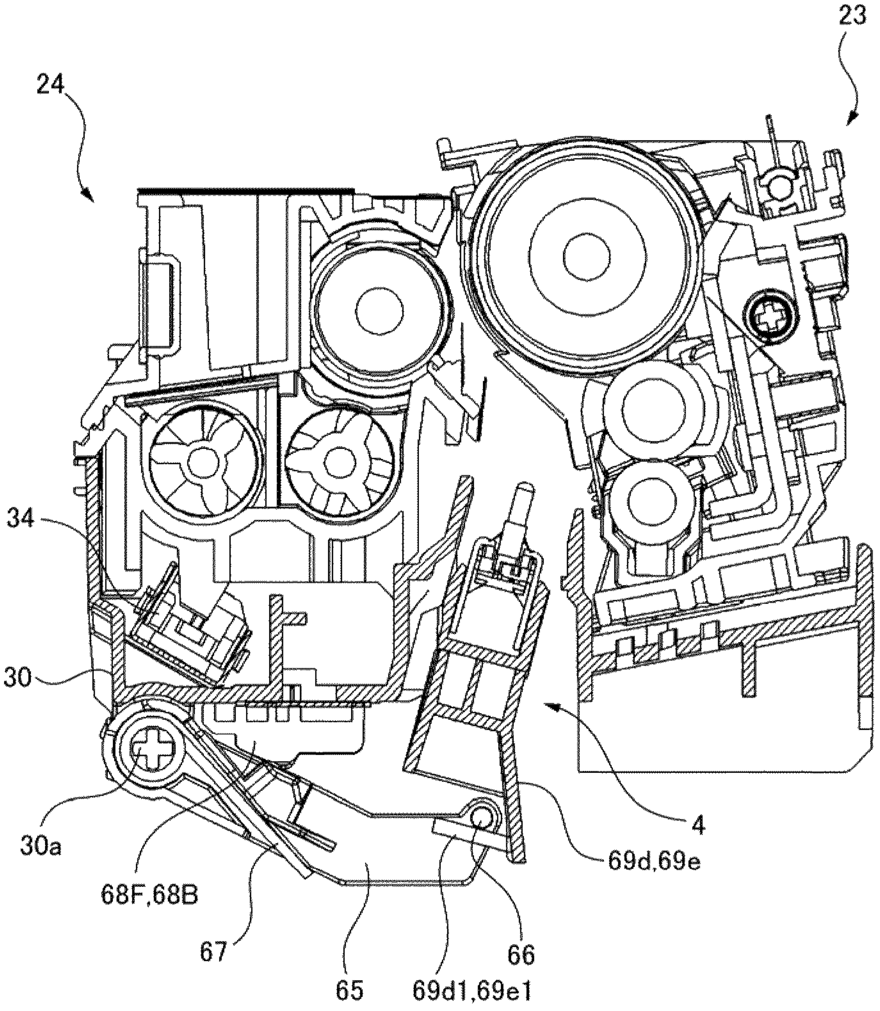
FIG. 25 is a cross-sectional view taken along line Y-Y in FIG. 20.

As illustrated in FIGS. 24 and 25, the rotating arm 65, which is a rotational member, is rotatably provided on the developing support member 301 of the cartridge tray 30. One end portion of the rotating arm 65 in the left-right direction orthogonal to the axial direction of the photosensitive drum 2 is supported to be rotatable about the axis along the axial direction of the photosensitive drum 2. The axis which is the rotation center of the rotating arm 65 may not be parallel to the axial direction of the photosensitive drum 2, and may have an angle in the range of 0 to ±20° with respect to the axial direction of the photosensitive drum 2. In the rotating arm 65, an engagement boss 66 which is the other end portion in the left-right direction supports the engagement portions 69*d* and 69*e* which are both end portions of a region outside the opening 69*a* of the elevating duct 69 in the axial direction.

Specifically, one end portion of the rotating arm 65 in the left-right direction rotates about a rotation shaft 30*a* integrally provided on the cartridge tray 30. The rotation shaft 30*a* is integrally provided on the back surface of the developing bottom surface portion 301*c* of the developing support member 301 on the side opposite to the surface facing the developing unit 24 with the axis parallel to the moving direction of the development stay 31 as the center. In other words, the moving direction of the development stay 31 may be the axial direction that is the rotation center of the photosensitive drum 2 or the longitudinal direction of the drum unit 23, the developing unit 24, and the exposure head 4. This is a condition under which the rotating arm 65 can be arranged most compactly with respect to the width dimension of the cartridge tray 30 illustrated in FIG. 25 in consideration of the operation of the arm retracting members 68F and 68B to be described later. As a result, the influence on the arrangement and operation of the components around the rotating arm 65 can also be minimized.

The rotating arm 65 includes the engagement boss 66 at a distal end that is the other end portion in the left-right direction. The engagement boss 66 is provided at an end portion of the rotating arm 65 on a side opposite to the rotation shaft 30*a*. The rotating arm 65 supports both end portions of a region outside the opening 55*a* in the longitudinal direction of the exposure head 4 from below. That is, the rotating arm 65 supports from below both end portions in the longitudinal direction of the elevating duct 69 that supports the exposure head 4 in the longitudinal direction, in a region (range Lm in FIG. 20) outside the duct region (range La in FIG. 20) of the exposure head 4. Specifically, the rotating arm 65 supports the bottom surfaces of the first engagement portion 69*d* and the second engagement portion 69*e* at both ends in the longitudinal direction of the elevating duct 69 from the lower side by the engagement boss 66 provided at the distal end.

The rotating arm 65 presses the bottom surfaces of the first engagement portion 69*d* and the second engagement portion 69*e* at both ends in the longitudinal direction of the elevating duct 69 upward by the force of an arm pressure spring 67 which is a biasing member. Here, a torsion coil spring is used as the arm pressure spring 67. In FIG. 24, the exposure head 4 is disposed close to the photosensitive drum 2, but this is maintained by the rotating arm 65 pressing the bottom surfaces of the first engagement portion 69*d* and the second engagement portion 69*e* at both ends of the elevating duct 69 upward. This pressing is ensured by a predetermined spring pressure by the arm pressure spring 67.

In this manner, the rotating arm 65 does not directly press the exposure head 4 but presses the elevating duct 69 that supports the exposure head 4.

The rotating arm 65 constitutes a moving mechanism (retraction mechanism) that moves up and down the elevating duct 69 together with the arm pressure spring 67 and the rotation shaft 102*a* provided in the cartridge tray 30. That is, the moving mechanism for moving (elevating) the elevating duct 69 includes the rotation shaft 102*a*, the rotating arm 65 which is a rotational member rotating about the rotation shaft 102*a*, and the arm pressure spring 67 which is a biasing member that applies a force to the rotating arm 65.

The rotating arm 65 rotates about the rotation shaft 30*a* in response to the sliding movement of the development stay 31 to move the exposure head 4 to the exposure position (see FIG. 24) or the retracted position (see FIG. 25). That is, in conjunction with the operation of opening and closing the inner door 102, the rotating arm 65 rotates in one direction to move the exposure head 4 to the exposure position where the photosensitive drum 2 is exposed, and rotates in the other direction to move the exposure head 4 to the retracted position retracted from the exposure position.

Specifically, as illustrated in FIG. 32, the development stay 31 is slid in the backward direction B in conjunction with the operation of opening the inner door 102. At this time, the arm retracting member 68F and the arm retracting member 68B moved in the backward direction B are engaged with the rotating arm 65. As a result, the rotating arm 65 is rotated, and the rotating arm 65 is pushed downward against the force of the arm pressure spring 67 (see FIG. 25). The rotation of the rotating arm 65 causes the engagement boss 66 provided at the distal end of the rotating arm 65 to push down engagement ribs 69*d*1 and 69*e*1 provided at the lower ends of the engagement portions 69*d* and 69*e* of the elevating duct 69, thereby retracting the exposure head 4 integrated with the elevating duct 69 from the photosensitive drum 2. That is, the exposure head 4 is moved from the exposure position to the retracted position.

The retraction of the rotating arm 65 is performed by inserting the wedge-shaped arm retracting member 68F and the arm retracting member 68B between the upper surface of the rotating arm 65 and the lower surface of the cartridge tray 30 at a position close to the rotation shaft 30*a*.

Further, as illustrated in FIG. 31, the development stay 31 is slid and moved in the forward direction F in conjunction with the operation of closing the inner door 102. At this time, the arm retracting member 68F and the arm retracting member 68B are moved in the forward direction F, and the engagement between the arm retracting member 68F and the arm retracting member 68B, and the rotating arm 65 is released. As a result, the rotating arm 65 is rotated, and the rotating arm 65 is pushed upward by the force of the arm pressure spring 67 (see FIG. 24). The rotation of the rotating arm 65 causes the engagement boss 66 provided at the distal end of the rotating arm 65 to push up the bottom surfaces of the engagement portions 69*d* and 69*e* of the elevating duct 69, thereby bringing the exposure head 4 integrated with the elevating duct 69 close to the photosensitive drum 2. That is, the exposure head 4 is moved from the retracted position to the exposure position.

As described above, one end portion of the rotating arm 65 in the direction orthogonal to the axial direction of the photosensitive drum 2 is supported by the rotation shaft 102*a* so as to be rotatable about the axis parallel to the axial direction. In the rotating arm 65, the engagement boss 66 which is the other end portion supports the engagement portions 69*d* and 69*e* which are both end portions of a region outside the opening 69*a* of the elevating duct 69 in the axial direction. As described above, the moving mechanism of the exposure head 4 is established even within the range Lm illustrated in FIG. 20.

In addition, the rotating arm 65 constituting a moving mechanism for moving the exposure head 4 to the exposure position and the retracted position is provided outside the duct region (range La illustrated in FIG. 20) of the exposure head. Therefore, the arm does not become an obstacle when air is sent from the lower side of the exposure head 4 to the duct region, and air can be directly blown onto the back surface of the substrate 50 of the exposure head 4. As a result, the substrate 50 including the light emitting element of the exposure head 4 can be more effectively cooled.

Further, the exposure head 4 is separated from the adjacent developing unit 24 and drum unit 23 by the housing support member 55 of the exposure head 4. Therefore, the air for cooling the exposure head 4 introduced into the back surface of the substrate 50 does not leak to the side of the developing unit 24 adjacent to the exposure head 4, and the scattering of the toner inside the apparatus can be reduced.

Note that the operation of the rotating arm 65 that moves the exposure head 4 to the exposure position or the retracted position is powered by the sliding movement of the development stay 31 that retracts the developing unit 24, but may be powered via another member linked with the inner door 102.

Figure 66:
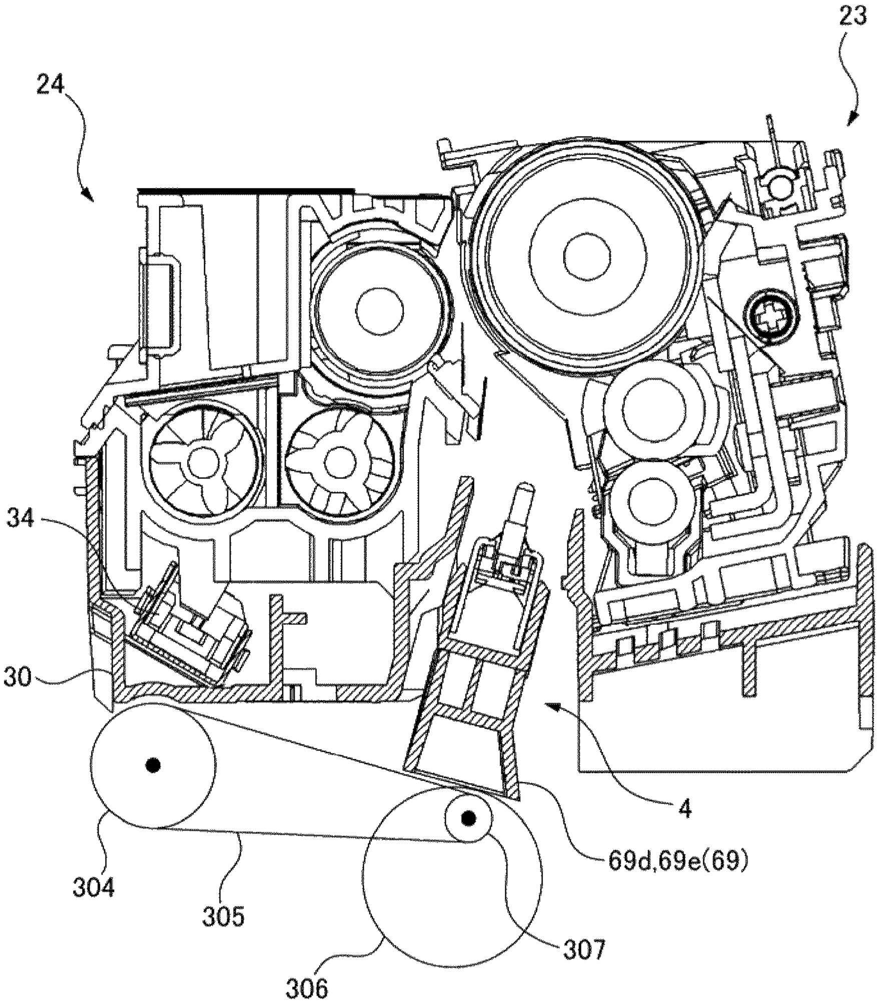
FIG. 66 is a cross-sectional view of the photosensitive drum, the exposure head, and an eccentric cam.
Figure 67:
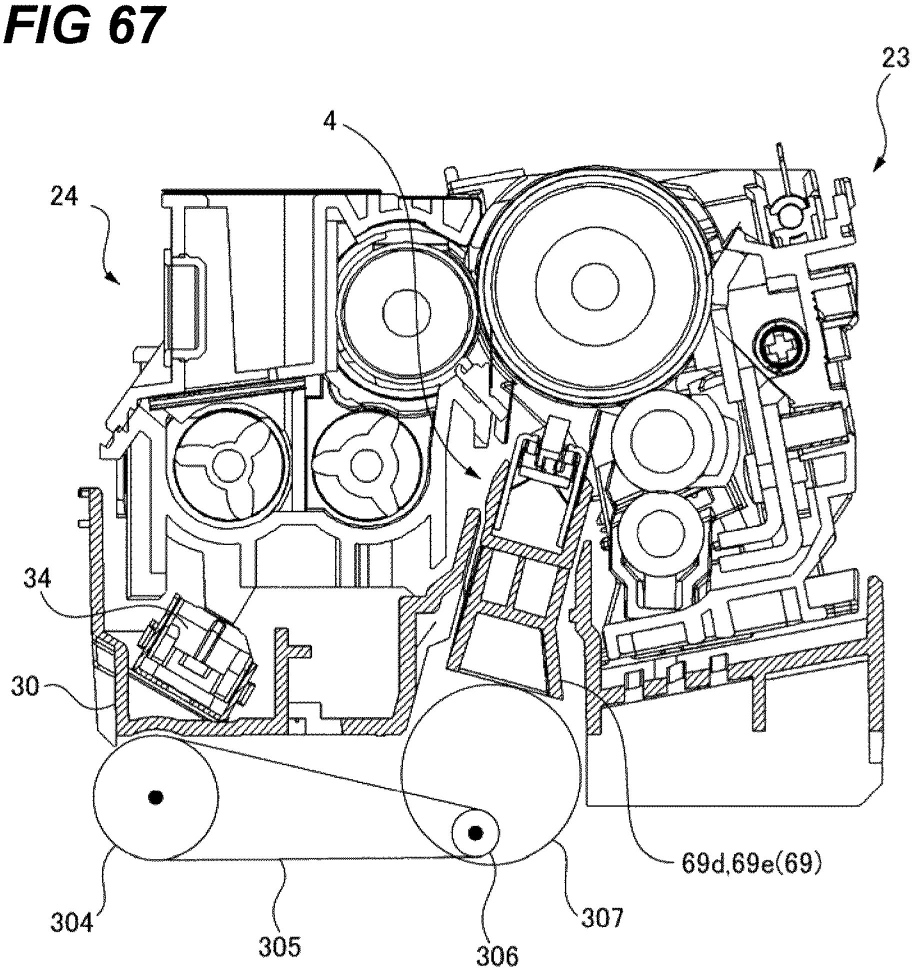
FIG. 67 is a cross-sectional view of the photosensitive drum, the exposure head, and the eccentric cam.

Furthermore, in the present embodiment, the exposure head 4 is moved to the exposure position or the retracted position using the rotating arm 65, but the exposure head 4 may be moved using another mechanism. FIGS. 66 and 67 are examples of a mechanism for moving the exposure head 4 using an eccentric cam. In FIG. 66, the exposure head 4 is in the retracted position, an eccentric cam 306 is provided below the elevating duct 69, and is in contact with the bottom surfaces of the first engagement portion 69*d* and the second engagement portion 69*e* of the elevating duct 69. The eccentric cam 306 includes a first pulley 307 and is connected to a second pulley 304 via a transmission belt 305. When the second pulley 304 rotates, the driving force is transmitted to the first pulley 307 via the transmission belt 305, and the eccentric cam 306 rotates. The rotation of the eccentric cam 306 presses the bottom surfaces of the first engagement portion 69*d* and the second engagement portion 69*e* of the elevating duct 69, and the exposure head 4 moves to the exposure position. FIG. 67 is a view illustrating a state in which the exposure head 4 has moved to the exposure position.

Figure 68:
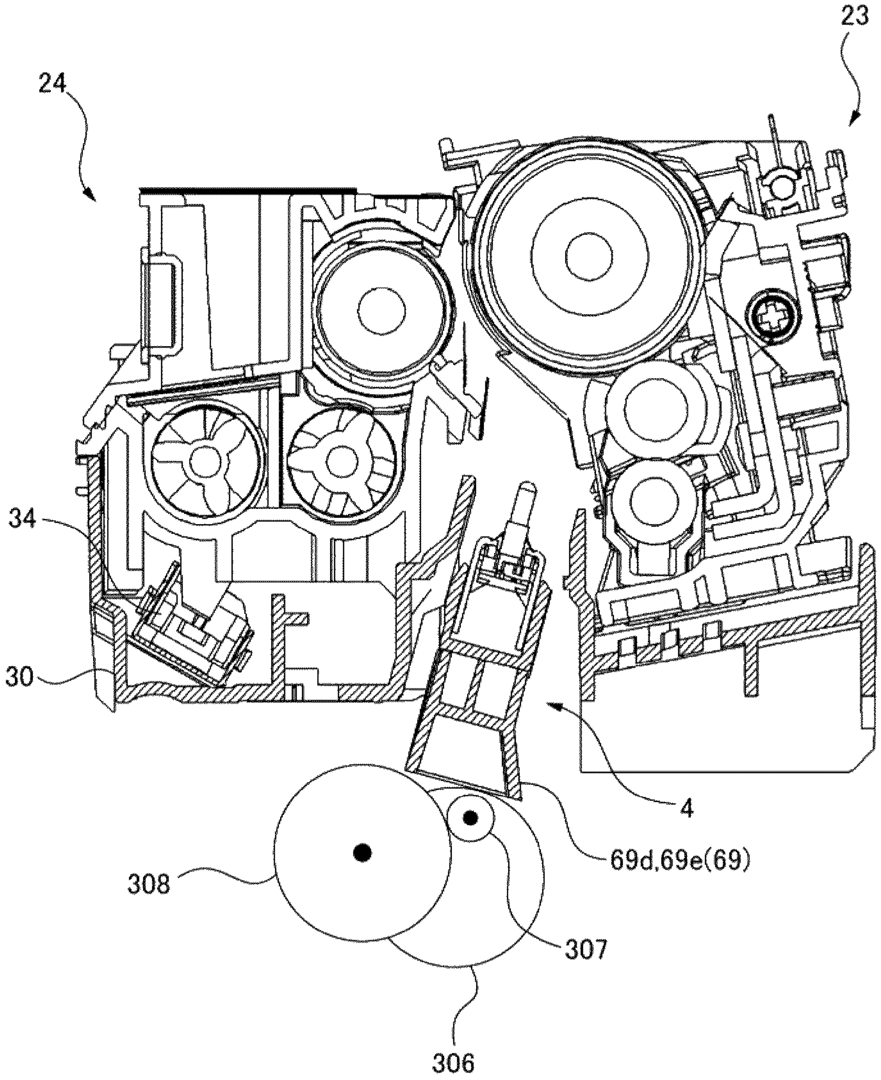
FIG. 68 is a cross-sectional view of the photosensitive drum, the exposure head, and the eccentric cam.
Figure 69:
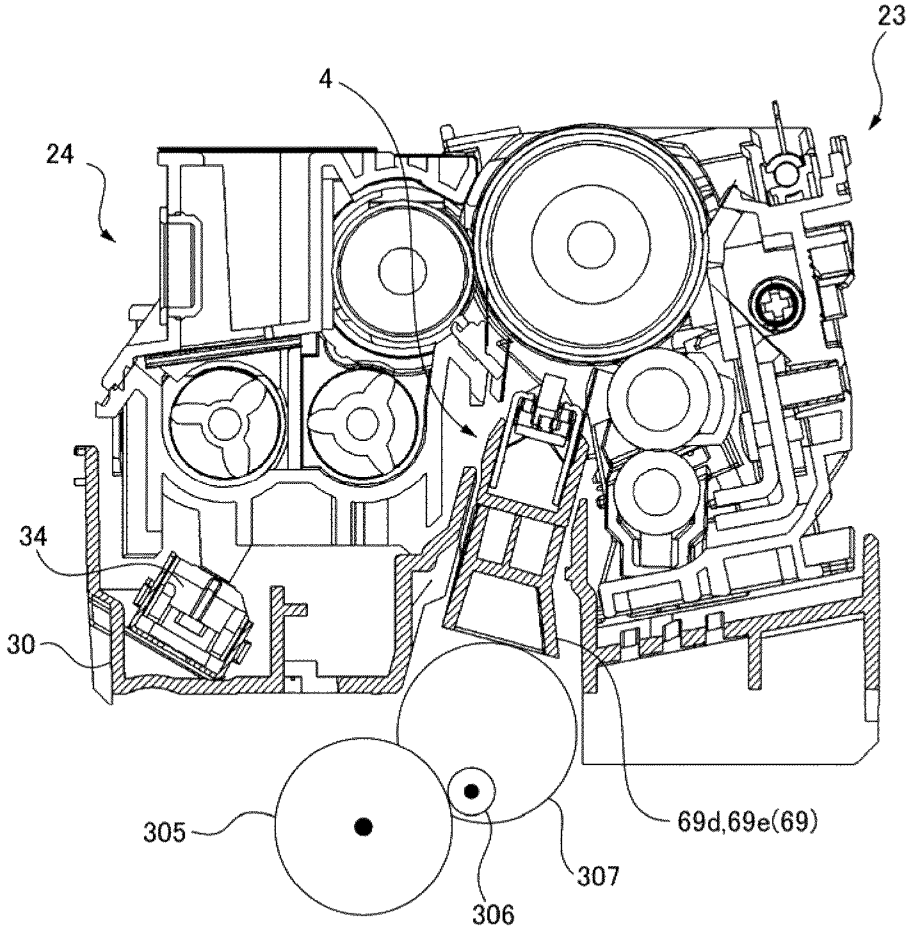
FIG. 69 is a cross-sectional view of the photosensitive drum, the exposure head, and the eccentric cam.

The mechanism for rotating the eccentric cam 306 is not limited to the transmission belt 305, and may be direct transmission by a gear or the like. As shown in FIGS. 68 and 69, a gear 308 that abuts on the first pulley may be provided to transmit the rotation of the gear 308 to the first pulley 307.

(Sealing Property of Exposure Head)

Figure 33:
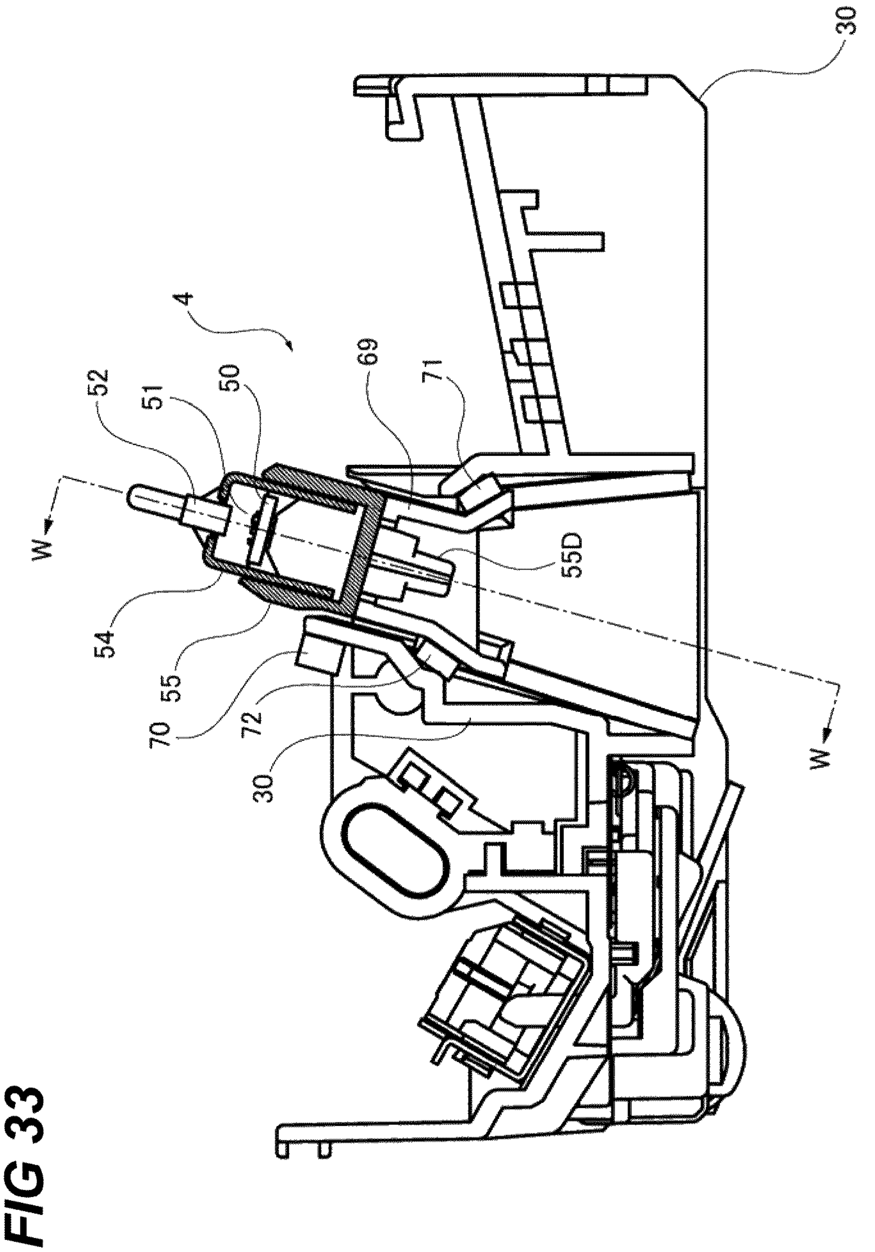
FIG. 33 is a cross-sectional view taken along line X-X in FIG. 20.

The sealing property of the exposure head 4 will be described with reference to FIG. 33. Similarly to FIG. 22, FIG. 33 is cross-sectional views taken along line X-X in FIG. 20. FIG. 33 is a cross-sectional view of the exposure head 4, the elevating duct 69, and the cartridge tray 30 as viewed from the front, in which the drum unit 23 and the developing unit 24 are not illustrated.

As can be understood from FIG. 33, the exposure head 4 forms a cooling duct of the exposure head in a state of being mounted on the elevating duct 69.

As described above, the housing support member 55 of the exposure head 4 is provided with the engagement claws 55*b*1 and 55*b*2 for engaging with the elevating duct 69. Meanwhile, in the elevating duct 69, the engagement holes 69*b* and 69*c* for engaging with the engagement claws 55*b*1 and 55*b*2 are provided in the upper surface portion 69U facing the exposure head 4. Based on this configuration, the exposure head 4 can be engaged with and integrated with the elevating duct 69 according to a procedure of replacement and attachment or detachment of the exposure head 4 described later.

There is a slight gap between the engagement claws 55*b*1 and 55*b*2 of the exposure head 4 and the elevating duct 69. This gap exists as a gap in the vertical direction in FIG. 59, that is, the arrow D direction illustrated in FIG. 49, and is a necessary gap from the viewpoint of assemblability and component accuracy.

Figure 52:
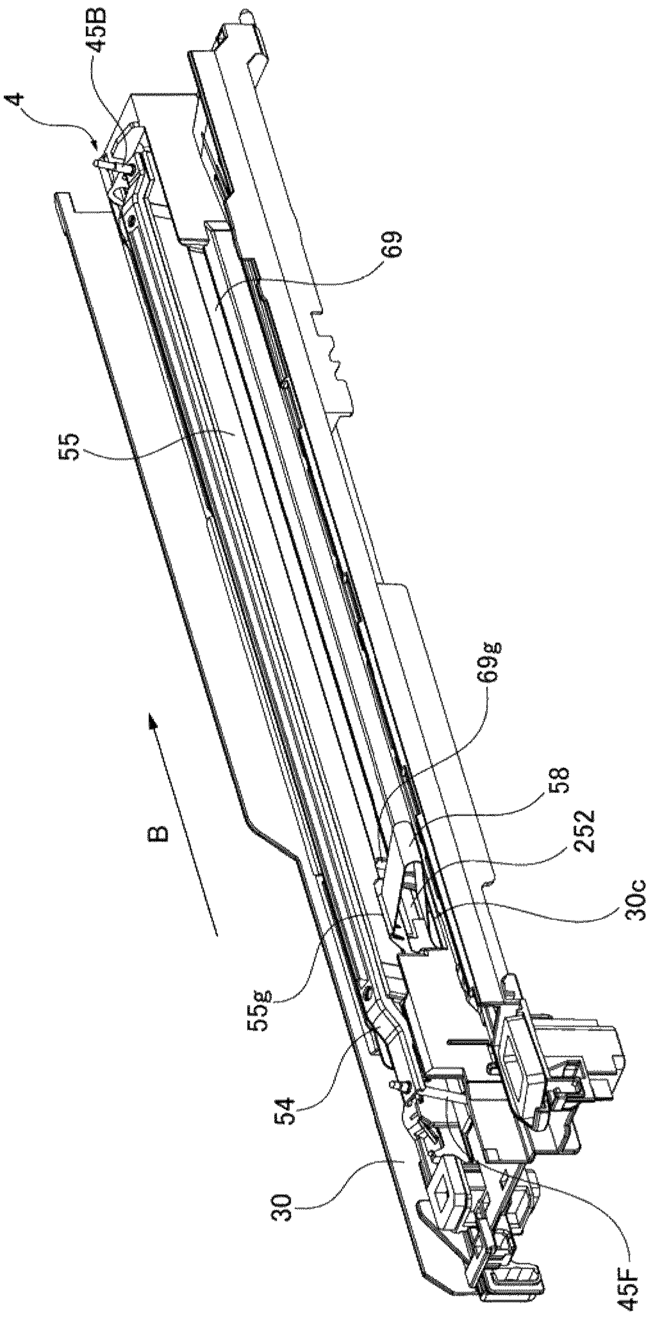
FIG. 52 is a right perspective view of a state where the exposure head is placed in the elevating duct.
Figure 57:
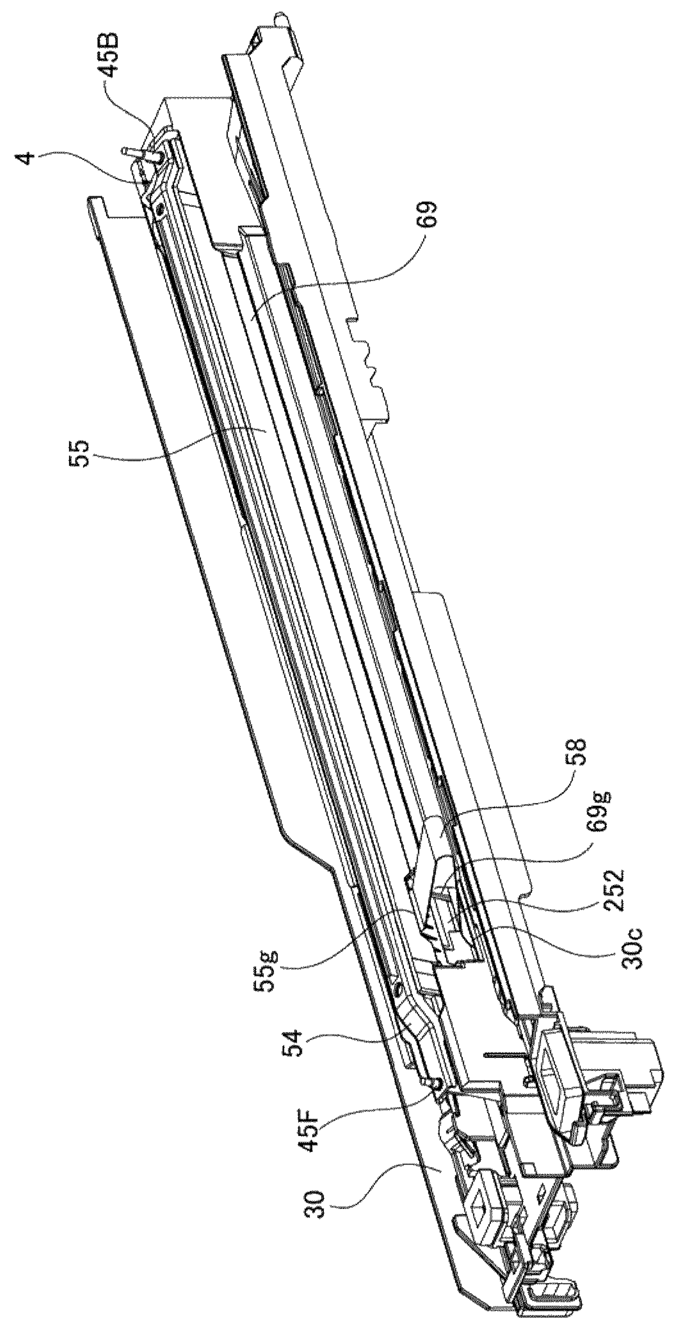
FIG. 57 is a right perspective view of a state where the exposure head is attached to the elevating duct.

First, from the viewpoint of assemblability, when there is no gap, the housing support member 55 becomes resistance of the sliding operation of the exposure head 4 in the direction of the arrow B illustrated in FIG. 52, and the exposure head 4 may not reach the original position illustrated in FIG. 57 due to occurrence of catching during the sliding operation.

Next, from the viewpoint of component accuracy, the housing support member 55 and the elevating duct 69 as a whole have an elongated shape in the moving direction (front-back direction), and it is inevitable that a predetermined amount of warpage occurs in the process of component manufacture.

For example, in a case where the housing support member 55 has warpage in which the central portion in the longitudinal direction is convex by 0.5 mm in the direction of the elevating duct 69 with respect to both end portions thereof, the engagement claws 55*b*1 and 55*b*2 do not overlap the edges of the engagement holes 69*b* and 69*c* in the first place unless the gap is 0.5 mm or more.

From the above description, it can be understood that a predetermined amount of gap is necessary in order to absorb the warpage of the component and not to generate resistance of the mounting operation of the exposure head 4 on the elevating duct 69.

However, from the viewpoint of a duct for sending air for cooling the exposure head 4, this gap is not desirable, and there is a possibility that toner may be scattered inside the apparatus due to blowing or suction from the gap. Therefore, in order to reduce the risk described above, it is necessary to minimize the gap amount.

As a countermeasure, it is conceivable to provide a seal such as a foamed seal material in the gap. Specifically, a seal is affixed to the exposure head or the elevating duct forming the gap. However, there is a possibility that curling or peeling off of the seal occurs due to the sliding operation of the exposure head indicated by the arrow B in FIG. 52. In addition, in consideration of the possibility that the seal is disposed in the vicinity of the photosensitive drum 2 and the developing sleeve 5 and fragments of the seal adhere to the photosensitive drum 2 and the developing sleeve 5, it is desirable that the countermeasure is performed by means different from affixing of the seal.

Therefore, in the present embodiment, in order to reduce this gap, the configuration is as illustrated in FIG. 28. FIG. 28 is a perspective view illustrating the elevating duct 69 engaged with the exposure head 4 and the rotating arm 65 engaged with the elevating duct 69.

As described above as the moving mechanism of the exposure head 4, the rotating arm 65 presses the bottom surfaces of the first engagement portion 69*d* and the second engagement portion 69*e* at both ends in the longitudinal direction of the elevating duct 69 upward by the force of an arm pressure spring 67 which is a biasing member. Here, when the upper surface portion 69U on which the exposure head 4 is mounted is defined as a first surface, the bottom surfaces of the first engagement portion 69*d* and the second engagement portion 69*e* of the elevating duct 69 are second surfaces arranged to face the first surface in the moving direction of the elevating duct 69. The other end portion of the rotating arm 65 presses the bottom surfaces of the first engagement portion 69*d* and the second engagement portion 69*e* at both ends of the elevating duct 69 upward by rotating in one direction, thereby moving the exposure head 4 to the exposure position integrally with the elevating duct 69 and maintaining the exposure position of the exposure head 4 with respect to the photosensitive drum 2. As described above, this pressing is ensured by a predetermined spring pressure by the arm pressure spring 67.

In this manner, the rotating arm 65 does not directly press the exposure head 4 but presses the elevating duct 69 that supports the exposure head 4.

Further, the rotating arm 65 applies a force to the elevating duct 69 toward the photosensitive drum 2 with a predetermined spring pressure by the arm pressure spring 67 which is a biasing member. In other words, the rotating arm 65 applies a force to the elevating duct 69 toward the housing support member 55 with a predetermined spring pressure by the arm pressure spring 67.

Here, the spring pressure by the arm pressure spring 67 is set to a sufficiently strong value. Therefore, when the rotating arm 65 applies a force to the elevating duct 69 by the biasing force of the arm pressure spring 67, a gap between the housing support member 55 of the exposure head 4 and the elevating duct 69 can be reduced.

In addition, even if the housing support member 55 of the exposure head 4 or the upper surface portion 69U of the elevating duct 69 engaged with the housing support member 55 is warped by a predetermined amount in the process of component manufacture, both postures can be corrected by the biasing force of the arm pressure spring 67, and the gap between the members caused by warpage can be reduced.

With such a configuration, it is possible to easily perform the attaching and detaching operation of the exposure head 4 with respect to the elevating duct 69, it is possible to reduce a gap in assembly and component accuracy between the exposure head 4 and the elevating duct 69, and it is possible to reduce toner scattering into the image forming apparatus.

(Duct Unit)

Figure 35:
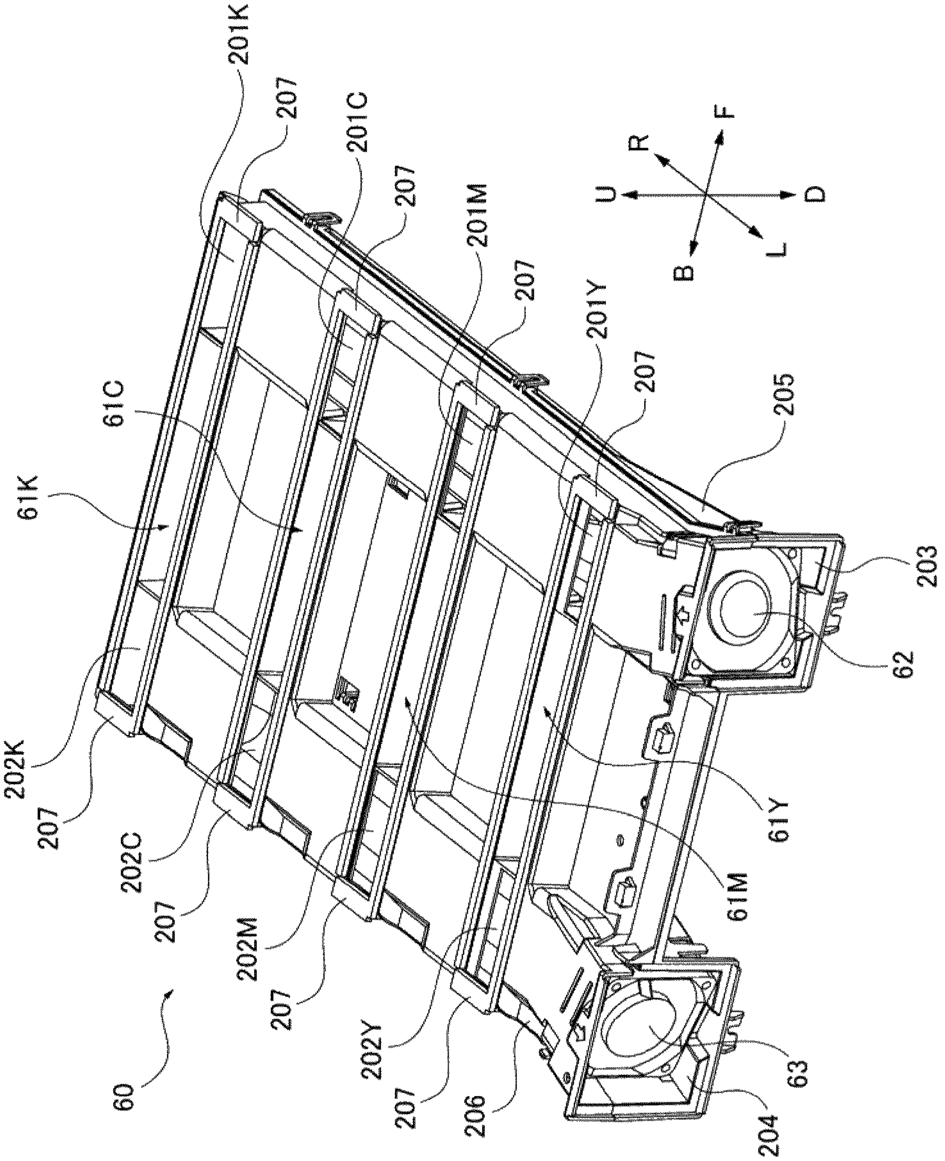
FIG. 35 is a perspective view of a duct unit.
Figure 36:
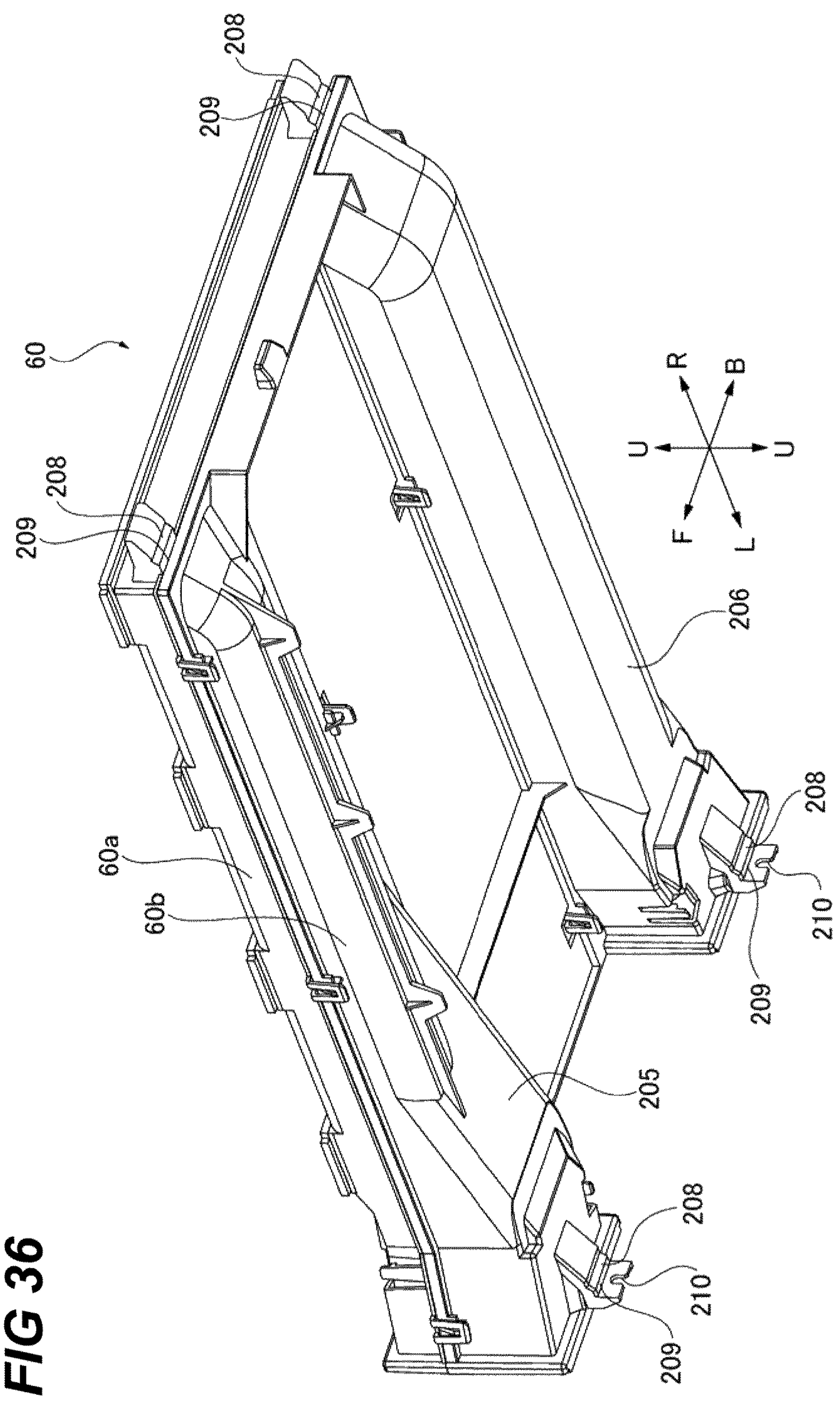
FIG. 36 is a perspective view of the duct unit as viewed from below.
Figure 39:
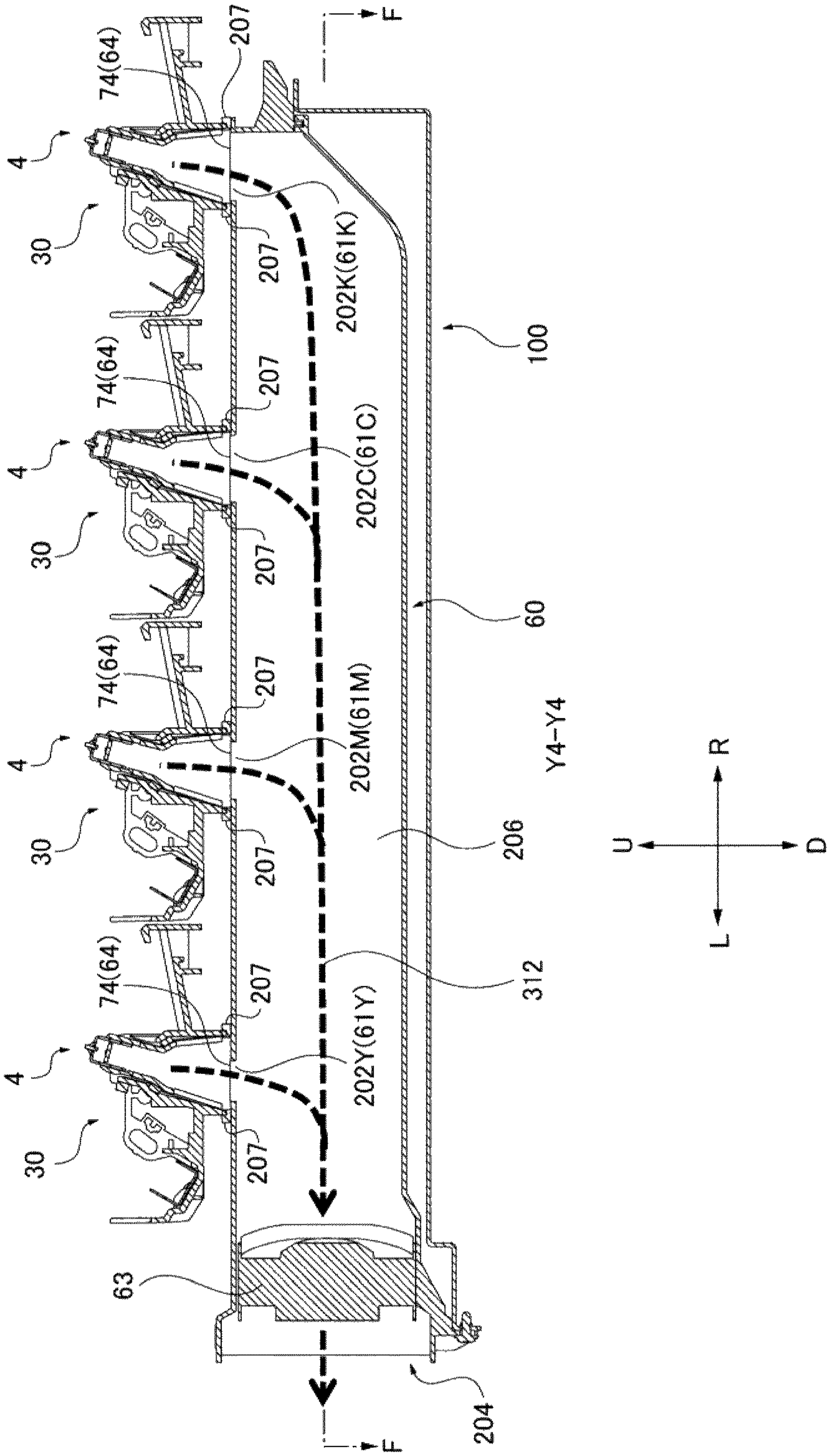
FIG. 39 is a cross-sectional view of an exhaust side of the exposure cooling airflow.

The image forming apparatus 100 also includes the duct unit 60 in a detachable manner. The duct unit 60 will be described with reference to FIGS. 35, 37, 39, and 36. FIG. 35 is a perspective view of the duct unit as viewed from above. FIG. 36 is a perspective view of the duct unit as viewed from below. FIG. 37 is a cross-sectional view of the exposure cooling airflow on the intake side, and is a cross-sectional view taken along line Y3-Y3 illustrated in FIG. 34. FIG. 39 is a cross-sectional view of the exposure cooling airflow on the exhaust side, and is a cross-sectional view taken along line Y4-Y4 illustrated in FIG. 34.

The duct unit 60 is an exposure cooling unit that communicates with the opening portion 64 formed by the cartridge tray 30 and the elevating duct 69 and cools the exposure head 4 by the airflow through the elevating duct 69.

The duct unit 60 includes an intake fan 62 and an intake duct 205 for sending air from the outside of the image forming apparatus to each exposure head 4. The duct unit 60 includes an exhaust fan 63 and an exhaust duct 206 for exhausting air from each exposure head 4 to the outside of the image forming apparatus. The duct unit 60 is integrally provided with the intake fan 62, the exhaust fan 63, the intake duct 205, and the exhaust duct 206, and is detachably mounted on the apparatus main body of the image forming apparatus 100 immediately below the cartridge tray 30.

The duct unit 60 includes the intake duct 205 and the exhaust duct 206 provided separately from the intake duct 205. In other words, the duct unit 60 includes the intake duct 205 as a first duct and the exhaust duct 206 as a second duct provided separately from the first duct.

The duct unit 60 includes an intake port 203 and an exhaust port 204 on the same surface (left surface) side of the image forming apparatus 100, and the intake fan 62 is disposed in the intake port 203 and the exhaust fan 63 is disposed in the exhaust port 204. In the present embodiment, as illustrated in FIG. 34, the intake fan 62 disposed closer to the front of the image forming apparatus 100 functions as an intake fan that takes in air outside the apparatus, and the exhaust fan 63 disposed closer to the rear functions as an exhaust fan that exhausts air to the outside of the apparatus.

In an exterior cover forming an exterior of the left side surface of the image forming apparatus, a louver (not illustrated) as an opening (first opening, second opening) is formed at a position facing each of the fans 62 and 63. The louver formed in the exterior cover communicates with the intake port 203 and the exhaust port 204 in which the fans 62 and 63 are disposed, respectively. Intake by the intake fan 62 and exhaust by the exhaust fan 63 are performed through the louver formed in the exterior cover forming the exterior of the left side surface of the image forming apparatus.

As illustrated in FIGS. 35 and 37, the duct unit 60 includes a third opening portion 201 (Y, M, C, and K) on the upper surface thereof and closer to the front of the image forming apparatus 100 for each exposure head. The intake port 203 and the opening portion 201 (Y, M, C, and K) of each exposure head are connected by the intake duct 205. The duct unit 60 is configured to discharge air (fresh air) outside the image forming apparatus taken in from the intake port 203 by the intake fan 62 from each opening portion 201.

As illustrated in FIGS. 35 and 39, the duct unit 60 includes a fourth opening portion 202 (Y, M, C, and K) on the upper surface thereof and closer to the rear of the image forming apparatus 100 for each exposure head. The exhaust port 204 and the opening portion 202 of each exposure head are connected by the exhaust duct 206. The duct unit 60 is configured to discharge the air taken in from each opening portion 202 by the exhaust fan 63 from the exhaust port 204 to the outside of the image forming apparatus.

In the present embodiment, due to the convenience of component molding, the duct unit 60 is configured by two components of an upper frame body 60*a* and a lower frame body 60*b* divided into upper and lower parts as illustrated in FIGS. 35 and 36. Here, the duct unit 60 fixes the outer edge portions of the upper frame body 60*a* and the lower frame body 60*b* in the front-back direction by snap-fitting, and also fixes the outer edge portions by snap-fitting at a position straddling the intake duct 205 and the exhaust duct 206. Here, fixing at the position straddling the intake duct 205 and the exhaust duct 206 means fixing by snap-fitting a portion between the intake duct 205 and the exhaust duct 206 of the upper frame body 60*a* and a portion between the intake duct 205 and the exhaust duct 206 of the lower frame body 60*b* facing the portion of the upper frame body 60*a*. By fixing the upper frame body 60*a* and the lower frame body 60*b* by snap-fitting in this manner, the leakage of the airflow from the gap between the dividing surfaces of the intake duct 205 and the exhaust duct 206 is reduced.

As shown in FIG. 35, the duct unit 60 includes the opening portion 61 (Y, M, C, and K) on the upper surface thereof. The opening portion 61 of the duct unit 60 includes the third opening portion 201 provided closer to the front side of the apparatus and the fourth opening portion 202 provided closer to the back side of the apparatus. The opening portion 61 (Y, M, C, and K) of the duct unit 60 is provided so as to correspond to each of the exposure heads 4 of the respective colors.

That is, the opening portion 60Y of the duct unit 60 includes an opening portion 201Y provided closer to the front side of the apparatus and an opening portion 202Y provided closer to the back side of the apparatus. The opening portion 60M of the duct unit 60 includes an opening portion 201M provided closer to the front side of the apparatus and an opening portion 202M provided closer to the back side of the apparatus. The opening portion 60C of the duct unit 60 includes an opening portion 201C provided closer to the front side of the apparatus and an opening portion 202C provided closer to the back side of the apparatus. The opening portion 60K of the duct unit 60 includes an opening portion 201K provided closer to the front side of the apparatus and an opening portion 202K provided closer to the back side of the apparatus.

The opening portion 61 of the duct unit 60 is provided at a position facing the opening portion 64 formed by the elevating duct 69 and the cartridge tray 30, and communicates with the opening portion 64 by being pressed to form a closed space.

(Configuration of Sealing Member of Duct Unit)

As described above, the exposure cooling airflow flows from the third opening portion 201 of the duct unit 60 to the first opening portion 73 communicating therewith as illustrated in FIG. 37, and from the fourth opening portion 202 to the second opening portion 74 communicating therewith as illustrated in FIG. 39. That is, the exposure cooling airflow flows from the opening portion 61 of the duct unit 60 including the third opening portion 201 and the fourth opening portion 202 to the cartridge tray 30 and the elevating duct 69 including the first opening portion 73 and the second opening portion 74 communicating therewith. Therefore, in order to prevent toner scattering due to air flow leakage and a decrease in cooling efficiency due to a pressure loss of airflow, it is desirable to seal a gap with each opening portion.

Figure 38:
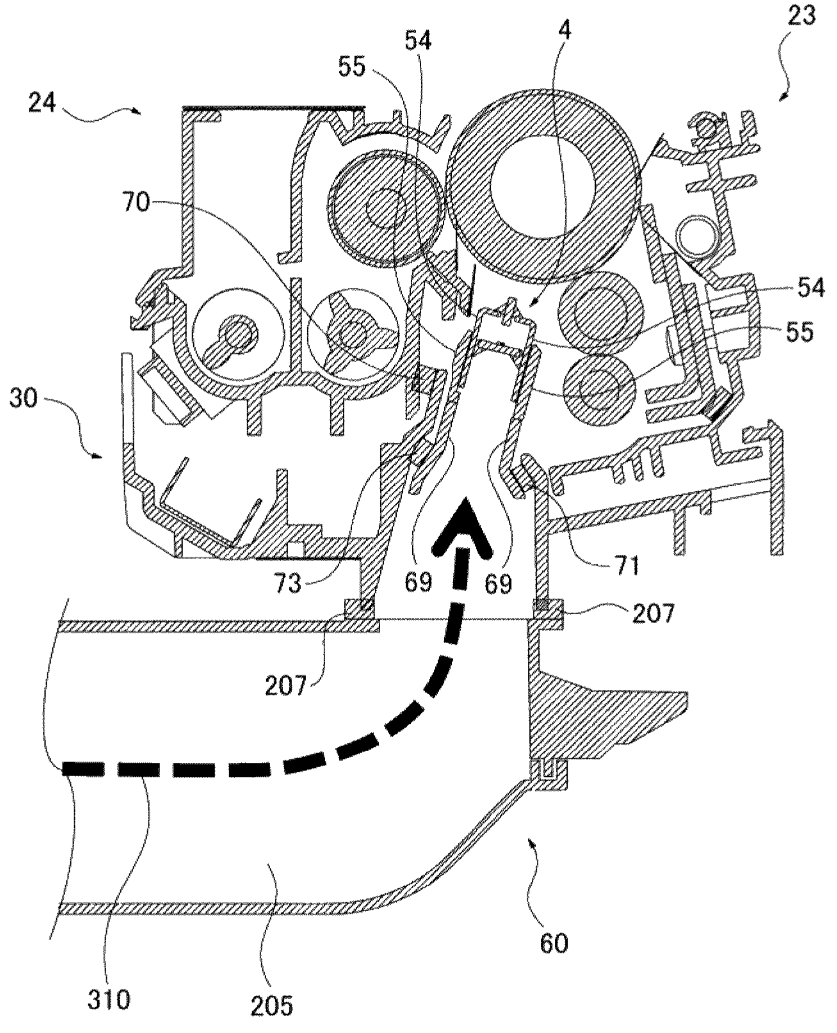
FIG. 38 is an enlarged cross-sectional view of the intake side of the exposure cooling airflow.

As illustrated in FIGS. 26 and 38, it is desirable that a gap between the opening portion 64 formed by the cartridge tray 30 and the elevating duct 69 and the opening portion 61 of the duct unit 60 communicating therewith is sealed.

Therefore, in the present embodiment, as shown in FIG. 35, the sealing member 207 is provided so as to surround the third opening portion 201 and the fourth opening portion 202 of the duct unit 60. As the sealing member 207, an elastic body such as sponge or rubber made of urethane, silicone, or the like is used. FIG. 21 is a schematic view of the cartridge tray 30 and the elevating duct 69 as viewed from below. In FIG. 21, the opening portion 64 formed by the cartridge tray 30 and the elevating duct 69 is indicated by hatching.

As illustrated in FIG. 21, the opening portion 64 formed by the cartridge tray 30 and the elevating duct 69 is formed by the developing support member 301, the drum support member 302, and the elevating duct 69 between the developing support member 301 and the drum support member 302. More specifically, the opening portion 64 is formed by the developing guide portion 301*a* of the developing support member 301, the drum guide portion 302*a* of the drum support member 302, and the duct front wall 69F and the duct back wall 69B of the elevating duct 69 between the developing guide portion 301*a* and the drum guide portion 302*a*.

The sealing member 207 is provided on an upper surface of the duct unit 60 so as to surround four sides of each opening portion 61 including the opening portion (exhaust port) 201 of the intake duct 205 and the opening portion (intake port) 202 of the exhaust duct 206.

Among them, the sealing member 207 provided on the upper surface of one side in the longitudinal direction of the opening portion 61 of the duct unit 60 is sandwiched between the duct unit and the developing guide portion 301*a* of the developing support member 301 by pressing of the duct unit 60. The sealing member 207 provided on the upper surface of one side in the longitudinal direction of the opening portion 61 of the duct unit 60 is provided from the opening portion 201 on one side (front side) to the opening portion 202 on the other side (back side) in the front-back direction.

The sealing member 207 provided on the upper surface of the other side in the longitudinal direction of the opening portion 61 of the duct unit 60 is sandwiched between the duct unit and the drum guide portion 302*a* of the drum support member 302 by pressing of the duct unit 60. The sealing member 207 provided on the upper surface of the other side in the longitudinal direction of the opening portion 61 of the duct unit 60 is also provided from the opening portion 201 on one side (front side) to the opening portion 202 on the other side (back side) in the front-back direction.

The sealing member 207 provided on the upper surface of one side in the lateral direction of the opening portion 61 of the duct unit 60 has a side surface in contact with the side surface of the duct front wall 69F of the elevating duct 69 by pressing of the duct unit 60. The side surface of the duct front wall 69F of the elevating duct 69 with which the sealing member 207 is in contact is a surface facing the side surface of the duct back wall 69B in the front-back direction.

The sealing member 207 provided on the upper surface of the other side in the lateral direction of the opening portion 61 of the duct unit 60 has a side surface in contact with the duct back wall 69B of the elevating duct 69 by pressing of the duct unit 60. The side surface of the duct back wall 69B of the elevating duct 69 with which the sealing member 207 is in contact is a surface facing the side surface of the duct front wall 69F in the front-back direction.

The reason why the side surfaces of the duct front wall 69F and the duct back wall 69B are in contact with the side surface of the sealing member 207 is as follows. That is, this is because the elevating duct 69 is moved to the exposure position illustrated in FIG. 22 and the retracted position illustrated in FIG. 23 by the rotation of the rotating arm 65, and the movement is not hindered by the duct unit 60.

The opening portion 64 formed by the cartridge tray 30 and the elevating duct 69 communicates with the opening 55*a* of the exposure head 4 integrally supported by the elevating duct 69. Then, when the duct unit 60 is mounted on the image forming apparatus 100, the opening portion 61 of the duct unit is pressed against the opening portion 64 formed by the cartridge tray 30 and the elevating duct 69, and the opening portion 64 and the opening portion 61 communicate with each other. Thus, a duct, which is one closed space, is formed from the duct unit 60 to the exposure head 4 via the cartridge tray 30 and the elevating duct 69.

In this manner, the sealing member 207 is pressed between the opening portion 61 of the duct unit 60 and the developing guide portion 301*a* and the drum guide portion 302*a*, and the side surface of the sealing member 207 is brought into close contact with the side surface of the duct front wall 69F and the side surface of the duct back wall 69B to seal the gap. That is, the gap between the opening portion 61 of the duct unit 60 and the opening portion 64 formed by the cartridge tray 30 and the elevating duct 69 is sealed by the sealing member 207. This prevents toner scattering due to airflow leakage and cooling efficiency reduction due to pressure loss of airflow.

(Assembly and Removal of Duct Unit)

Figure 40:
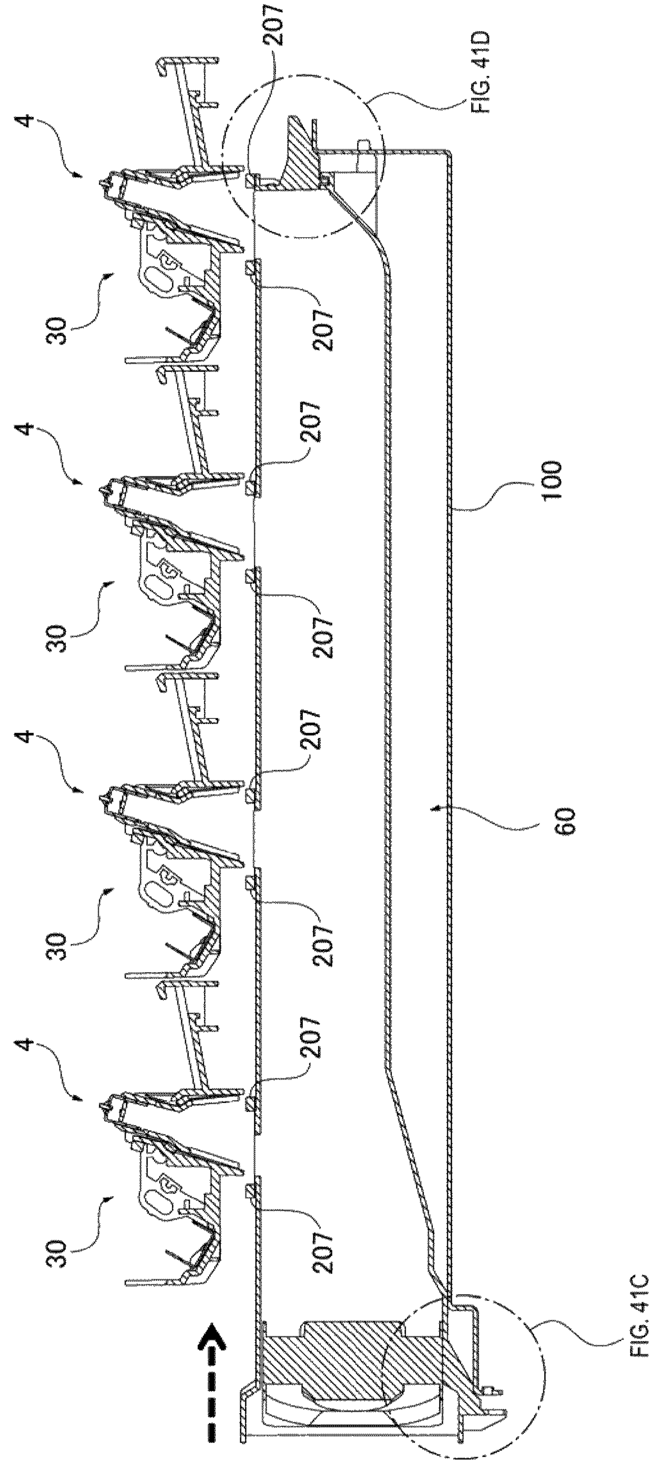
FIG. 40 is a cross-sectional view immediately before the duct unit is assembled.

A configuration for assembling and removing the duct unit 60 to and from the image forming apparatus 100 will be described with reference to FIGS. 2, 35, 37, 38, 21, 40, 41A to 41D, and 36. FIG. 37 is a cross-sectional view illustrating a state in which the duct unit 60 is assembled to the image forming apparatus 100. FIG. 40 is a cross-sectional view illustrating a state immediately before the duct unit 60 is assembled to the image forming apparatus 100 or immediately after the duct unit is removed from the image forming apparatus. FIGS. 41A to 41D are partially enlarged views of FIGS. 37 and 40. FIG. 36 is a perspective view of the duct unit 60 as viewed from the right front lower direction.

The duct unit 60 is inserted from one side (here, the left side) in the left-right direction of the image forming apparatus 100 toward the other side, and is moved from the lower side to the upper side by a guide (guide portion 103, support portion 104) in the apparatus at a timing of positioning. At this time, the opening portion 61 of the duct unit 60 is pressed (engaged with) against the opening portion 64 formed by the cartridge tray 30 and the elevating duct 69 to form an air path in which the opening portion 64 and the opening portion 61 communicate with each other. Hereinafter, description will be given with reference to the drawings.

As described above, the duct unit 60 presses and closely contacts the sealing member 207 between the cartridge tray 30 and the elevating duct 69 to seal the gap, thereby preventing toner scattering due to airflow leakage and cooling efficiency reduction due to airflow pressure loss. Therefore, it is desirable that the duct unit 60 be assembled so as to rise from substantially below with respect to components assembled to the image forming apparatus 100, such as the cartridge tray 30.

On the other hand, as illustrated in FIG. 2, the sheet cassette 12 is disposed below the duct unit 60, and it is difficult to simply assemble the duct unit 60 to the image forming apparatus 100 from below in terms of arrangement of the units. Therefore, in the present embodiment, the duct unit 60 is assembled from the side surface of the image forming apparatus 100, and slightly rises at the same time as the insertion from the side surface immediately before the assembling position.

Here, it is desirable to assemble the duct unit 60 from the left side surface of the image forming apparatus 100. A roller and a guide related to conveyance of the recording sheet P are arranged on the right side in the image forming apparatus 100, and since it is necessary to remove the roller and the guide related to the conveyance for assembling the duct unit 60, assembling from the right side surface is avoided.

Figure 41A:
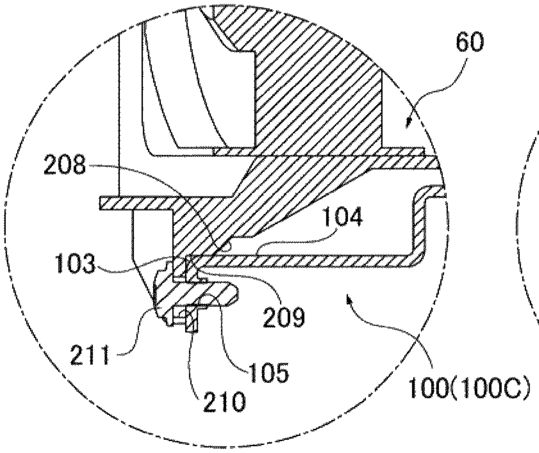
FIGS. 41A and 41B are enlarged cross-sectional views of a positioning shape of the duct unit.
Figure 41B:
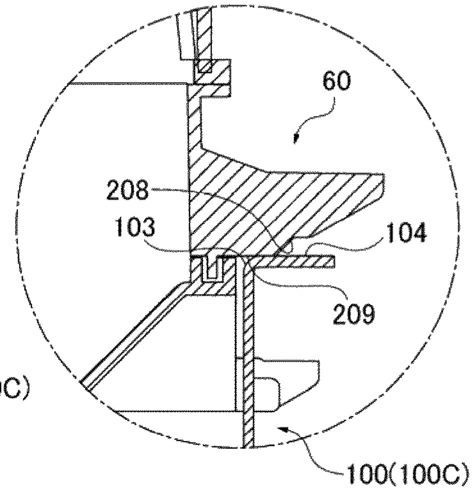

As illustrated in FIGS. 37, 41A, and 41B, the supported portion 209 on the lower surface of the duct unit 60 is supported by the support portion 104 formed in the image forming apparatus 100. Note that the upper surface of the duct unit 60 receives a reaction force downward via the sealing member 207, thereby restricting the height direction. In the present embodiment, the support portion 104 is provided on a part of the sheet metal 100C bridged between the front plate 100F and the back plate 100B constituting a part of the frame body (housing) of the image forming apparatus. The supported portions 209 are provided at a total of four positions, i.e., two positions in the front-back direction on each of the right end and the left end of the duct unit 60. As a result, inclination, distortion, and the like of the duct unit 60 are corrected with respect to the image forming apparatus 100, and thus, it is possible to reliably communicate with the opening portions of the respective colors on the image forming apparatus side and to circulate air.

At this time, the opening portion 64 and the opening portion 61 face each other, and a gap between the opening portion 64 and the opening portion 61 is sealed by the sealing member 207.

As illustrated in FIGS. 37, 41A, and 41B, in the duct unit 60, a fastened portion 210 of the duct unit 60 is fixed to a fastening portion 105 of the sheet metal 100C by a fastening member 211 with respect to the image forming apparatus 100. As illustrated in FIG. 35, the fastened portions 210 are provided at two left end portions of the duct unit 60, and are disposed near the intake fan 62 and the exhaust fan 63. The fastening portions 105 are provided at two left end portions of the sheet metal 100C, and are provided at positions facing the fastened portions 210 in the insertion and removal direction of the duct unit 60. As a result, the intake fan 62 and the exhaust fan 63 are firmly fixed to the image forming apparatus 100, and it is possible to reduce generation of a chattering sound due to vibration and occurrence of an image defect such as a streak due to transmission of vibration to the drum 2 or the like.

Figure 41C:
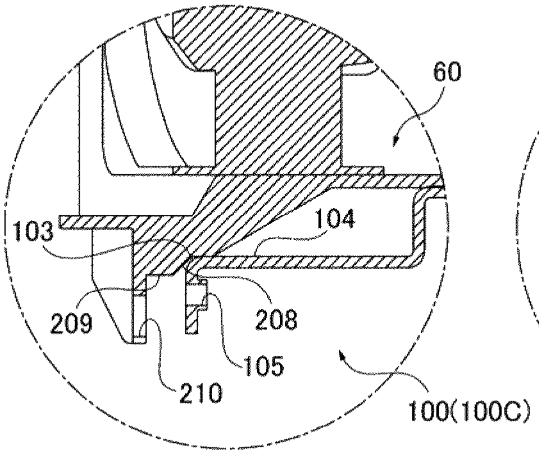
FIGS. 41C and 41D are enlarged cross-sectional views immediately before the duct unit is assembled.
Figure 41D:
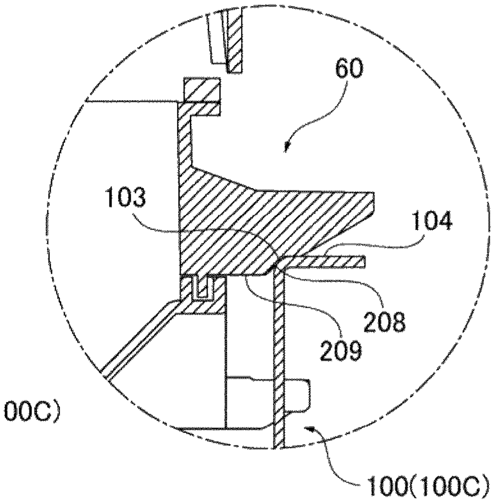

As illustrated in FIGS. 40, 41C, and 41D, immediately before the duct unit 60 is assembled to the image forming apparatus 100 or immediately after the duct unit is removed, the sealing member 207 is separated from the cartridge tray 30 and the elevating duct 69 in the height direction. Therefore, the sealing member 207 of the duct unit 60 does not come into sliding contact with the image forming apparatus 100, and the duct unit 60 can be easily assembled to and removed from the image forming apparatus 100. At this time, a guided portion 208 of the duct unit 60 is in contact with the guide portion 103 of the image forming apparatus 100. In the present embodiment, the guide portion 103 is formed of a curved surface continuous with the support portion 104, and the guided portion 208 is formed of an inclined surface continuous with the supported portion 209 with respect to the assembling direction of the duct unit 60. As a result, by assembling the duct unit 60 rightward from the left side surface of the image forming apparatus 100, the duct unit naturally draws a track upper rightward, and can transition to the assembly state illustrated in FIGS. 37, 41A, and 41B.

Then, when inserted into the image forming apparatus 100, the duct unit 60, which is an exposure cooling unit, is guided to the guided portion 208 having the inclined portion inclined along the insertion direction and moves upper rightward. As a result, the sealing member 207 is compressed and brought into close contact with the cartridge tray 30 and the elevating duct 69 to seal the gap between the opening portion 64 and the opening portion 61.

(Intake Port and Exhaust Port of Duct Unit)

Next, the intake fan 62 and the exhaust fan 63 of the duct unit 60 will be described in more detail.

The exposure cooling airflow is formed as a path separate from the entire image of the development cooling airflow illustrated in FIG. 34 described above and the path of the development cooling airflow as can be understood from FIGS. 22 and 37. Therefore, the toner leaking from the developing unit 24 is not mixed in the exposure cooling airflow, and the risk of scattering the toner into the apparatus can be reduced.

The airflow is compactly formed by arranging the intake port 203 and the exhaust port 204 of the exposure cooling airflow on the same side surface of the main body of the image forming apparatus. Furthermore, by disposing the intake port 203 and the exhaust port 204 of the exposure cooling airflow on surfaces different from the intake port 101*a* and the exhaust port of the development cooling airflow, mutual influence with the development cooling airflow can be minimized.

For example, in the present embodiment, the exhaust port of the development cooling airflow is disposed on the back surface of the apparatus main body, whereas the intake port 203 of the exposure cooling airflow is disposed on the left side surface of the apparatus main body. As a result, it can be said that the airflow for exposure cooling hardly takes in the exhaust heat of image formation by development, and vice versa.

In addition, even in a case where the temperature rise condition of the developing unit 24 and the temperature rise condition of the exposure head 4 are different due to the image and the sheet passing mode, the cooling paths and the fans of the exposure cooling unit and the development cooling unit are separate. Therefore, optimal cooling can be performed in each case, and efficient control with a high degree of freedom can be performed as the airflow control.

(Configuration of Fan of Duct Unit)

Here, details of the arrangement of the intake fan 62 and the exhaust fan 63 will be described with reference to FIG. 42.

Figure 42:
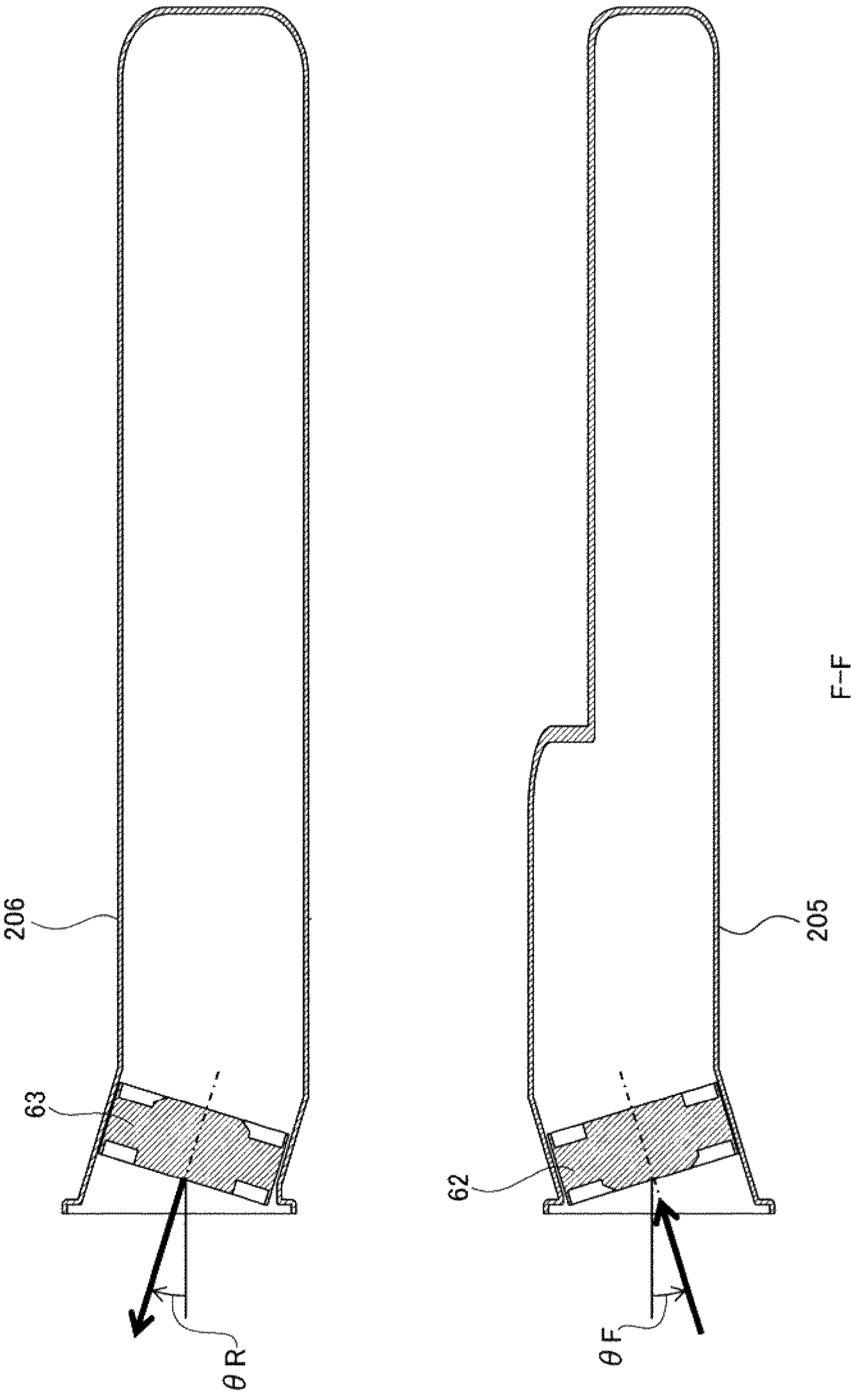
FIG. 42 is a cross-sectional view taken along line F-F in FIG. 39.

FIG. 42 is a cross-sectional view of the duct unit taken along line F-F in FIGS. 37 and 39 as viewed from above the image forming apparatus. In FIG. 42, the arrangement of the intake fan 62 and the exhaust fan 63, which is simply illustrated in FIG. 34, is illustrated in detail.

In FIG. 42, the intake fan 62 is disposed at an angle θF with respect to a direction perpendicular to a left side surface of the image forming apparatus 100, that is, a longitudinal direction of the intake duct 205 and the exhaust duct 206. Similarly, the exhaust fan 63 is disposed at an angle θR with respect to the longitudinal directions of the intake duct 205 and the exhaust duct 206. As a result, the intake direction by the intake fan 62 is a direction from one end side in the longitudinal direction of the substrate 50 toward the center side in the longitudinal direction, and the exhaust direction by the exhaust fan 63 is a direction from the center side in the longitudinal direction of the substrate 50 toward the other end side in the longitudinal direction. As indicated by arrows in FIG. 42, the angles θF and θR are angles at which the intake angle by the intake fan 62 and the exhaust angle by the exhaust fan 63 are opposite to each other with respect to the horizontal direction (upward and downward). For this reason, the intake of the fresh air by the intake fan 62 hardly takes in the heat included in the exhaust of the exhaust fan 63, which contributes to the suppression of the decrease in the cooling efficiency due to the circulation of the exposure cooling airflow.

In FIG. 42, the angle θF and the angle θR are set at relative angles so as to be obliquely upward and obliquely downward, but may be set at relative angles so as to be obliquely leftward and obliquely rightward. Further, a relative angle obtained by combining these angles may be used. That is, it is preferable to set the relative angle such that the central axis of the intake air and the central axis of the exhaust air are separated from each other with increasing distance from the image forming apparatus 100 so that the central axis of the intake air and the central axis of the exhaust air do not intersect with each other outside the image forming apparatus 100.

It can be understood that, by attaching the fan to the duct unit 60 as described above, scattering of toner to the inside of the image forming apparatus can be reduced, and a cooling unit of the LED exposure device with high efficiency and high degree of freedom can be provided.

(Cooling Configuration of Developing Unit)

Next, a cooling configuration of the developing unit 24 will be described with reference to FIG. 34. FIG. 34 is a cross-sectional view of the image forming apparatus taken along line A-A in FIG. 2. In FIG. 34, a flow of air for cooling the developing unit 24 is indicated by an alternate long and short dash line. The flow of air indicated by the alternate long and short dash line in FIG. 34 is also referred to as a development cooling airflow.

The developing unit 24 contains the screw 7 rotating at a high speed and the toner circulating at a high speed as described above, and with this operation, frictional heat is generated in the bearing portion of the screw 7 and the toner, and the frictional heat is stored in the developing unit 24, and the temperature rises. When the image formation is completed, the heat storage of the developing unit 24 is completed, and the developing unit is gradually cooled. However, while the image formation is continued, the heat storage is performed as long as the heat capacity of the developing unit 24 allows, and the temperature rises. Since the toner has a property of being easily melted by heat, when the temperature of the developing unit 24 rises to a certain temperature or higher, the toner is fused inside the developing unit 24, and a coating failure of the developing sleeve 5 occurs, so that the toner image is disturbed, leading to an image defect.

Therefore, there is a need for a cooling configuration in which the developing unit 24 is cooled so that the temperature of the developing unit 24 does not rise to a certain temperature or higher.

The image forming apparatus 100 includes a fan 40 and the front-side duct 41 for sending air from the outside of the apparatus to each developing unit 24. The image forming apparatus 100 includes the back-side duct 42 for exhausting air from each developing unit 24 to the outside of the apparatus, and a toner filter 43. The image forming apparatus 100 includes the duct formed by the developing unit 24 and the cartridge tray 30.

The duct formed between the developing unit 24 and the cartridge tray 30 in the axial direction of the photosensitive drum is disposed between the front-side duct 41 disposed on the front side of the apparatus and the back-side duct 42 disposed on the back side of the apparatus. In the duct formed between the developing unit 24 and the cartridge tray 30 in the axial direction of the photosensitive drum, one end side in the axial direction which is the front side of the apparatus communicates with the front-side duct 41, and the other end side in the axial direction which is the back side of the apparatus communicates with the back-side duct 42, so that one closed space is formed.

The fan 40 is provided on the right side of the front surface of the apparatus main body of the image forming apparatus 100, and sucks air outside the apparatus from an intake port 101*a* provided on the right side surface side of the image forming apparatus 100 of the front cover 101. The front-side duct 41 is disposed inside the front cover 101 and extends in the left-right direction, which is the direction in which the developing units 24 are arranged. The front-side duct 41 includes the opening 41*a* at a position corresponding to each developing unit 24. The opening 41*a* of the front-side duct 41 is provided at a position facing the opening 102*c* of the inner door 102 of each cartridge tray 30 in the axial direction of the photosensitive drum, and communicates with each other by closing the front cover 101. The opening 102*c* of each inner door 102 is provided at a position corresponding to the opening on one end side in the longitudinal direction of the closed space formed between the developing unit 24 and the developing support member 301, and communicates with each other by closing the inner door 102.

The back-side duct 42 includes the opening 42*a* at a position corresponding to each developing unit 24. The opening 42*a* of the back-side duct 42 is provided at a position corresponding to the opening on the other end side in the longitudinal direction of the closed space formed between the developing unit 24 and the developing support member 301 in the axial direction of the photosensitive drum, and communicates with each other.

As described above, the duct that is the closed space formed between the developing unit 24 and the cartridge tray 30 forms a part of the duct that is one closed space communicating with the front-side duct 41 and the back-side duct 42. The duct formed between the developing unit 24 and the cartridge tray 30 and the front-side duct 41 and the back-side duct 42 communicating with the duct form a first cooling duct that is the one closed space serving as a flow path of the development cooling airflow.

Note that the first cooling duct forms a closed space serving as a flow path of the development cooling airflow for cooling the developing unit 24. That is, the first cooling duct is a development cooling unit that cools the developing unit that is a developing unit. However, the first cooling duct serving as the development cooling unit may be partially formed by a duct serving as a closed space formed between the developing unit 24 and the cartridge tray 30, and the other configuration is not limited to the above-described configuration.

Each of the developing units 24 is cooled by the above-described development cooling airflow (alternate long and short dash line illustrated in FIG. 34) flowing through the one closed space.

The development cooling airflow indicated by the alternate long and short dash line in FIG. 34 is first generated by the fan 40 disposed on the front right side of the image forming apparatus and the first cooling duct that is the one closed space described above.

When the fan 40 rotates, the air outside the apparatus is sucked from the intake port 101*a* of the front cover 101 provided on the right side surface of the image forming apparatus 100, and is sent to the developing unit 24 to be cooled via the opening 41*a* of the front-side duct 41 disposed inside the front cover 101 and the opening 102*c* of the inner door 102.

The air sent to the developing unit 24 is taken in from the opening on the front side in the front-back direction of the duct formed between the developing unit 24 and the cartridge tray 30, sent along the axial direction of the photosensitive drum, and exhausted from the opening on the back side in the front-back direction.

The air exhausted from the back side in the front-back direction of the duct formed between the developing unit 24 and the cartridge tray 30 passes through the opening 42*a* of the back-side duct 42, collectively passes through the toner filter 43, and then is exhausted from the back side of the apparatus to the outside of the apparatus.

Here, the toner filter 43 will be described. The toner filter 43 is disposed immediately before the exhaust port on the back side of the apparatus in the back-side duct 42. Since the development cooling airflow is an airflow passing around the developing unit 24, it is inevitable that a small amount of toner is taken into the airflow. Therefore, it is desirable to dispose the toner filter 43 immediately before the exhaust port of the development cooling airflow so as not to discharge even a small amount of toner to the outside of the apparatus.

In the cooling by the airflow, in general, the airflow is mainly formed using an inexpensive fan, and the same applies to the airflow other than the development cooling.

(Cooling Configuration of Exposure Head)

Next, a cooling configuration of the exposure head 4 will be described with reference to FIG. 34. In FIG. 34, a flow of air for cooling the exposure head 4 is indicated by a broken line. The flow of air indicated by the broken line in FIG. 34 is also referred to as an exposure cooling airflow.

Since the exposure head 4 dissipates heat according to the light emission amount of the light emitting diode (LED) 51 and is disposed close to the developing unit 24 using toner weak against heat, a cooling unit is required. In particular, in a case where the image forming process is repeated at a high frequency, that is, in a case where the image forming process is used in apparatus with high productivity, or in a case where an image with high density is continuously output, the light emission time is long, and the light emission amount is also large. Therefore, the amount of heat generated from the LED 51 and the circuit on the substrate 50 on which the LED is mounted also increases.

As a countermeasure against this, for example, the housing 54 of the exposure head 4 is also used as a heat sink, and the exposure head 4 is configured to easily dissipate heat and hardly store heat. However, even in such a case, it is conceivable that the cooling of the exposure head 4 is not in time, heat storage proceeds, and the heat dissipated to the surroundings also increases. As a result, the toner around the developing sleeve 5 included in the developing unit 24 and a part of the circulating toner inside the developing unit 24 are fused, which may affect the toner coating layer on the surface of the developing sleeve 5, leading to an image defect.

Even in a case where the configuration for cooling the developing unit 24 is provided, it is easily assumed that the heat storage caused by the light emission of the LED 51 is superior in a portion where the exposure head 4 of the developing unit 24 is close. Therefore, it is desirable to provide a cooling configuration (exposure cooling airflow) of the exposure head 4 for cooling the exposure head 4 and discharging heat to the outside of the apparatus separately from the cooling configuration (development cooling airflow) of the developing unit 24 to reduce the amount of heat dissipated to the periphery of the exposure head 4.

As illustrated in FIG. 8, the developing unit 24 and the developing sleeve 5 of the developing unit 24 are disposed adjacent to the exposure head 4. The surface of the developing sleeve 5 is coated with toner, and due to its structure, the toner adheres to the vicinity of the bearing portions at both ends of the sleeve, and the toner also adheres to the periphery of the developing unit 24. This is because the developing sleeve 5 and the screw 7 are rotated at a high speed, the stirred toner is stirred up, and the toner is peeled off the surfaces of the developing sleeve 5 and the screw 7. In addition, due to an increase in the internal pressure of the developing unit 24 caused by high-speed rotation of the developing sleeve 5 and the screw 7, toner may be ejected from the gap of the developing unit 24 to the outside.

Therefore, the cooling configuration of the exposure head 4 is desirably a configuration in which these toners are not caught and mixed. In other words, in configuring the exposure cooling airflow separately from the development cooling airflow, it is desirable that the toner around the developing unit 24 adjacent to the exposure head 4 is not caught nor mixed.

The image forming apparatus 100 includes the exposure head 4, the elevating duct 69, the cartridge tray 30, and the duct unit 60. The exposure head 4 is mounted on the elevating duct 69 disposed in the image forming apparatus 100, and is integrated with the elevating duct 69. When the exposure head 4 is mounted on the elevating duct 69, the opening 55*a* of the housing support member 55 of the exposure head 4 communicates with the opening 69*a* of the elevating duct 69. The elevating duct 69 is disposed between the first developing guide portion 301*a* and the first drum guide portion 302*a* of the cartridge tray 30, and forms a duct that communicates the exposure head 4 and the duct unit 60 together with the cartridge tray 30. The duct unit 60 is mounted on the image forming apparatus 100. When the duct unit 60 is mounted on the image forming apparatus 100, the opening portion 61 of the duct unit 60 communicates with the opening portion 64 formed by the elevating duct 69 and the cartridge tray 30.

In this manner, the housing support member 55, the elevating duct 69, the cartridge tray 30, and the duct unit 60 of the exposure head 4 form the second cooling duct which is one continuous closed space. Each exposure head 4 is cooled by an exposure cooling airflow (broken line illustrated in FIG. 34) flowing through the one closed space formed by the housing support member 55, the elevating duct 69 communicating with the housing support member, and the duct unit 60 communicating with the elevating duct and the cartridge tray 30.

The second cooling duct that is one closed space serving as the flow path of the exposure cooling airflow indicated by the broken line in FIG. 34 is configured separately from the first cooling duct that is one closed space serving as the flow path of the development cooling airflow indicated by the alternate long and short dash line in FIG. 34.

The first cooling duct that circulates the airflow for cooling the developing unit 24 and the second cooling duct that circulates the airflow for cooling the exposure head 4 are separated by the first developing guide portion 301*a* of the developing support member 301 and the elevating duct 69. In other words, the first developing guide portion 301*a* of the developing support member 301 and the elevating duct 69 separate the first cooling duct that circulates the airflow for cooling the developing unit 24 and the second cooling duct that circulates the airflow for cooling the exposure head from each other between the exposure head 4 and the developing unit 24.

The second cooling duct forms a closed space serving as a flow path of an exposure cooling airflow for cooling the exposure head 4. That is, the second cooling duct is an exposure cooling unit that cools the exposure head that is an exposure unit. However, the second cooling duct serving as the exposure cooling unit is not limited to the above-described configuration as long as a closed space different from the first cooling duct is formed by the elevating duct 69 serving as the exposure support member, the cartridge tray 30 serving as the support member, and the duct unit 60 serving as the exposure cooling unit.

As described above, the duct unit 60, the cartridge tray 30, the elevating duct 69, and the housing support member 55 form a continuous closed space to constitute an exposure cooling airflow. As illustrated in FIG. 35, the intake fan 62 and the exhaust fan 63 of the duct unit 60 face the outside of the apparatus only through the exterior cover of the apparatus. The flow path of the exposure cooling airflow is completed by a minimum path formed by directly taking in air from the louver of the exterior cover into the duct unit 60 and directly exhausting air from the duct unit 60. Therefore, the intake and exhaust flow hardly affects the atmosphere air inside the apparatus.

Note that there is a finisher as an option on the sheet ejection side of the image forming apparatus 100, and if the finisher is mounted, substantially the entire region of the left side surface of the image forming apparatus 100 facing the intake fan 62 and the exhaust fan 63 is closed by the finisher. In this case, intake and exhaust by the intake fan 62 and the exhaust fan 63 are performed to the inside of the finisher, but the inside of the finisher has many cavities. Therefore, the louver (not illustrated) of the exterior cover is disposed so as to avoid the front of the main structure inside the finisher. As a result, it is possible to reduce a decrease in performance of the exposure cooling airflow to an extent that there is no problem in practical use.

(Sealing Configuration by Sealing Member)

Next, a sealing configuration of the first cooling duct that is one closed space serving as a flow path of the development cooling airflow and the second cooling duct that is provided separately from the first cooling duct and serves as a flow path of the exposure cooling airflow will be described with reference to FIGS. 22 and 23.

Specifically, a sealing configuration in which a gap between the cartridge tray 30 and the elevating duct 69 is sealed with seals 71 and 72 which are sealing members, and a sealing configuration in which a gap between the developing unit 24 and the cartridge tray 30 is sealed by the seal 70 which is a sealing member will be described.

As illustrated in FIGS. 37 and 39, the cartridge tray 30, the elevating duct 69, and the housing support member 55 form the second cooling duct, and form the exposure cooling airflow for the back surface of the substrate 50 on which the LED 51 is mounted through the opening 55*a* of the housing support member 55.

The entire width of the lower surface of the elevating duct 69 forms an opening, and the maximum air volume is secured with respect to the substrate 50 disposed immediately above, which is advantageous for cooling the exposure head 4.

Here, when the substrate 50 has a shape extended long in the axial direction of the photosensitive drum 2, cooling efficiency is more excellent when the exposure cooling airflow is a flow orthogonal to the longitudinal direction of the substrate 50 than a flow parallel to the longitudinal direction of the substrate. Also in the duct cross section illustrated in FIG. 37, the airflow flowing through the inside of the second cooling duct with respect to the longitudinal direction of the substrate 50 to be cooled is configured to be a flow substantially orthogonal to the substrate 50. This configuration is advantageous for cooling even at the angle of the exposure cooling airflow.

Here, in the second cooling duct, the cartridge tray 30 and the elevating duct 69 form a part of duct of the second cooling duct. A gap between the cartridge tray 30 and the elevating duct 69 that form the part of the duct is closed by seals 71 and 72 so that the airflow does not leak to the outside of the duct.

That is, the image forming apparatus 100 includes the seals 71 and 72 which are sealing members for sealing the gap between the cartridge tray 30 and the elevating duct 69.

In a state where the exposure head 4 is at the exposure position as illustrated in FIG. 22, the gap between the elevating duct 69 that integrally supports the exposure head 4 and the developing support member 301 of the cartridge tray 30 is sealed with the seal 72 that is a sealing member.

Further, in a state where the exposure head 4 is at the exposure position, the gap between the elevating duct 69 that integrally supports the exposure head 4 and the drum support member 302 of the cartridge tray 30 is sealed with the seal 71 which is a sealing member.

The seal 72 is provided on the first inclined surface 69L1 of the duct left wall 69L which is a side wall of the elevating duct 69 on the developing unit 24 side. As illustrated in FIGS. 27 and 28, the seal 72 is provided on the first inclined surface 69L1 of the duct left wall 69L over the range La from the duct front wall 69F to the duct back wall 69B in the longitudinal direction. The seal 72 seals the gap between the first inclined surface 69L1 of the duct left wall 69L of the elevating duct 69 and the facing portion 301*d* of the first developing guide portion 301*a* of the developing support member 301 facing the first inclined surface 69L1 at the exposure position of the exposure head 4. Here, the configuration in which the seal 72 is provided on the elevating duct 69 side is exemplified, but the seal may be provided on the developing support member 301 side.

The seal 71 is provided on the second inclined surface 69R1 of the duct right wall 69R which is a side wall of the elevating duct 69 on the drum unit 23 side. The seal 71 is provided on the second inclined surface 69R1 of the duct right wall 69R over the range La from the duct front wall 69F to the duct back wall 69B in the longitudinal direction. The seal 71 seals the gap between the second inclined surface 69R 1 of the duct right wall 69R of the elevating duct 69 and the facing portion 302*d* of the first drum guide portion 302*a* of the drum support member 302 facing the second inclined surface 69R1 at the exposure position of the exposure head 4. Here, the configuration in which the seal 71 is provided on the elevating duct 69 side is exemplified, but the seal may be provided on the drum support member 302 side.

FIG. 24 illustrates a state in which the exposure head 4 is disposed close to the photosensitive drum 2. That is, the exposure head 4 is disposed at the exposure position with respect to the photosensitive drum 2. As described above, this is maintained by the rotating arm 65 pressing the bottom surfaces of both end portions of the elevating duct 69 upward. This pressing is ensured by a predetermined spring pressure by the arm pressure spring 67 which is a torsion coil spring. That is, the seals 71 and 72 are crushed by pressing of the elevating duct 69 against the developing support member 301 and pressing of the elevating duct 69 against the drum support member 302 in a state where the exposure head 4 illustrated in FIGS. 22 and 24 is at the exposure position, and ensure sealing of the gap.

On the other hand, in a case where the exposure head 4 is retracted from the photosensitive drum 2, as illustrated in FIG. 25, the rotation of the rotating arm 65 in a direction in which the exposure head 4 is retracted from the photosensitive drum 2 is a starting point. As a result, the engagement boss 66 provided at the distal end of the rotating arm 65 pushes down the engagement ribs 69*d*1 and 69*e*1 arranged at the lower end of the elevating duct 69, and retracts the exposure head 4 integrated with the elevating duct 69 from the photosensitive drum 2.

As illustrated in FIGS. 25 and 23, in a state where the exposure head 4 is at the retracted position, the seals 71 and 72 are separated from the developing support member 301 and the drum support member 302 with which the seals abut, respectively, and the sealing of the gap is released.

In other words, when the exposure head 4 is moved to the retracted position, the elevating duct 69 is moved in a direction in which the gap between the developing support member 301 and the drum support member 302 is widened as compared with the gap at the exposure position. That is, when the exposure head 4 is moved to the retracted position, the seals 71 and 72 are separated by moving in a direction of moving the exposure head 4 away from the developing support member 301 and the drum support member 302, and the sealing of the gap is released.

As described above, at the exposure position of the exposure head 4, the gap between the cartridge tray 30 and the elevating duct 69 is sealed with the seals 71 and 72 as sealing members over the range La in the longitudinal direction. As a result, the air flowing to the exposure head 4 through between the cartridge tray 30 and the elevating duct 69 does not leak from the gap to the space around the developing unit 24 and the developing sleeve 5. In addition, the air flowing to the exposure head 4 through between the cartridge tray 30 and the elevating duct 69 does not leak from the gap to the space around the photosensitive drum 2 and the charging roller 3. Therefore, the possibility that the toner is mixed into the exposure cooling airflow, which is the flow of air for cooling the exposure head 4, is small, and the toner scattering to the inside of the image forming apparatus can be reduced.

The development cooling airflow is guided in the front-back direction by a duct formed between the developing unit 24 and the cartridge tray. In the first cooling duct, the duct formed between the cartridge tray 30 and the developing unit 24 forms a part of duct of the first cooling duct. The gap between the cartridge tray 30 and the developing unit 24 that form the part of the duct is closed by the seal 70 so that the development cooling airflow does not leak in the direction of the developing sleeve 5.

That is, the image forming apparatus 100 includes the seal 70 which is a sealing member for sealing the gap between the cartridge tray 30 and the developing unit 24.

At a pressing position of the developing unit 24 illustrated in FIG. 22, a gap between the developing unit 24 and the developing support member 301 that separates the developing unit 24 and the exposure head 4 is sealed with the seal 70 that is a sealing member.

The seal 70 is provided in the first developing guide portion 301*a* of the developing support member 301 that separates the developing unit 24 and the exposure head 4 between the developing unit 24 and the exposure head 4. The seal 70 is provided between the frame body of the developing unit 24 and the first developing guide portion 301*a* of the developing support member 301 at a portion that is narrowed as the developing unit 24 moves toward the developing position. Here, the seal 70 is provided at an end portion (partition wall portion 301*e*) of the first developing guide portion 301*a* of the developing support member 301 on the developing roller side in a state where the developing unit 24 is at the developing position. The seal 70 is provided on a surface of the partition wall portion 301*e* of the developing support member 301 facing the frame body of the developing unit 24. The seal 70 is provided from one end portion to the other end portion in the longitudinal direction in the first developing guide portion 301*a* of the developing support member 301. The seal 70 seals the gap between the partition wall portion 301*e*, which is an end portion of the developing support member 301 on the developing roller side, and the frame body of the developing unit 24 facing the partition wall portion 301*e*. Here, the configuration in which the seal 70 is provided on the developing support member 301 side is exemplified, but may be provided on the developing unit 24 side.

As illustrated in FIG. 31, the development stay 31 is slid in the forward direction F in conjunction with the operation of closing the inner door 102. At this time, the developing unit 24 is moved upward (arrow U) along the inclined surface of the development pressurizing frame 32 and the development pressurizing frame 33 of the development stay 31. As a result, the developing sleeve 5 of the developing unit 24 is moved in a direction approaching the photosensitive drum 2 of the drum unit 23, and the developing sleeve 5 is pressed against the photosensitive drum 2.

When the developing unit 24 is moved to the developing position illustrated in FIGS. 22 and 24, the developing unit is moved in a direction of narrowing the gap between the developing unit and the first developing guide portion 301*a* of the developing support member 301 that separates the developing unit from the exposure head 4. That is, when the developing unit 24 illustrated in FIGS. 22 and 24 moves to the developing position, the seal 70 is crushed by moving in a direction in which the developing unit 24 approaches the developing support member 301, and seals the gap.

Also, as illustrated in FIG. 32, the development stay 31 is slid in the backward direction B in conjunction with the operation of opening the inner door 102. At this time, the developing unit 24 is moved downward (arrow D) along the inclined surface of the development pressurizing frame 32 and the development pressurizing frame 33 of the development stay 31. As a result, the developing sleeve 5 of the developing unit 24 is moved to a separated position away from the photosensitive drum 2 of the drum unit 23 further than the case of the development.

When the developing unit 24 is moved to the retracted position illustrated in FIGS. 25 and 23, the developing unit is moved in a direction in which the gap between the developing unit and the first developing guide portion 301*a* of the developing support member that separates the developing unit from the exposure head 4 is wider than the gap illustrated in FIG. 22. That is, at the retracted position of the developing unit 24 illustrated in FIGS. 25 and 23, the seal 70 is separated by moving in the direction of moving the developing unit 24 away from the developing support member 301, and the sealing of the gap is released.

As described above, in a state where the developing unit 24 is at the developing position, the seal 70 seals the gap between the end portion (partition wall portion 301*e*) of the developing support member 301 on the developing sleeve side and the frame body of the developing unit 24 facing the end portion. As a result, the air flowing between the developing unit 24 and the cartridge tray 30 does not leak from the gap toward the developing sleeve 5.

Since the development cooling airflow flows around the developing unit 24 as indicated by the alternate long and short dash line in FIG. 34, a small amount of toner may be contained. Therefore, by shielding the path between the air flows in this manner, the toner is not mixed from the development cooling airflow. In the exposure cooling airflow, the possibility of scattering toner inside the apparatus can be reduced by considering that the duct is constituted by a minimum path that performs intake and exhaust directly with respect to the outside of the apparatus.

Here, the configuration in which the seals 71, 72, and 73 are separated by moving the elevating duct 69 and the developing unit 24 in the direction away from the target member has been exemplified, but the present invention is not limited thereto. By moving the elevating duct 69 and the developing unit 24 in a direction away from the target member, the seals 71, 72, and 73 can release the sealing of the gap by reducing the pressing even if they are not separated.

In addition, here, a foamed sealing material made of a rubber sponge material is used for the seals 71, 72, and 73 which are sealing members. As the dimension of the seal, a configuration is adopted in which the thickness of the seal is increased with respect to the width of the gap described above, the difference is set as a crushing amount of the seal, and bubbles inside are crushed to increase the sealing force.

The sealing member used for sealing is not limited to the foamed sealing material, and may be, for example, a rubber sheet material (sheet material) such as a urethane sheet. In this case, a sheet longer than the width of the gap described above is used, and sealing is performed by making a sheet end follow an abutting counterpart. In order to increase the sealing force, it is only required to increase the abutting force with respect to the counterpart by setting the length and the abutting angle of the sheet unlike the foamed sealing material.

Even if the material of the seal is either a rubber sponge material or a rubber sheet material, it is necessary to attach the seal by a bonding unit such as a double-sided tape. Since the adhering area is equal to or smaller than the width of the seal and is small, when the seal is subjected to a load such as bending or shifting in the lateral direction thereof, the bonding portion peels off, which may lead to curling, peeling off, and falling off of the seal. Therefore, a configuration is adopted in which, in bonding and attaching the seal, the load applied in the lateral direction is minimized.

As a more general sealing material, a bellows-like rubber material or the like is conceivable, but since a predetermined space is required for expansion and contraction of the bellows, it is difficult to say that the assemblability is good, and it is not assumed to be adopted in the present embodiment.

(Angle of Sealing Member)

Here, the seals 71 and 72 which are sealing members will be described in more detail.

The seals 71 and 72, which are sealing members, reduce the risk of toner mixing into the flow path of the exposure cooling airflow and the flow path of the development cooling airflow, and reduce toner scattering inside the apparatus. Therefore, it is necessary to prevent the sealing member from being curled, peeled, dropped, or the like.

Here, the moving direction of the exposure head 4 from the retracted position illustrated in FIG. 25 to the exposure position illustrated in FIG. 24 is indicated by an arrow G in FIG. 23. The seals 71 and 72 are attached to the elevating duct 69 at predetermined angles θ1 and θ2 with respect to the direction of arrow G, which is the moving direction of the exposure head 4.

Specifically, the seal 71 is provided on the second inclined surface 69R1 of the duct right wall 69R which is a side wall of the elevating duct 69 on the drum unit 23 side. The second inclined surface 69R1 of the duct right wall 69R is inclined at a predetermined angle θ1 with respect to the direction of the arrow G. Here, the configuration in which the inclined surface inclined at the angle θ1 is provided in the elevating duct 69 has been exemplified, but the abutting surface of the seal 71 may be inclined at the angle θ1.

The seal 72 is provided on the first inclined surface 69L1 of the duct left wall 69L which is a side wall of the elevating duct 69 on the developing unit 24 side. The first inclined surface 69L1 of the duct left wall 69L is inclined at a predetermined angle θ2 with respect to the direction of the arrow G. Here, the configuration in which the inclined surface inclined at the angle θ2 is provided in the elevating duct 69 has been exemplified, but the abutting surface of the seal 72 may be inclined at the angle θ2.

In the case of the rubber sponge material, the sealing force of the gap by the seals 71 and 72 is determined by the crushing amount of the seal as described above. Therefore, as long as a predetermined seal crushing amount is ensured at the exposure position shown in FIG. 24 where the exposure head 4 is close to the photosensitive drum 2, there is no influence on sealing of the gap between the elevating duct 69 and the cartridge tray 30 regardless of the angle of attachment of the seals 71 and 72. In addition, in FIG. 22, the seals 71 and 72 are mainly subjected to a load in a direction of crushing the thickness, and the load does not cause curling, peeling off, or falling off of the seal.

Next, the load on the seals 71 and 72 due to the moving operation of the exposure head 4 will be described with reference to FIG. 23.

Similarly to FIG. 22, the position of the cross section illustrated in FIG. 23 is a position in the direction of arrows X-X in FIG. 20, and FIG. 23 is a cross-sectional view of a range La illustrated in FIG. 20. Note that, in FIG. 22, the exposure head 4 is at an exposure position close to the photosensitive drum 2, whereas in FIG. 23, the exposure head 4 has moved to the retracted position retracted from the photosensitive drum 2. This is a position corresponding to FIG. 25 in which the exposure head 4 is retracted from the exposure position to the retracted position.

In FIG. 23, the seals 71 and 72 including the seal 70 are separated from the members with which the seals abut, and the sealing of the gap is released. That is, in a state where the exposure head 4 is retracted from the exposure position and the developing unit 24 is retracted from the developing position, sealing of the gap by the seals 71, 72, and 73 is released.

This is because sealing of the gap is not necessary in the middle of the moving operation of the exposure head 4, and is only required to be performed when the exposure head 4 is positioned at the exposure position illustrated in FIG. 22 with respect to the photosensitive drum 2 and the image forming process starts.

In the state (retracted position) illustrated in FIG. 23, no load is applied to the seals 71 and 72. Therefore, the seals 71 and 72 are not curled, peeled, or dropped.

The load on the seals 71 and 72 during the moving operation of the exposure head 4 may be considered by moving the seals 71 and 72 in the direction of the arrow G from the state illustrated in FIG. 23.

In the seal 71, until the elevating duct 69 is in the state (exposure position) shown in FIG. 22, the seal 71 provided on the second inclined surface 69R1 of the elevating duct 69 does not abut on the facing portion 302*d* of the first drum guide portion 302*a* facing the seal, and is arranged not to receive a load.

In the seal 72, the corner portion of the seal 72 comes into contact with the cartridge tray 30 after the start of movement, but only receives an oblique load with respect to the attachment surface of the seal 72, and it can be said that the risk of causing the seal 72 to be curled or peeled is small. The oblique load on the seal 72 is determined by the attachment angle θ2 of the seal 72, and as the angle θ2 is larger, the component force that induces curling or peeling of the seal 72 becomes smaller. For example, in a case where the angle θ2 is 90°, that is, in a case where the seal 72 is attached perpendicularly to the moving direction (the direction of the arrow G) of the exposure head 4, the seal does not receive a load during the moving operation of the exposure head 4. Therefore, similar to the state of the retracted position illustrated in FIG. 34, the seal 72 is not curled or peeled off.

However, as the angle θ1 and the angle θ2 are increased, the area required for the movement of the seals 71 and 72 by the moving operation of the exposure head 4 is increased, so that it is difficult to make the moving mechanism of the exposure head 4 compact. Therefore, it is necessary to set the angles θ1 and θ2 within a predetermined range. In the present embodiment, the angles θ1 and θ2 are set to fall within an appropriate range of 20° to 90° (20°≤θ1≤90°, 20°≤θ2≤90°).

As described above, the load on the seals 71 and 72 due to the moving operation of the exposure head 4 can be minimized. Therefore, the seals 71 and 72 are not curled, peeled, or dropped off during the moving operation of the exposure head 4. In addition, rubbing of the seals 71 and 72 does not become resistance to the moving operation itself of the exposure head 4. Therefore, the moving operation of the exposure head is stabilized.

With such a configuration, it is possible to provide a cooling unit of the exposure head 4 which is compatible with the moving mechanism of the exposure head 4 and has a sealing property for reducing toner scattering into the apparatus.

(Cooling Control of Exposure Head and Cooling Control of Developing Unit)

Next, cooling control of the exposure head 4 and cooling control of the developing unit 24 will be described.

Cooling control of the exposure head 4 is performed by controlling the intake fan 62 and the exhaust fan 63 in the duct unit 60 based on detection signals of temperature detection sensors (not illustrated) disposed on the substrates 50 of the respective colors. As a result, the intake fan 62 and the exhaust fan 63 of the duct unit 60 are not always rotating, and start rotating when the temperature detected by the temperature detection sensor reaches a predetermined threshold. As described above, by minimizing the operation of the exposure cooling airflow by the intake fan 62 and the exhaust fan 63 and also minimizing the air volume, it is possible to reduce toner scattering into the image forming apparatus 100 from the viewpoint of control.

On the other hand, the cooling control of the developing unit 24 is performed by controlling the fan 40 provided on the apparatus front surface side based on a detection signal of an internal temperature sensor (not illustrated) arranged inside the image forming apparatus 100 separately from the temperature detection sensor. In other words, the cooling control of the developing unit is performed by controlling the fan 40, and is controlled differently from the intake fan 62 and the exhaust fan 63 in the duct unit 60. As a result, control is performed to perform optimum and minimum cooling for the temperature rise state of the developing unit 24.

Temperature rise conditions of the developing unit 24 and the exposure head 4 are different from each other. Therefore, as described above, the cooling control of the exposure head 4 and the cooling control of the developing unit 24 are different from each other. As a result, in each cooling control, the operation of the fan and the air volume of the fan can be minimized, and the toner scattering into the image forming apparatus 100 can be further reduced.

With such a configuration, it is possible to provide a cooling unit of the exposure head 4 capable of reducing the possibility of occurrence of image defects and toner adhesion to the user without scattering toner inside the image forming apparatus 100.

FIG. 26 is a cross-sectional view taken along line E-E in FIG. 37. In FIG. 26, the FFC 58, the drum unit 23, and the developing unit 24, which are not illustrated in FIG. 37, are illustrated.

In the duct unit 60, the intake fan 62 disposed closer to the front of the image forming apparatus 100 functions as an intake fan that takes in air from the outside of the apparatus. Therefore, when the intake fan 62 rotates, air is taken into the intake duct 205 from the outside of the apparatus through the intake port 203. The air taken in from the outside of the apparatus flows from the left side to the right side of the image forming apparatus 100 along the intake duct 205 as indicated by a dotted line (intra-duct airflow 310) in FIG. 37. As shown in FIG. 37, the air flowing from the left side to the right side of the apparatus in the intake duct 205 flows through the third opening portion 201 for each color provided on the upper surface of the intake duct 205 while branching from the left side of the apparatus to the opening portions 201Y, 201M, 201C, and 201K in this order.

The air sent from the third opening portion 201 of the duct unit 60 is sent upward from the first opening portion 73 communicating with the opening portion 201 through the space between the cartridge tray 30 and the elevating duct 69. The air sent upward through the space between the cartridge tray 30 and the elevating duct 69 is blown to the back surface of the substrate 50 of the exposure head 4 through the opening 69*a* of the elevating duct 69 and the opening 55*a* of the exposure head 4 communicating with each other in the vertical direction.

Here, the first opening portion 73 is an opening portion which communicates with the third opening portion 201 of the duct unit 60 on the front side of the apparatus in the opening portion 64 formed by the cartridge tray 30 and the elevating duct 69.

That is, the first opening portion 73 is disposed closer to one end side than the center of the substrate 50 in the longitudinal direction, and faces the third opening portion 201 when the duct unit 60 is mounted.

The air blown against the back surface of the substrate 50 of the exposure head 4 near the front of the image forming apparatus 100 tends to flow in the space between the left side wall 55L and the right side wall 55R of the housing support member 55 along the longitudinal direction of the substrate 50. At this time, in the exposure head 4, the flow of air in the direction toward the connector region is blocked by the shielding wall 76. Therefore, the airflow blown against the back surface of the substrate 50 flows in the duct region from one side (front side) to the other side (back side).

The exposure head 4 and the duct unit 60 communicate with each other by the duct (cooling duct 75) formed by the cartridge tray 30 and the elevating duct 69. Therefore, the airflow blown against the back surface of the substrate 50 is guided in the duct (for example, from the front side to the back side in the longitudinal direction of the substrate), and the substrate 50 is cooled in the process.

At the same time as the intake described above, in the duct unit 60, the exhaust fan 63 disposed close to the back side of the image forming apparatus 100 functions as an exhaust fan that exhausts air from the inside of the duct unit 60 to the outside of the apparatus. Therefore, when the exhaust fan 63 rotates, air is taken in from the fourth opening portion 202 (Y, M, C, and K) for each color provided on the upper surface of the exhaust duct 206. The fourth opening portion 202 communicates with the second opening portion 74. Therefore, air in the duct (cooling duct 75) formed by the cartridge tray 30 and the elevating duct 69 is taken in from the fourth opening portion 202 for each color provided on the upper surface of the exhaust duct 206 through the second opening portion 74 communicating vertically.

Here, the second opening portion 74 is an opening portion which communicates with the opening portion 202 which is the fourth opening portion of the duct unit 60 on the back side of the apparatus in the opening portion 64 formed by the cartridge tray 30 and the elevating duct 69.

That is, the second opening portion 74 is disposed closer to the other end side than the center of the substrate 50 in the longitudinal direction, and faces the fourth opening portion 202 when the duct unit 60 is mounted.

Air is taken in from the fourth opening portion 202 of the duct unit 60 through the second opening portion 74. As a result, in the duct formed by the cartridge tray 30 and the elevating duct 69 and the exposure head 4 integrally supported by the elevating duct 69, an exposure cooling airflow which is a flow of air indicated by a dotted line (intra-duct airflow 311) in FIG. 26 is generated, and the substrate 50 on which the LED 51 is mounted is cooled.

In the duct unit 60, the air taken in from the fourth opening portion 202 of the exhaust duct 206 sequentially merges from the right side of the apparatus to the opening portions 202K, 202C, 202M, and 202Y in the exhaust duct 206 as indicated by a dotted line (intra-duct airflow 312) in FIG. 39, and flows from the right side to the left side of the apparatus. The air inside the apparatus taken into the exhaust duct 206 is finally exhausted to the outside of the apparatus through the exhaust port 204.

In the duct unit 60, the cross-sectional area of the intake duct 205 is smaller than the cross-sectional area of the exhaust duct 206. As a result, the volume of air flowing through the exhaust duct 206, which is the exhaust air volume, is larger than the volume of air flowing through the intake duct 205, which is the intake air volume. As a result, it is possible to reliably exhaust air from the exhaust port 204 without leaking the exposure cooling airflow to the outside of the cooling duct 75 formed between the cartridge tray 30 and the elevating duct 69. In addition, with the above-described configuration, the heated air can be prevented from raising the temperature of the developing unit 24 and the like, and toner scattering can be reduced.

In the present embodiment, the air volume balance between intake and exhaust is adjusted by the cross-sectional areas of the intake duct 205 and the exhaust duct 206, but may be adjusted by reducing the air volume of the intake fan 62 with respect to the exhaust fan 63.

(Positioning of Exposure Head)

Next, positioning of the exposure head 4 will be described with reference to FIGS. 26, 43, and 44 to 49.

(Positioning Pin of Exposure Head)

First, positioning pins 45F and 45B of the exposure head 4 will be described.

The housing 54 of the exposure head 4 is provided with a positioning pin 45F as a positioning axis and a positioning pin 45B. Each of the positioning pin 45F and the positioning pin 45B is an example of a metal pin. The housing 54 is an electroconductive member having conductivity, and the positioning pin is also a member having conductivity. The positioning pin 45F and the positioning pin 45B are fixed to both end portions in the longitudinal direction of the housing 54. The positioning pin 45F is fixed to the housing 54 on one side (front side) of the lens array 52 in the axial direction of the photosensitive drum 2, and protrudes from both sides of the housing 54 in the optical axis direction of the lens array 52. The positioning pin 45B is fixed to the housing 54 on the other side (back side) of the lens array 52 in the axial direction of the photosensitive drum 2, and protrudes from both sides of the housing 54 in the optical axis direction of the lens array 52.

In order to ensure the distance between the surface of the photosensitive drum 2 and the light exit surface of the lens array 52 of the exposure head 4 with high accuracy, the positioning pins 45F and 45B adjust the position of the positioning surface at the shaft distal end with reference to the housing 54 and are caulked to the housing 54. Note that the fixing of the positioning pins 45F and 45B to the housing 54 is not limited thereto, and for example, the positioning pin 45F and the positioning pin 45B made of metal may be fixed to the housing 54 made of metal by welding. As described above, in the present embodiment, the positioning pin 45F and the positioning pin 45B are integrated with the housing 54.

Then, the positioning pin 45F and the positioning pin 45B of the exposure head 4 abut on the drum bearing 26 of the drum unit 23 in the moving direction of the elevating duct 69, so that a gap is formed between the lens array 52 and the photosensitive drum 2. In this way, a distance (gap) between the exposure head 4 and the photosensitive drum 2 is determined in a direction orthogonal to the axial direction of the photosensitive drum 2, and the position of the exposure head 4 with respect to the photosensitive drum 2 is determined.

The exposure head 4 is fixed not only by the distance to the photosensitive drum 2 but also by the angle by the positioning pins 45F and 45B. In the image forming apparatus 100 illustrated in FIG. 2, the exposure head 4 is disposed toward the center of the photosensitive drum 2. This arrangement is adopted because it is not necessary to consider the influence of regular reflection on the surface of the photosensitive drum 2 in the mechanism of the LED (light emitting element) 51 included in the exposure head 4.

Figure 43:
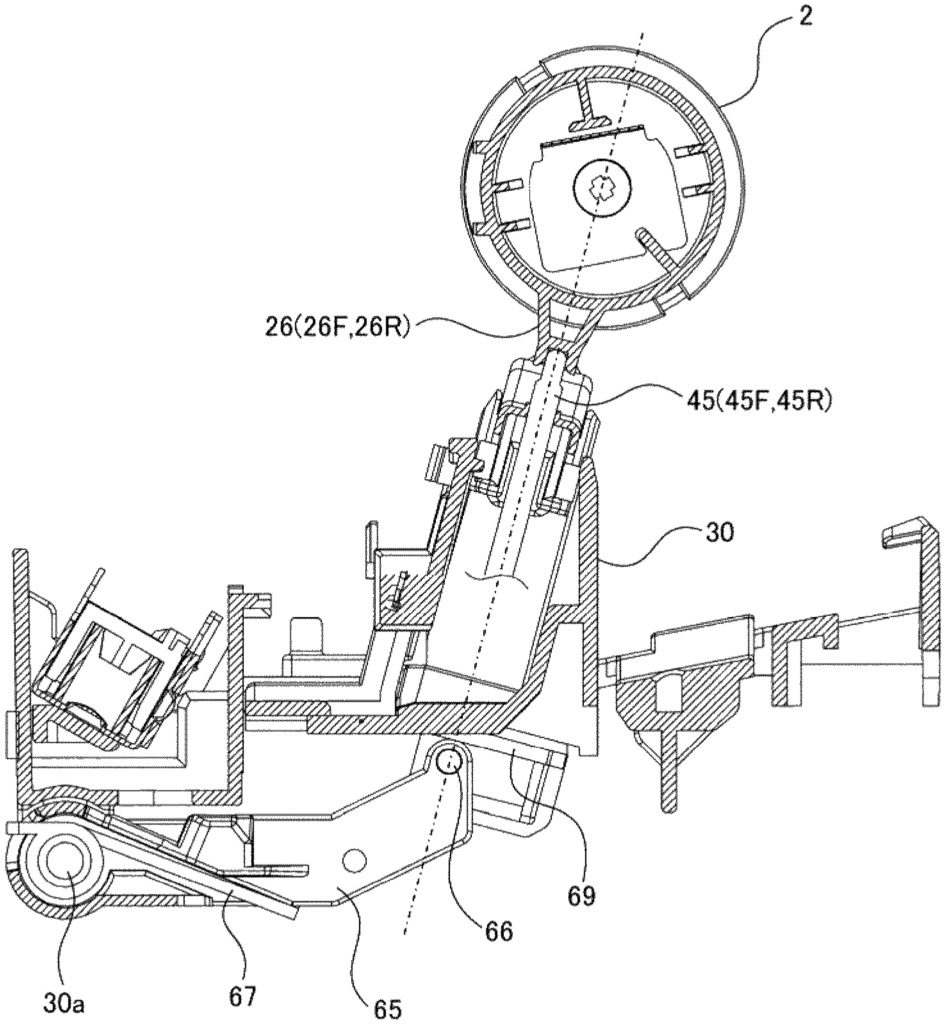
FIG. 43 is a cross-sectional view of a photosensitive drum, the exposure head, and the rotating arm.

FIG. 43 is a cross-sectional view illustrating a relationship among three components, namely, the photosensitive drum 2, a part of the positioning pins 45F and 45B (the distal end on the positioning side), and the rotating arm 65. FIG. 43 is a cross-sectional view taken along line Y-Y in FIG. 24, and only peripheral components of the three components are visualized. Note that the cross-sectional position is moved to the center of the positioning pins 45F and 45B.

Figure 44:
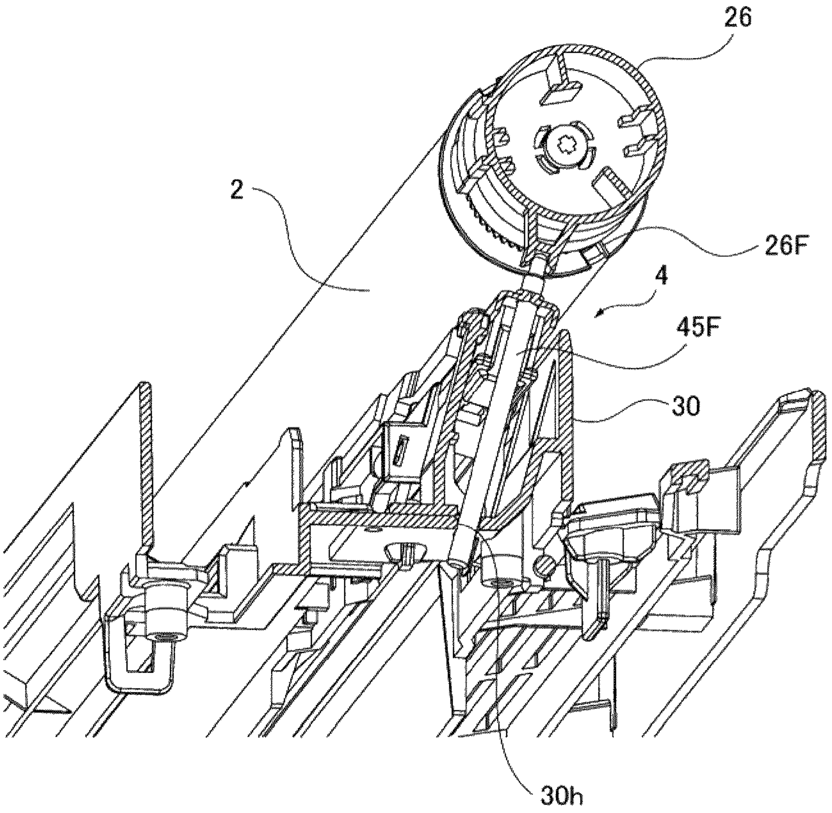
FIG. 44 is a cross-sectional perspective view illustrating positioning on the front side of the photosensitive drum and the exposure head.
Figure 45:
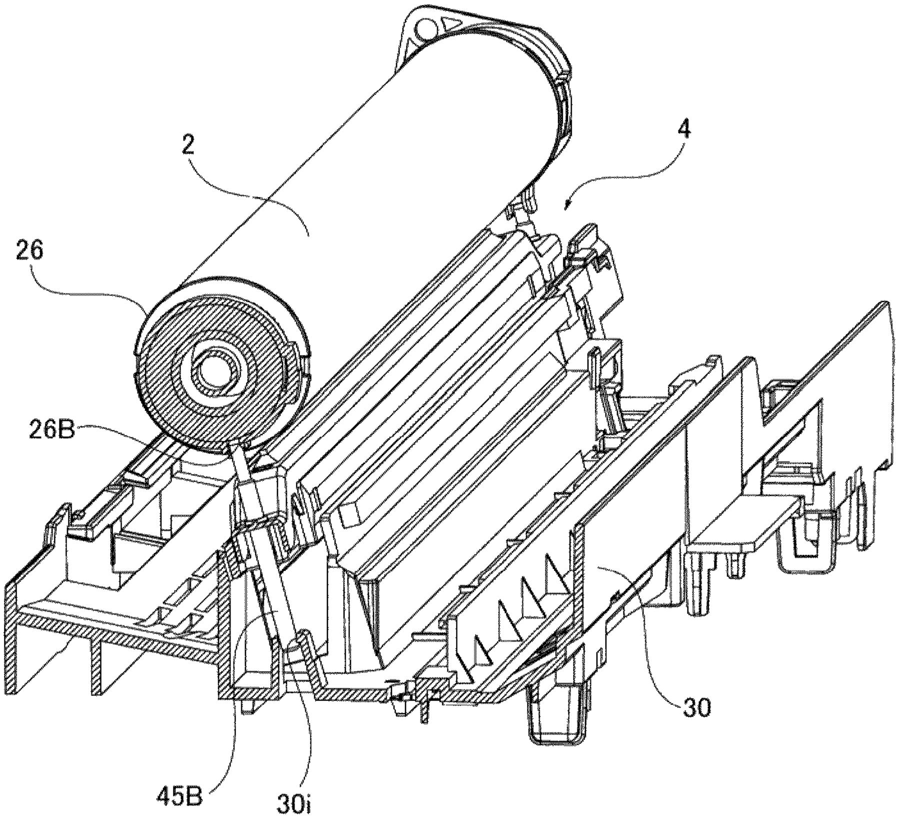
FIG. 45 is a cross-sectional perspective view illustrating positioning on the rear side of the photosensitive drum and the exposure head.

FIG. 44 is a perspective view of the positioning pins 45F and 45B as viewed from a front surface cut in a direction orthogonal to the axial direction of the photosensitive drum 2 at the center position of the positioning pins. FIG. 45 is a perspective view of the positioning pins 45F and 45B as viewed from a rear surface cut in a direction orthogonal to the axial direction of the photosensitive drum 2 at the center position of the positioning pins.

In FIGS. 43 and 44, the positioning pin 45F (45B) on the front side of the exposure head 4 and the drum bearing 26 on the front side of the photosensitive drum 2 abut on the end surface of the positioning pin 45F (45B), whereby the optical axis direction of the exposure head 4 is positioned.

Recessed engagement portions 26F and 26B are integrally formed in the drum bearings 26 at positions facing the positioning pins 45F and 45B so as to be engageable with the distal end portions of the positioning pins 45F and 45B. By processing the diameter dimension of the distal end of the positioning pin 45 and the width dimension of the concave shape of the drum bearing 26 with high accuracy, positioning in the direction orthogonal to the optical axis direction of the exposure head 4 and the direction orthogonal to the axial direction of the photosensitive drum 2 is performed with high accuracy. In addition, an inclined surface is formed at an inlet of the positioning pins 45F and 45B so as not to ride on the concave edge when the positioning pins 45F and 45B are engaged with the engagement portions 26F and 26B of the drum bearing 26.

As illustrated in FIG. 26, the positioning pins 45F and 45B and the drum bearing 26 are not in contact with each other in the axial direction of the photosensitive drum 2, and are positioned by a positioning member 250 described later.

Here, the drum bearing 26 is a bearing member that axially supports front and back ends (both ends) of the photosensitive drum 2 in the drum unit 23. The photosensitive drum 2 is axially supported by the drum bearing 26 without a gap by increasing the dimensional accuracy at the engagement location of the drum bearing 26. That is, positioning with high accuracy on the drum bearing 26 can be regarded as positioning with high accuracy on the photosensitive drum 2. The photosensitive drum 2 is rotationally driven according to the image forming process. Therefore, the positioning pin 45 of the exposure head 4 is positioned with respect to the drum bearing 26.

FIGS. 43 and 44 illustrate a cross section of the drum bearing 26 on the front side of the image forming apparatus, but the drum bearing 26 on the rear side has a similar shape. As illustrated in FIG. 45, the positioning pin 45B of the exposure head 4 is also positioned with high accuracy with respect to the drum bearing 26 on the rear side of the image forming apparatus. Therefore, the exposure head 4 is positioned with high accuracy at both end portions in the axial direction of the photosensitive drum 2.

As illustrated in FIG. 43, a pressing position at which the engagement boss 66 of the rotating arm 65 presses the elevating duct 69, an abutting position between the positioning pins 45F and 45B and the engagement portions 26F and 26B of the drum bearing 26, and a center position of the photosensitive drum 2 are arranged on a substantially straight line as indicated by an alternate long and short dash line.

With this arrangement, the exposure head 4 is pressed toward the center of the photosensitive drum 2, so that an unnecessary rotational moment is not applied to the elevating duct 69. This means that there is no component promoting the inclination of the exposure head 4 with respect to the photosensitive drum 2 in the pressing force, which leads to the positioning accuracy of the distance and angle and the stability of the repeated attaching and detaching operation.

Furthermore, as illustrated in FIGS. 44 and 45, the positioning pins 45F and 45B are supplementarily fitted to the auxiliary fitting portions 30*h* and 30*i* of the cartridge tray 30 in the direction orthogonal to the optical axis direction of the exposure head 4 and the direction orthogonal to the axial direction of the photosensitive drum 2 on the lower end peripheral surfaces thereof. As a result, even when a slight rotational moment is generated due to the weight, surface property, dimensional error, and the like of the component, stable positioning accuracy at a distance and an angle, and repeated attaching and detaching operations can be achieved.

(Positioning Member of Exposure Head)

Next, the positioning of the exposure head 4 in the axial direction of the photosensitive drum 2 by the positioning member 250 will be described in detail with reference to FIGS. 46 to 48.

Figure 46:
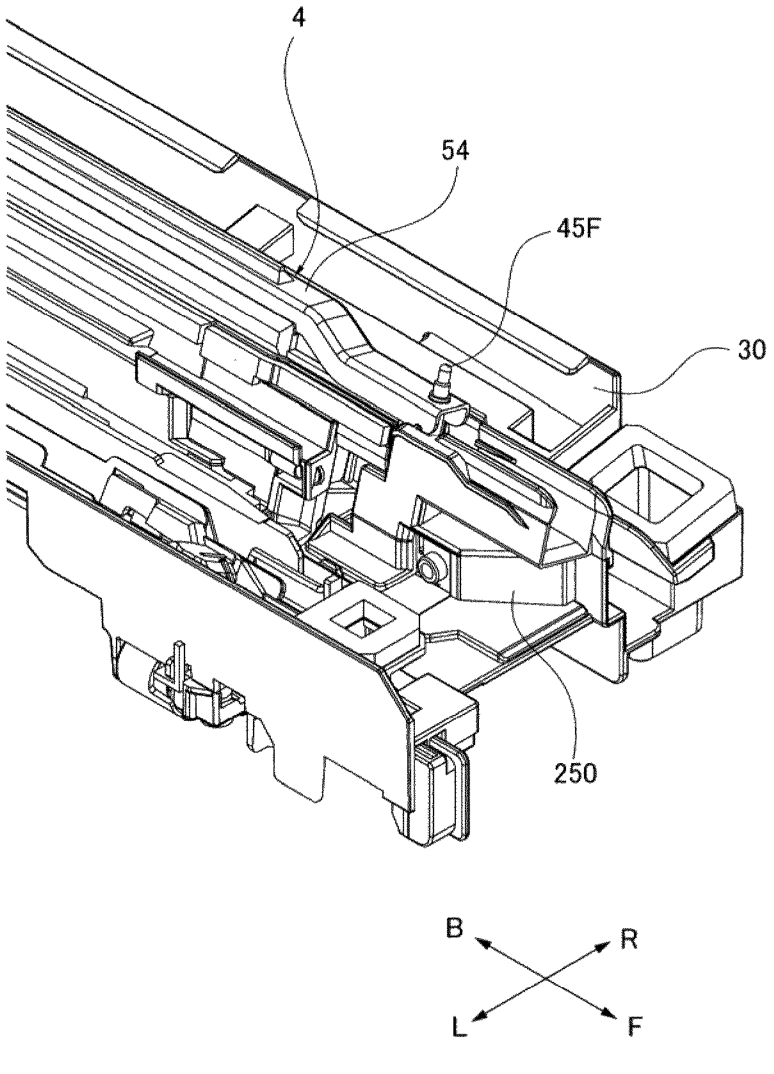
FIG. 46 is a perspective view illustrating a state after a positioning member is attached.
Figure 47:
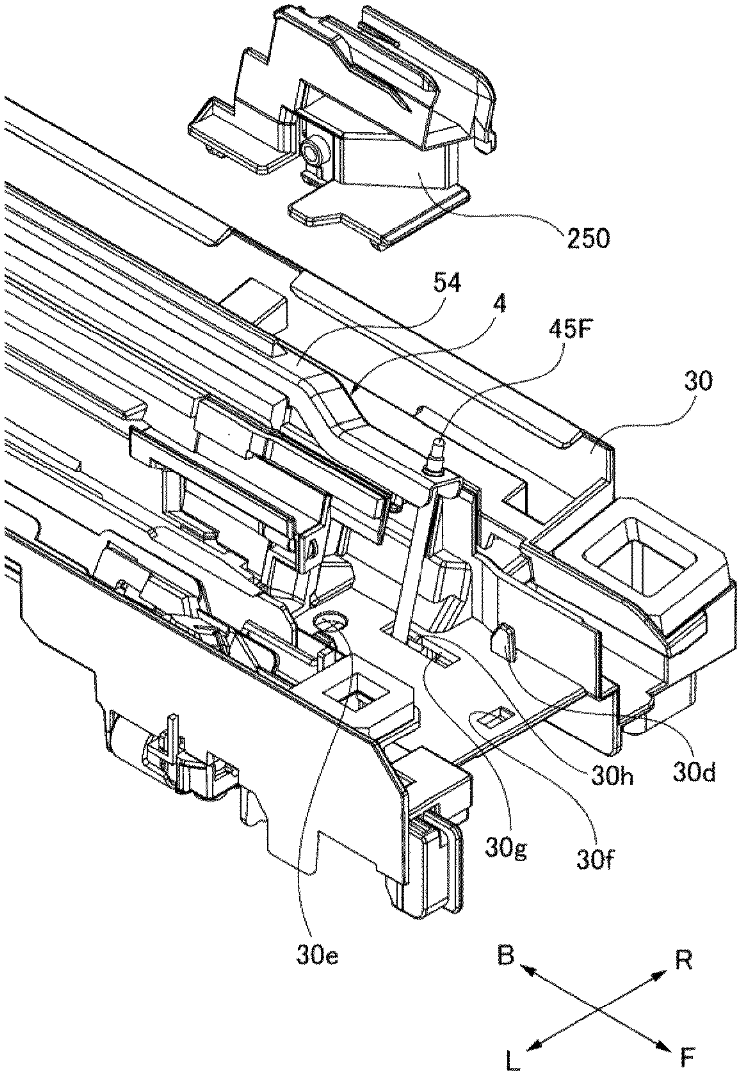
FIG. 47 is a perspective view illustrating a state before the positioning member is attached.

FIG. 46 is a perspective view of the positioning member 250 after attachment, and FIG. 47 is a perspective view of the positioning member before attachment. FIG. 48 is a perspective view illustrating a shape of the positioning member 250.

As illustrated in FIG. 46, the positioning member 250 is attached to the front side of the exposure head 4. As illustrated in FIG. 47, the biasing portion 30*d*, a round hole potion 30*e*, a square hole portion 30*f*, and a claw engagement portion 30*g* are provided on the front side of the cartridge tray 30.

Figure 48:
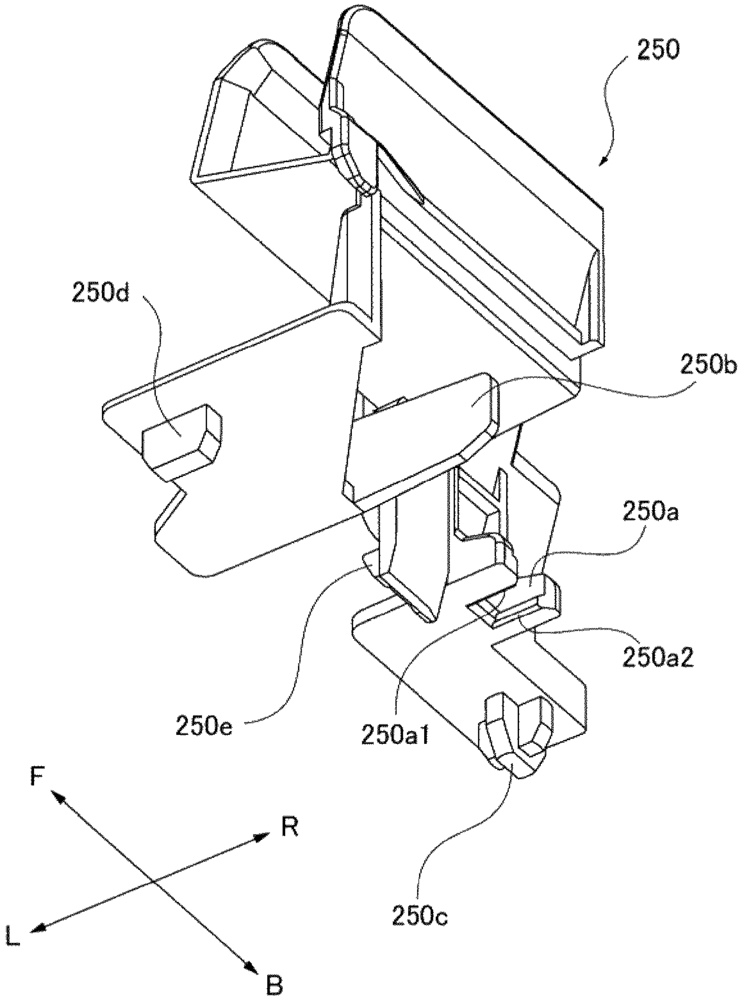
FIG. 48 is a perspective view illustrating a shape of the positioning member.

As illustrated in FIG. 48, a regulating portion 250*a*, which is third engagement portions, a biasing portion 250*b*, a cross projection portion 250*c*, an I-shaped projection portion 250*d*, and a claw portion 250*e* are provided on the lower surface of the positioning member 250.

The outer diameter of the cross projection portion 250*c* is substantially equal to the inner diameter of the round hole portion 30*e*, and the length of the I-shaped projection portion 250*d* in the left-right direction is substantially equal to the length of the square hole portion 30*f* in the left-right direction. By fitting the projection portions 250*c* and 250*d* and the hole portions 30*e* and 30*f*, the positions of the positioning member 250 in the front-back direction and the left-right direction are determined.

The claw portion 250*e* has a barbed shape, and the barbed shape is caught by the claw engagement portion 30*g*, whereby the position of the positioning member 250 in the vertical direction is determined.

The regulating portion 250*a*, which is the third engagement portion, has a first abutting surface 250*al* abutting on one side in the axial direction of the positioning pin 45F and a second abutting surface 250*a*2 abutting on the other side in the axial direction of the positioning pin 45F. The first abutting surface 250*al* and the second abutting surface 250*a*2 face each other in the axial direction. The regulating portion 250*a* has a concave shape opened on the right side in the left-right direction, and a notch width of the concave shape in the front-back direction and an outer diameter of the positioning pin 45F are substantially equal to each other. Here, the left-right direction is a second direction orthogonal to the moving direction (first direction) of the elevating duct 69 and the axial direction of the photosensitive drum 2. By fitting the regulating portion 250*a*, which is the third engagement portion, and the positioning pin 45F, the exposure head 4 in the axial direction of the photosensitive drum 2 is positioned with respect to the positioning member 250.

In this manner, the position of the exposure head 4 in the axial direction of the photosensitive drum 2 can be accurately positioned by the positioning member 250 attached after the attachment of the exposure head 4.

Here, in all the components including the positioning member 250, the cartridge tray 30, and the positioning pin 45F, backlash occurs between the components due to manufacturing variations. In a case where the backlash is large, there is a concern that the position of the exposure head 4 varies due to repeated operations of attaching and detaching the exposure head 4.

In view of the above problem, in the present embodiment, backlash is reduced by the biasing portion 250*b* and the biasing portion 30*d*. The biasing portion 250*b* extends rightward in the left-right direction from the positioning member 250, has a thin thickness in the axial direction of the photosensitive drum 2, and has a shape that is easily elastically deformed in the axial direction of the photosensitive drum 2. On the other hand, the biasing portion 30*d* has a shape protruding from the upper surface of the cartridge tray 30, and is formed in a shape having rigidity so as not to be deformed in the axial direction of the photosensitive drum 2. When the positioning member 250 is attached to the cartridge tray 30, the distal end of the biasing portion 250*b* is configured to interfere with (come into contact with) the biasing portion 30*d*. The front surface of the distal end of the biasing portion 250*b* and the back surface of the biasing portion 30*d* come into contact with each other, and the biasing portion 250*b* is elastically deformed in the back surface direction, so that the reaction force is applied to the positioning member 250 in the back surface direction, that is, from one side to the other side in the axial direction of the photosensitive drum 2.

As described above, by adopting the configuration in which the positioning member 250 is biased in the axial direction of the photosensitive drum 2, it is possible to achieve highly accurate positioning of the exposure head 4 which is hardly affected by repeated operations of attaching and detaching the exposure head 4 and to achieve more precise positioning.

(Replacement and Attachment or Detachment Configuration of Exposure Head)

The replacement and attachment or detachment configuration of the exposure head 4 will be described in detail with reference to FIGS. 33 and 49 to 65. Similarly to FIG. 22, FIG. 33 is cross-sectional views taken along line X-X in FIG. 20. FIG. 33 is a cross-sectional view of the exposure head 4, the elevating duct 69, and the cartridge tray 30 as viewed from the front, in which the drum unit 23 and the developing unit 24 are not illustrated.

As described above, the exposure head 4 is configured to be detachable from the image forming apparatus 100. A procedure for mounting the exposure head 4 will be described in detail with reference to FIGS. 49 to 65.

Figure 49:
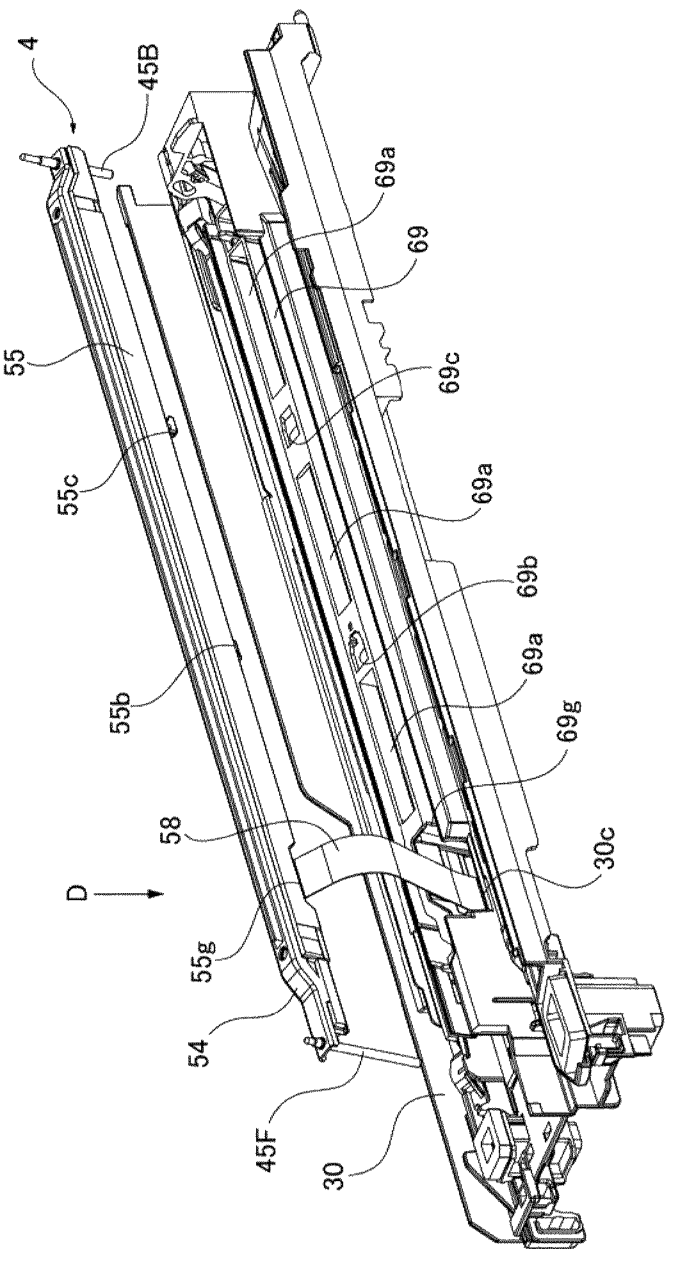
FIG. 49 is a right perspective view of a state where the exposure head is removed from the elevating duct.
Figure 50:
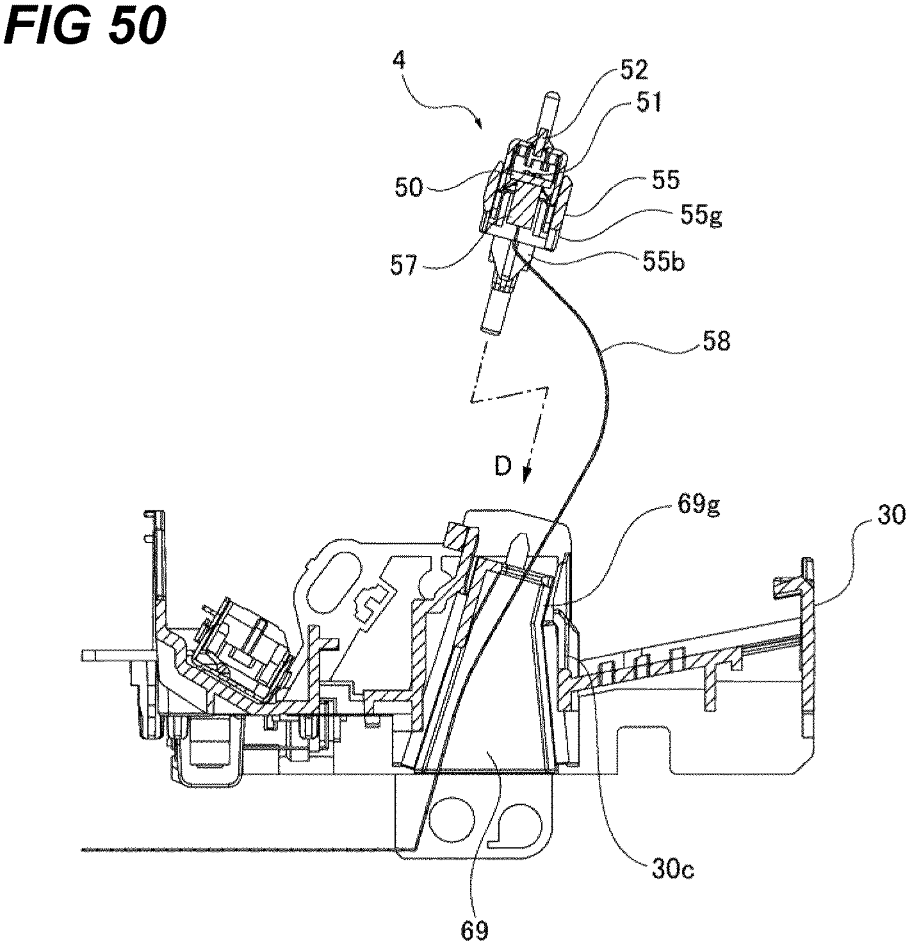
FIG. 50 is a front cross-sectional view of a state where the exposure head is removed from the elevating duct.
Figure 51:
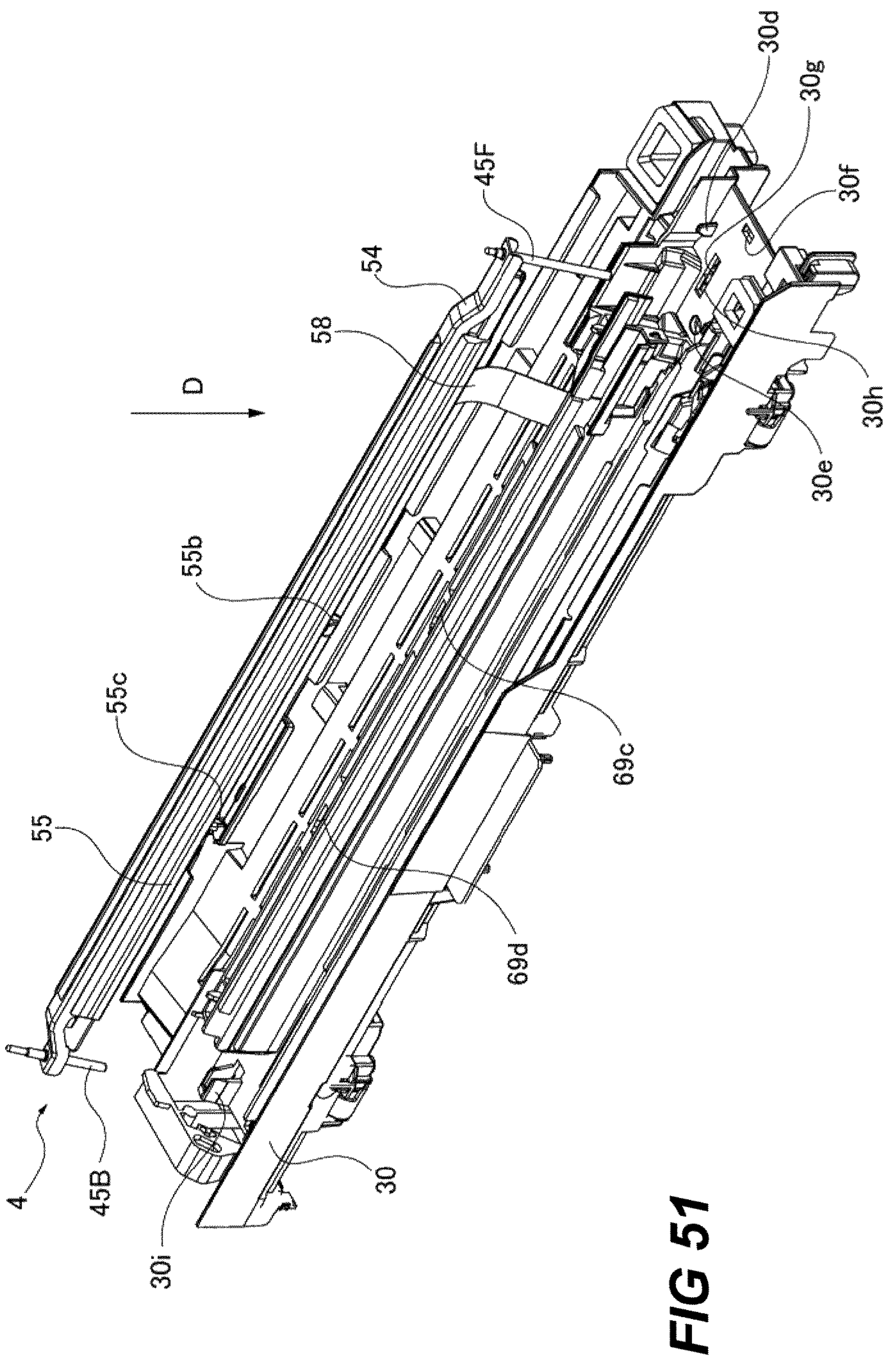
FIG. 51 is a left perspective view of a state where the exposure head is removed from the elevating duct.

FIG. 49 is a right perspective view illustrating a state immediately before the exposure head 4 is mounted on the elevating duct 69, FIG. 50 is a front cross-sectional view thereof, and FIG. 51 is a left perspective view thereof.

In the state of FIGS. 49 and 51, the drum unit 23, the developing unit 24, and the positioning member 250 are removed from the image forming apparatus. The replacement and attachment or detachment of the exposure head 4 are performed in a state where the drum unit 23, the developing unit 24, and the positioning member 250 are removed. In addition, in a state where the photosensitive drum 2 is removed, the exposure head 4 can be manually moved from the retracted position to the exposure position. Therefore, replacement and attachment or detachment of the exposure head 4 are performed in a state where the exposure head 4 is manually moved to the exposure position. At this time, as illustrated in FIG. 50, the FFC 58 connected to the apparatus main body side is previously connected to the FFC connector 57 of the exposure head 4.

As described above, the housing support member 55 of the exposure head 4 is provided with the engagement claws 55*b* and 55*c* for engaging with the elevating duct 69. On the other hand, in the elevating duct 69, the engagement holes 69*b* and 69*c* for engaging with the engagement claws 55*b* and 55*c* are provided in the upper surface portion 69U facing the exposure head 4. Based on this configuration, a procedure of engaging the engagement claws 55*b* and 55*c* of the exposure head with the engagement holes 69*b* and 69*c* of the elevating duct to be integrated is as follows.

First, as illustrated in FIGS. 49 and 51, by moving the exposure head 4 in the direction of arrow D with respect to the elevating duct 69, the engagement claws 55*b* and 55*c* of the exposure head 4 fall into the engagement holes 69*b* and 69*c* of the elevating duct 69, respectively. That is, the engagement claws 55*b* and 55*c* of the exposure head are engaged with the engagement holes 69*b* and 69*c* in the protruding direction. At the same time, the lower end of the positioning pin 45F of the exposure head 4 falls into the auxiliary fitting portion 30*h* of the cartridge tray 30 with a gap. At this time, the extra length of the FFC 58 connected to the substrate of the apparatus main body and the substrate of the exposure head 4 protrudes from the harness opening portion 252 described later. A state at this time is illustrated in FIGS. 52 to 56.

Figure 53:
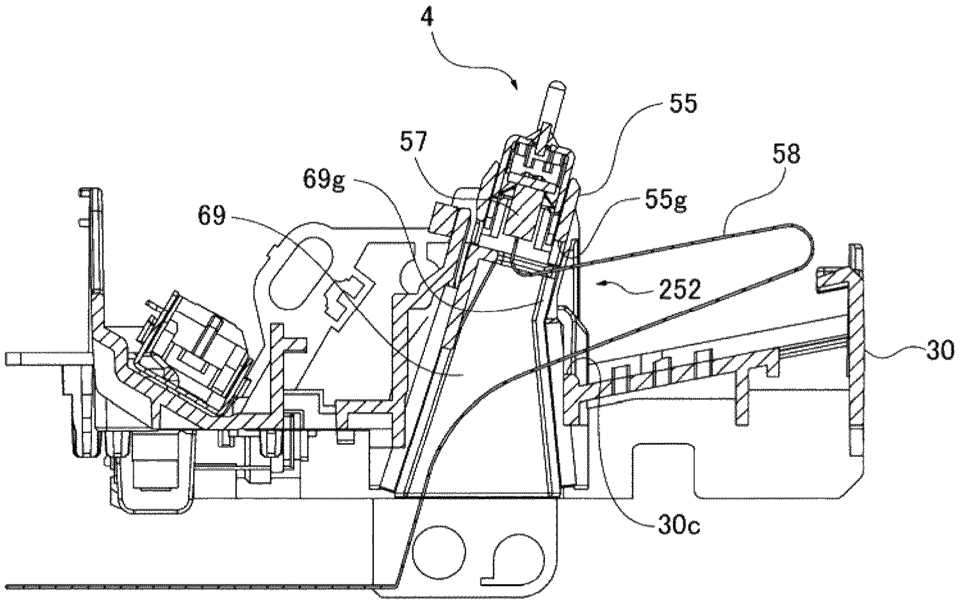
FIG. 53 is a front cross-sectional view of a state where the exposure head is placed in the elevating duct.
Figure 54:
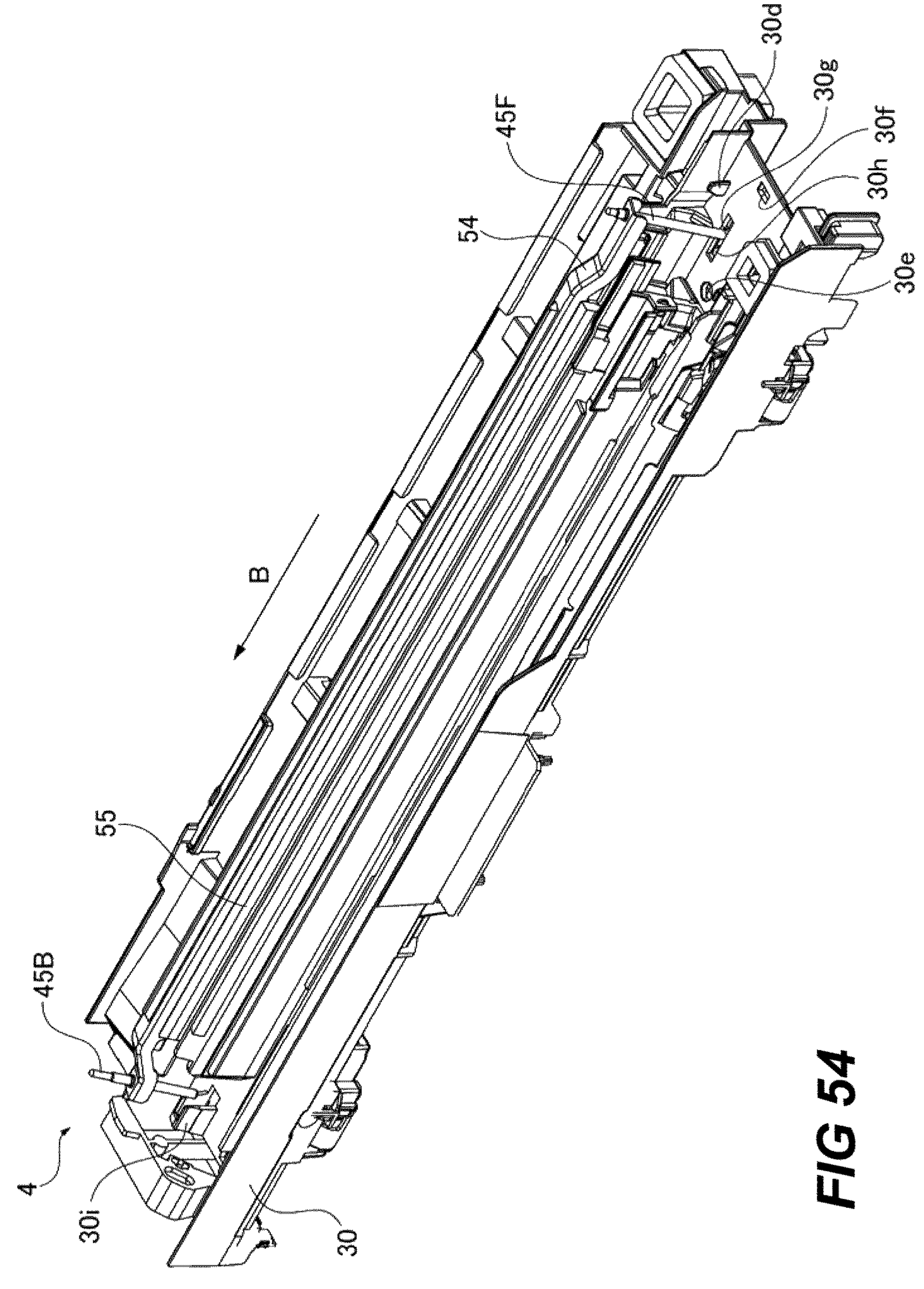
FIG. 54 is a left perspective view of a state where the exposure head is placed in the elevating duct.
Figure 55:
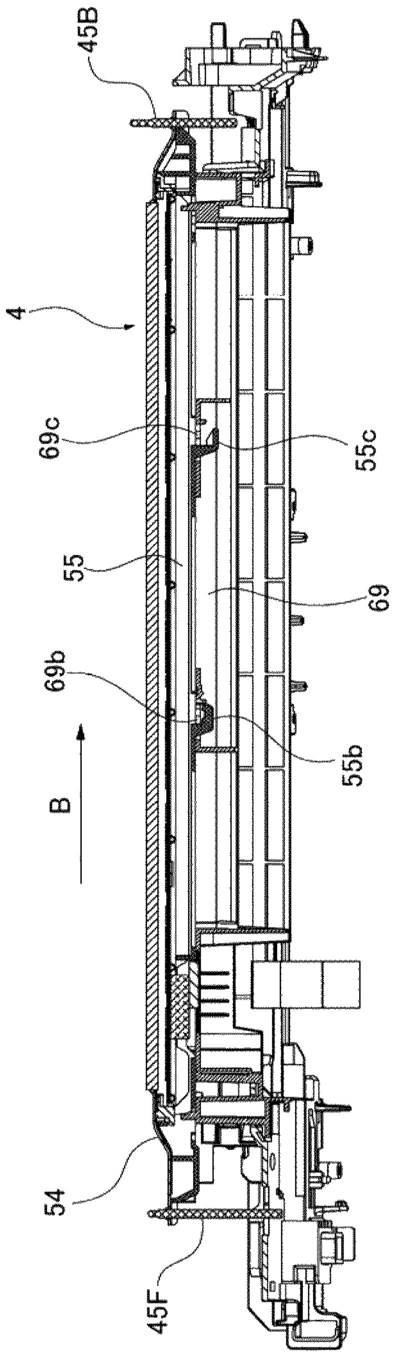
FIG. 55 is a cross-sectional view of a state where the exposure head is placed in the elevating duct.
Figure 56:
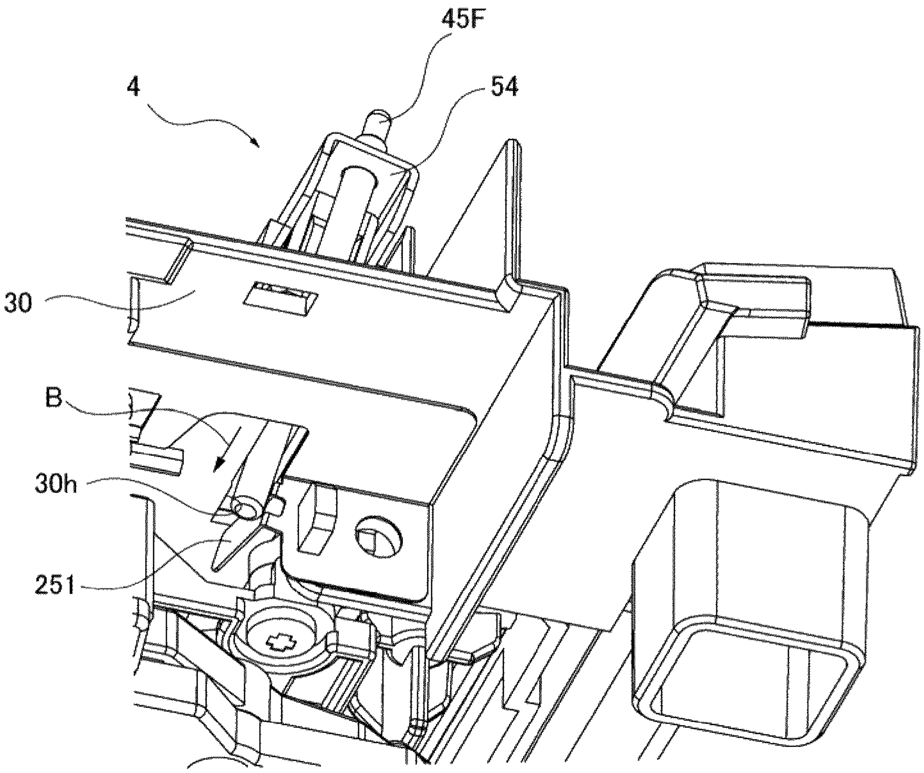
FIG. 56 is a perspective view of the vicinity of a conductive member in a state where the exposure head is placed in the elevating duct.

FIG. 52 is a right perspective view of a state where the exposure head 4 is placed in the elevating duct 69, FIG. 53 is a front cross-sectional view thereof, and FIG. 54 is a left perspective view thereof. FIG. 55 is a cross-sectional view of a state where the exposure head 4 is placed in the elevating duct 69. FIG. 56 is a perspective view of the vicinity of a conductive member in a state where the exposure head 4 is placed in the elevating duct 69.

Next, as illustrated in FIG. 52, the exposure head 4 is slid in the direction of arrow B with respect to the elevating duct 69, and the engagement claws 55*b* and 55*c* are engaged with the engagement holes 69*b* and 69*c* in the extending direction orthogonal to the protruding direction. A state at this time is illustrated in FIGS. 57 to 61.

Figure 58:
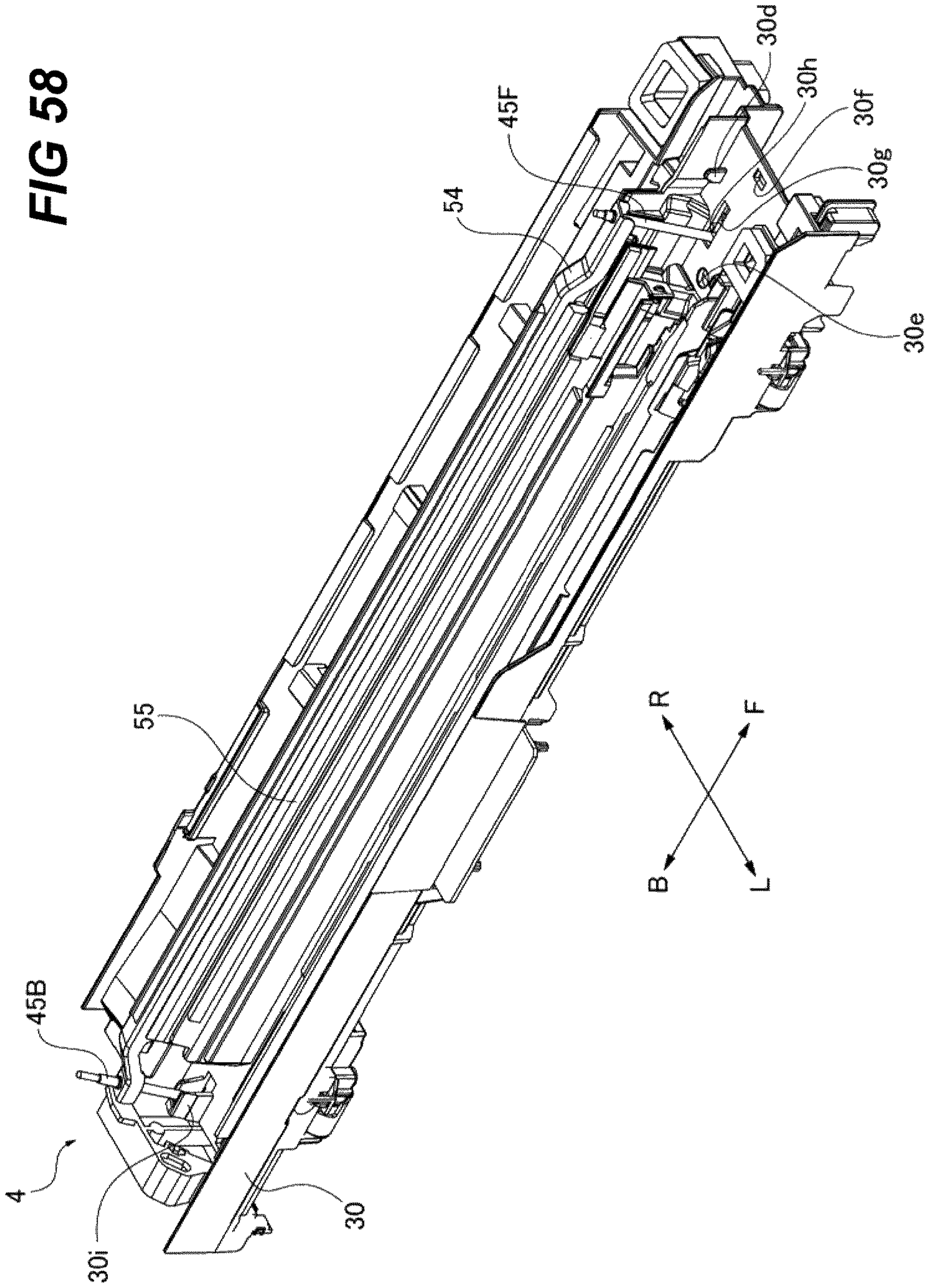
FIG. 58 is a left perspective view of a state where the exposure head is attached to the elevating duct.
Figure 59:
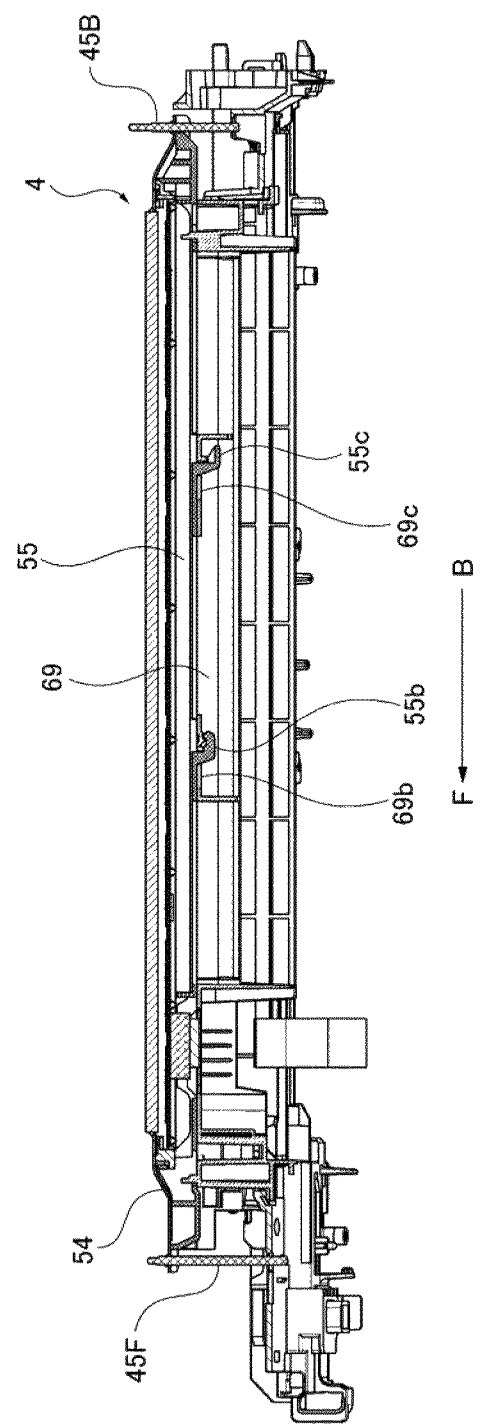
FIG. 59 is a cross-sectional view of a state where the exposure head is attached to the elevating duct.
Figure 60:
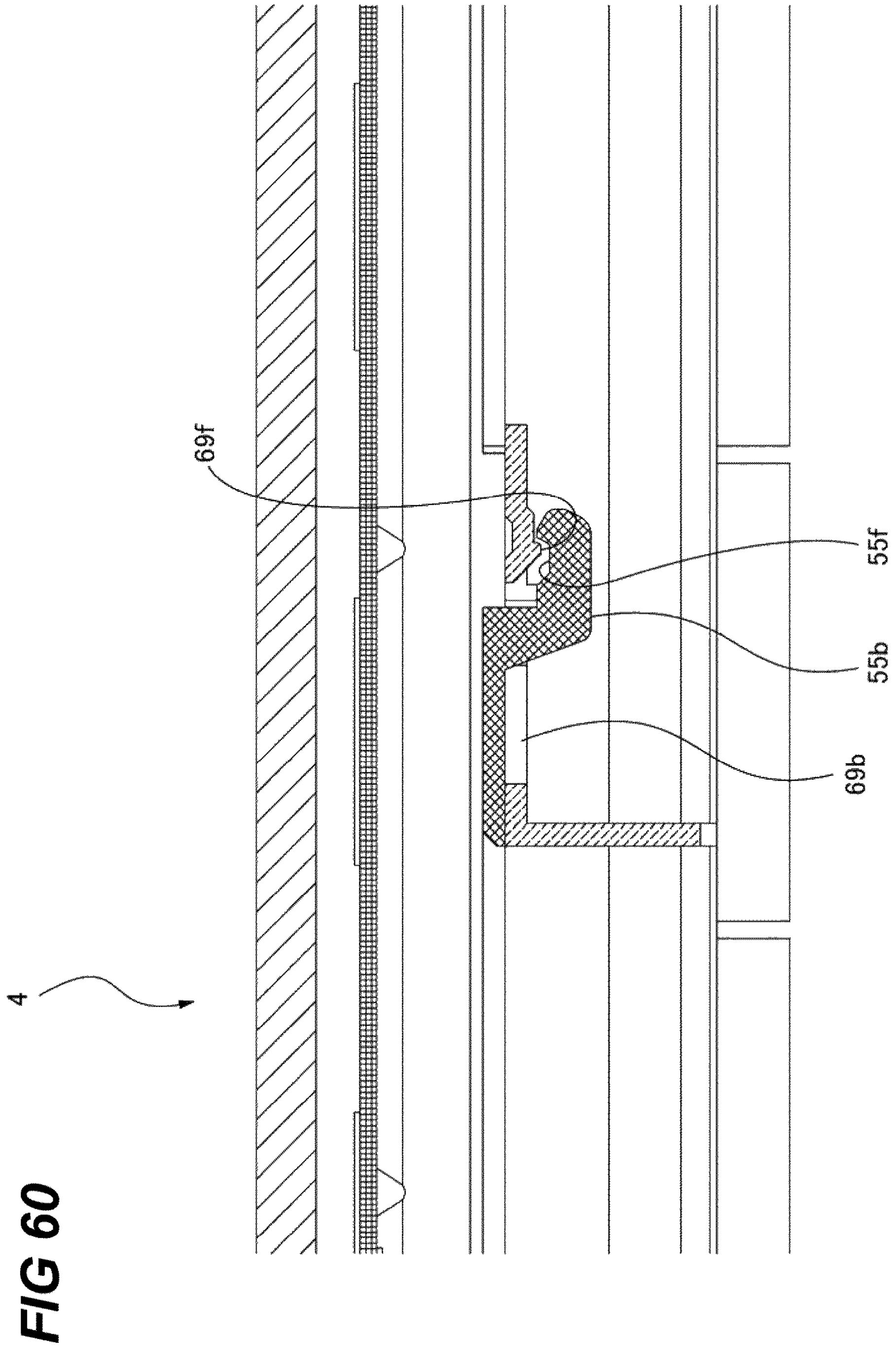
FIG. 60 is an enlarged cross-sectional view of an engagement portion illustrated in FIG. 59.
Figure 61:
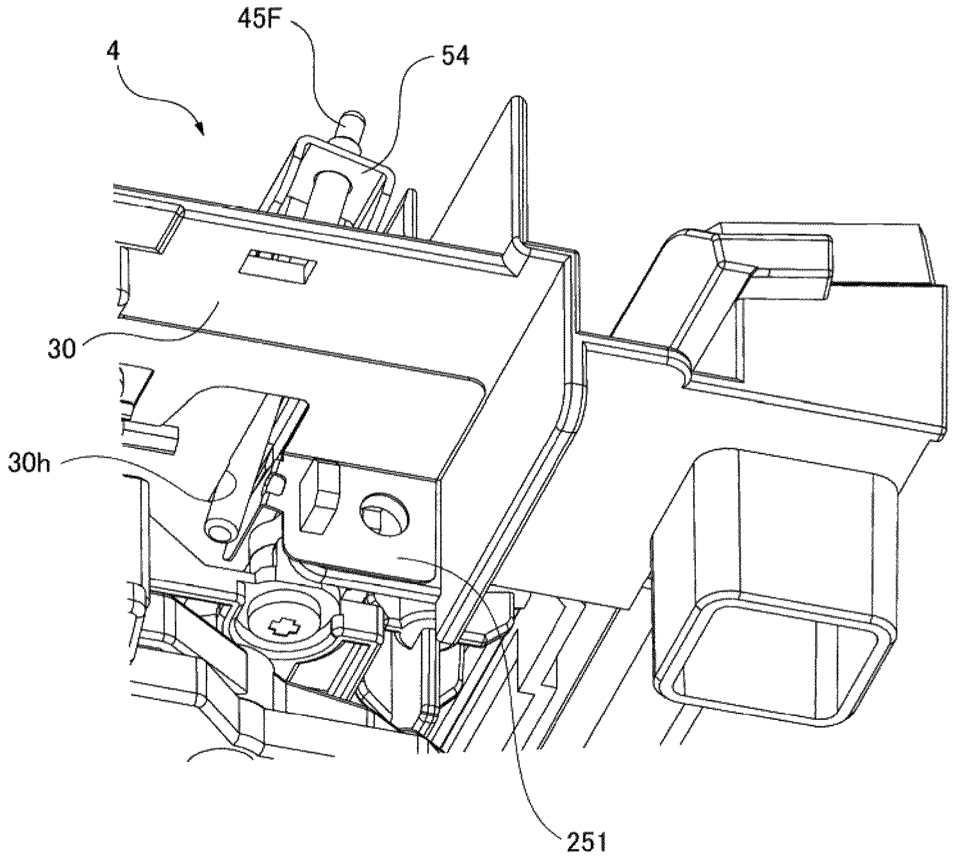
FIG. 61 is a perspective view of the vicinity of the conductive member in a state where the exposure head is attached to the elevating duct.
Figure 62:
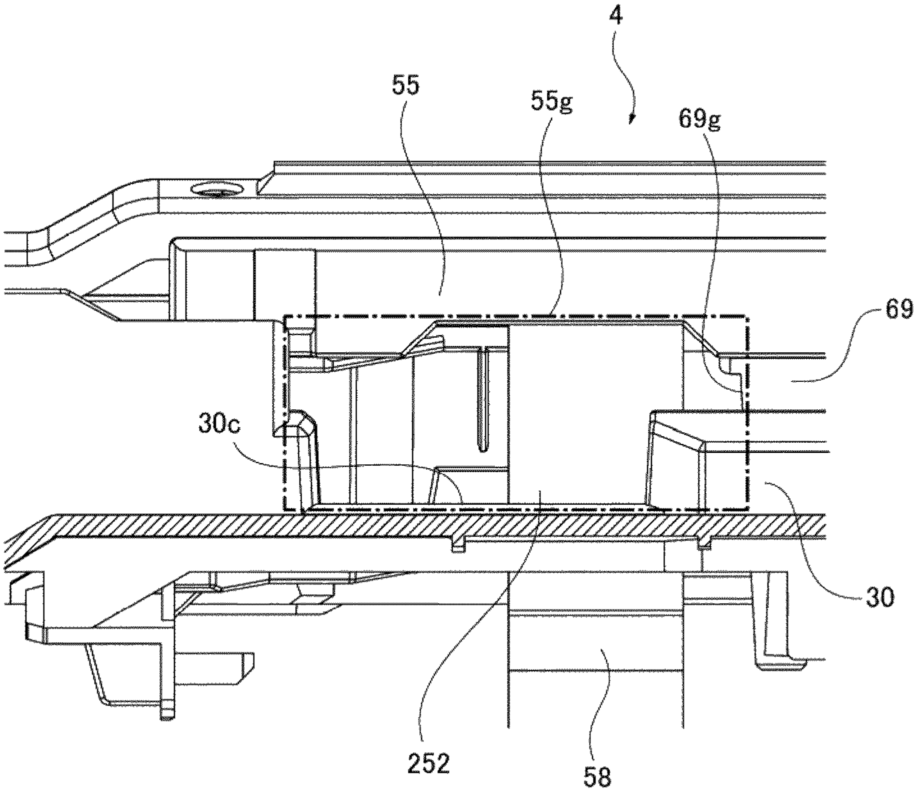
FIG. 62 is a right cross-sectional view illustrating a harness opening portion.
Figure 63:
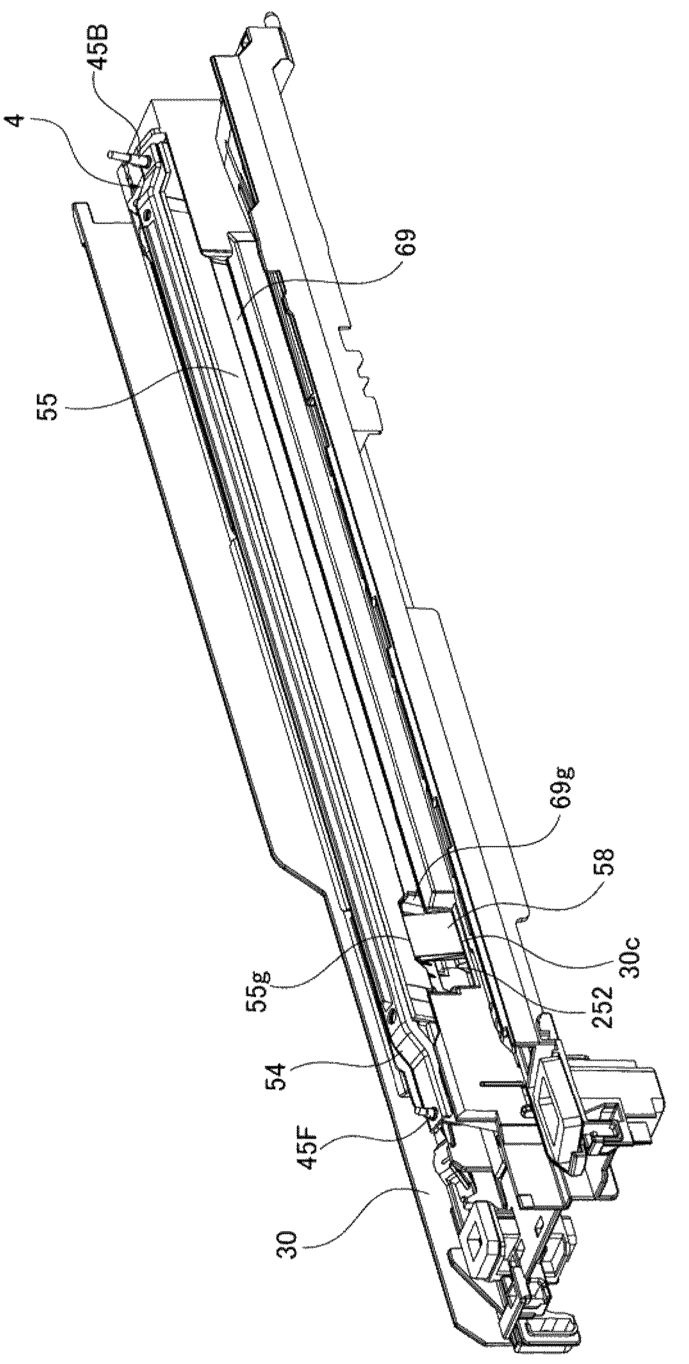
FIG. 63 is a right perspective view in a state where extra length processing of an FFC is performed.
Figure 64:
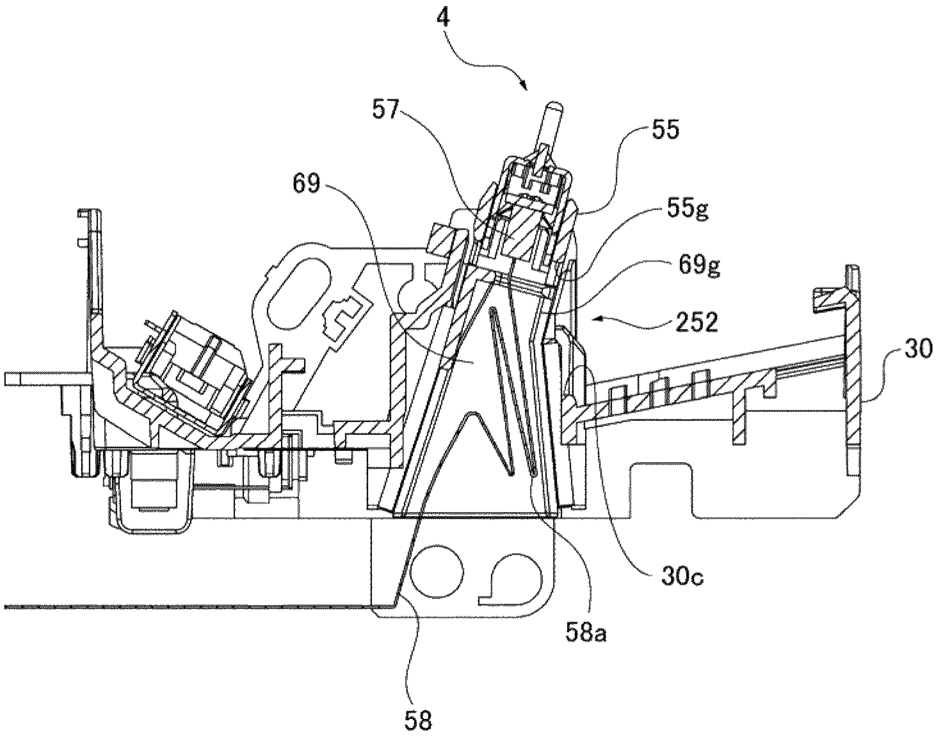
FIG. 64 is a front cross-sectional view in a state where the extra length processing of the FFC is performed.
Figure 65:
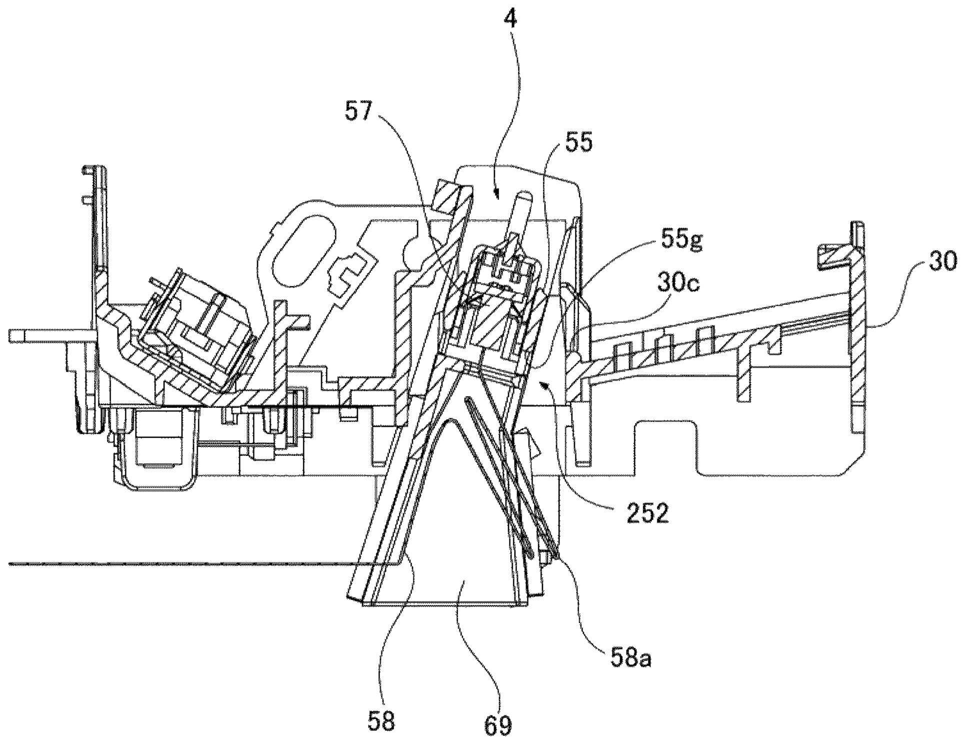
FIG. 65 is a front cross-sectional view illustrating a state of the FFC in a retracted position.

FIG. 57 is a right perspective view of a state where the exposure head 4 is mounted on the elevating duct 69, and FIG. 58 is a left perspective view thereof. FIG. 59 is a cross-sectional view taken along line W-W in FIG. 33, and is a cross-sectional view in a state where the exposure head 4 is mounted on elevating duct 69. FIG. 60 is an enlarged cross-sectional view of an engagement portion illustrated in FIG. 59. FIG. 61 is a perspective view of the vicinity of a conductive member in a state where the exposure head 4 is mounted on the elevating duct 69. FIG. 62 is a right cross-sectional view illustrating a harness opening portion. FIG. 63 is a right perspective view in a state where extra length processing of the FFC is performed. FIG. 64 is a front cross-sectional view of a state where the extra length processing of the FFC is performed. FIG. 65 is a front cross-sectional view illustrating a state of the FFC in the retracted position.

The engagement claws 55*b* and 55*c* of the exposure head 4 are formed so as to protrude toward the elevating duct 69, and have a substantially L shape extending in the arrow B direction which is the sliding movement direction of the exposure head 4. Therefore, by the sliding movement in the direction of the arrow B, the claw ends of the substantially L-shaped engagement claws 55*b* and 55*c* are engaged with the edges of the engagement holes 69*b* and 69*c*. By this engagement, the exposure head 4 is mounted on the elevating duct 69 and is integrated with the elevating duct 69 at the position shown in FIGS. 57 to 59.

In this way, the posture is stabilized in a state where the engagement claws 55*b* and 55*c* of the exposure head 4 are made to pass through the engagement holes 69*b* and 69*c* of the elevating duct 69, and then the exposure head 4 is slid to complete the mounting. Accordingly, easy mounting of the exposure head 4 can be achieved with an inexpensive configuration.

(Relationship Between Engagement Claw and Engagement Hole)

Here, the relationship between the engagement claws of the exposure head 4 and the engagement holes of the elevating duct 69 will be described in more detail with reference to FIG. 60. Here, the relationship between the engagement claw 55*b* of the exposure head 4 and the engagement hole 69*b* of the elevating duct 69 will be described, but the same applies to the relationship between the engagement claw 55*c* of the exposure head 4 and the engagement hole 69*c* of the elevating duct 69.

As illustrated in FIG. 60, the engagement claw 55*b* has elasticity, and a concave portion 55*f* is provided at the extended distal end of the engagement claw 55*b*. A convex portion 69*f* to be engaged with the concave portion 55*f* is provided at an edge of the engagement hole 69*b* corresponding to the concave portion 55*f*. The convex portion 69*f* provided at the edge of the engagement hole 69*b* is disposed at a position corresponding to the concave portion 55*f* provided at the distal end of the engagement claw 55*b* at the slide operation completion position of the exposure head 4 with respect to the elevating duct 69, that is, the mounting completion position.

Immediately before the completion of the sliding operation of the exposure head 4 in the direction of the arrow K, the distal end of the engagement claw 55*b* interferes with the convex portion 69*f* and the engagement claw 55*b* is elastically deformed, so that the sliding operation force of the exposure head 4 once rises compared to the operation force immediately before the interference. Thereafter, the concave portion 55*f* of the engagement claw 55*b* immediately reaches the convex portion 69*f*, and the concave portion 55*f* and the convex portion 69*f* are engaged with each other, so that the sliding operation force of the exposure head 4 decreases. That is, when the exposure head 4 is moved in the extending direction with respect to the elevating duct 69, the engagement clawprojection 55*b* is elastically deformed until the concave portion 55*f* and the convex portion 69*f* are engaged with each other, so that the operation force for moving the exposure head 4 in the extending direction is changed. By the rapid increase or decrease of the sliding operation force of the exposure head 4, it is possible to provide a click feeling indicating that the sliding operation of the exposure head 4 is completed.

As described above, the sliding operation force of the exposure head 4 is changed by the elastic deformation of the engagement claw 55_b_ until the concave portion 55_f_ of the engagement claw 55_b_ and the convex portion 69_f_ of the engagement hole 69_b_ are engaged, whereby the completion of the mounting of the exposure head 4 can be clearly presented.

As described above, as illustrated in FIGS. 44 and 45, the positioning pins 45F and 45B of the exposure head 4 are supplementarily fitted to the auxiliary fitting portions 30_h_ and 30_i_ of the cartridge tray 30 on the lower end peripheral surface thereof. As illustrated in FIGS. 54 and 58, this fitting is simultaneously performed by the sliding operation of the exposure head 4 in the direction of the arrow B.

Furthermore, in the present embodiment, the earth connection between the housing 54 of the exposure head 4 and the image forming apparatus 100 is also simultaneously performed by the above-described sliding operation of the exposure head 4 in the direction of arrow B. The housing 54 of the exposure head 4 and the positioning pins 45F and 45B are caulked and fixed, and conduction is established. As illustrated in FIGS. 56 and 61, the earth connection with the image forming apparatus 100 is performed by the peripheral surface of the positioning pin 45F of the exposure head 4 coming into contact with the conductive member 251 provided in the cartridge tray 30 on the apparatus side. The conductive member has conductivity. Specifically, the conductive member 251 is made of a metallic thin plate. Therefore, a sufficient contact pressure can be obtained by contact and deformation by the sliding operation of the exposure head 4. The conductive member 251 is electrically connected to the frame body sheet metal of the image forming apparatus 100 via a circuit board on which a harness, a resistance element for noise removal, and a capacitor (not illustrated) are mounted.

In this manner, the positioning pin 45F of the exposure head 4 can be electrically connected to the conductive member 251 by the sliding operation, and the exposure head 4 can be connected to the ground. As a result, the exposure head 4 can be connected to the ground or the like with easy work to reduce generation of radiation noise such as electromagnetic waves. That is, a stable grounding characteristic can be obtained only by a sliding operation for mounting the exposure head 4 on the elevating duct 69.

(Extra Length Processing of FFC)

Here, extra length processing of the FFC 58 will be described.

FIG. 62 is a right cross-sectional view illustrating a harness opening portion. The harness opening portion 252 includes a first opening forming portion 55_g_ formed in the housing support member 55 constituting the exposure head 4, a second opening forming portion 69_g_ formed in the elevating duct 69 to be left on the main body side of the image forming apparatus 100 at the time of replacement, and a second opening forming portion 30_c_ formed in the cartridge tray 30.

In other words, the harness opening portion 252 is formed to be surrounded by the first opening forming portion 55_g_ provided in the vicinity of the connector 57 of the exposure head 4 and the second opening forming portions 69_g_ and 30_c_ provided in the vicinity of the first opening forming portion 55_g_ and provided in the apparatus main body. Here, a configuration in which the second opening forming portion constituting the harness opening portion 253 is provided in each of the elevating duct 69 and the cartridge tray 30 is illustrated.

In the present embodiment, the harness opening portion 252 is formed on the drum unit 23 side which is a photoconductor unit. This is because a part of a duct serving as a flow path of an airflow (development cooling airflow) for cooling the developing unit 24 is provided on the developing unit 24 side by the developing unit 24 and the developing support member 301. Thus, the harness opening portion 252 is provided on the drum unit 23 side so as not to affect the development cooling airflow.

In this manner, by providing the harness opening portion 252 on the drum unit 23 side arranged in the vicinity of the exposure head 4, it is possible to prevent the influence on the airflow flowing along the developing unit 24.

As illustrated in FIGS. 52, 53, and 57, in the state in which the exposure head 4 is dropped into the elevating duct 69 and the state in which the exposure head 4 is mounted, the extra length of the FFC 58 protrudes from the harness opening portion 252 toward the drum support member 302 side, and interferes with the insertion and removal locus of the drum unit 23.

The extra length of the FFC 58 is slack (extra length) of the FFC 58 formed between the exposure head 4 and the elevating duct 69 in a state where the exposure head 4 is dropped into the elevating duct and in a state where the exposure head 4 is mounted.

In this manner, the exposure head 4 can be mounted on the image forming apparatus in a state where the extra length of the FFC 58 is drawn out from the harness opening portion 252 including the first opening forming portion 55_g_ and the second opening forming portions 69_g_ and 30_c_.

After the exposure head 4 is mounted on the elevating duct 69, the extra length processing of the FFC 58 is performed. The FFC 58 has a bent portion 58_a_ which is bent at least at one place in advance. The FFC 58 stores the extra length from the harness opening portion 252 while folding along the bent portion 58_a_.

FIGS. 63 and 64 illustrate a state where the extra length processing of the FFC 58 is performed. FIG. 63 is a right perspective view in a state where the extra length processing of the FFC 58 is performed. FIG. 64 is a front cross-sectional view of a state where the extra length processing of the FFC 58 is performed. FIG. 64 is a cross-sectional view in the front direction at the position of the FFC 58 in a state where the exposure head 4 approaches the photosensitive drum 2 by the moving mechanism of the exposure head 4 (hereinafter, the exposure head proximity state). By bending and storing the FFC 58 a plurality of times in the optical axis direction, an extra length of the FFC 58 can be stored in a space-saving manner particularly on the upper side close to the FFC connector 57.

As illustrated in FIG. 64, the length of the FFC 58 from the end portion on the connection side with the FFC connector 57 to the first bent portion 58_a_ as viewed from the end portion is longer than the distance from the harness opening portion 252 to the FFC connector 57. As a result, the bent portion 58_a_ of the FFC 58 is prevented from being caught by the harness opening portion 252, and the FFC 58 can be prevented from protruding from the harness opening portion 252.

FIG. 65 is a cross-sectional view in the front direction at the position of the FFC 58 in a state where the exposure head 4 is retracted from the photosensitive drum 2 by the moving mechanism of the exposure head 4 (hereinafter, the exposure head retracted state). It can be understood that the opening area of the harness opening portion 252 in the exposure head retracted state illustrated in FIG. 65 is smaller than that in the exposure head proximity state illustrated in FIG. 64. Accordingly, even when the exposure head 4 is moved a plurality of times between the exposure head proximity state and the retracted state by the moving mechanism, it is possible to prevent the FFC 58 from protruding from the harness opening portion 252.

Finally, by assembling the positioning member 250 to the cartridge tray 30 as illustrated in FIG. 47, the mounting of the exposure head 4 is completed as illustrated in FIG. 46.

Next, a procedure for removing the exposure head 4 will be described with reference to FIGS. 49 to 65.

The removal of the exposure head 4 is also performed in the exposure head proximity state (FIGS. 52 and 54) similarly to the mounting described above, and is basically performed in the reverse order of the mounting.

First, the claw portion 250*e* of the positioning member 250 is deformed from the state of FIG. 46 to release the engagement from the claw engagement portion 30*g* of the cartridge tray 30, and the positioning member 250 is removed from the cartridge tray 30 as illustrated in FIG. 25.

In the case of removing the exposure head 4, unlike the case of the mounting, it is not necessary to perform the extra length processing of the FFC 58, for example, work of pulling out the FFC 58 from the harness opening portion 252.

Next, the exposure head 4 is slid and moved in a direction opposite to the direction of the arrow B illustrated in FIG. 52 to release the engagement between the engagement claws 55*b* and 55*c* and the engagement holes 69*b* and 69*c* so as to be separable from the elevating duct 69.

Finally, the exposure head 4 is lifted in a direction opposite to the direction of the arrow D illustrated in FIG. 49, and the engagement claws 55*b* and 55*c* are pulled out from the engagement holes 69*b* and 69*c*. At the same time as the exposure head 4 is lifted, the FFC 58 that has been folded and stored extends, so that the exposure head 4 can be pulled out to the outside of the image forming apparatus 100. By pulling out the FFC 58 from the FFC connector 57 in this state, the removal of the exposure head 4 is completed.

OTHER EMBODIMENTS

The configuration according to the present invention is not limited to the above-described embodiment.

In the above-described embodiment, the four-color full-color printer of the tandem type-intermediate transfer system has been described as an example, but for example, a direct transfer type in which a toner image is transferred from the photosensitive drum 2 to the recording sheet P without using the intermediate transfer belt 9 may be used. Furthermore, a mono-color or full color printer of five or more colors using a spot color toner may be used. In that case, a configuration including the exposure heads 4 corresponding to the number of colors may be used.

In the above-described embodiment, an elastic body such as sponge or rubber using urethane, silicone, or the like as a material is used as the sealing member 207, but a gap of each opening portion may be closed by elastically deforming a resin sheet such as PET, modified PPE, or PE.

Further, although a configuration in which the sealing member 207 is disposed in the duct unit 60 is used, for example, a configuration in which the sealing member is disposed in the cartridge tray 30 or the elevating duct 69 may be used, or a configuration in which the sealing member is disposed in a plurality of parts may be selected.

Further, the third opening portion 201 and the fourth opening portion 202 of the duct unit 60 are connected to the opening portion 64 (the first opening portion 73 and the second opening portion 74) formed by the cartridge tray 30 and the elevating duct 69, but the present invention is not limited thereto. For example, the opening portion 64 may be eliminated, the first opening portion 73 and the second opening portion 74 may be provided in the elevating duct 69, and the third opening portion 201 and the fourth opening portion 202 of the duct unit 60 may be directly connected to the first opening portion 73 and the second opening portion 74, respectively.

Further, in the above-described embodiment, the duct unit 60 is configured to have one opening portion including both the third opening portion 201 and the fourth opening portion 202, but only one of the openings may be provided. In that case, either the first opening portion 73 or the second opening portion 74 on the image forming apparatus side may be brought into close contact with the third opening portion 201 or the fourth opening portion 202 via the sealing member 207. At this time, one of the first opening portion 73 and the second opening portion 74 on the image forming apparatus side may be brought into close contact, and the other opening portion may be extended to a space where there is no possibility of toner scattering.

Furthermore, in the above-described embodiment, the configuration in which the cooling duct 75 (see FIG. 26) is formed between the duct unit 60 and the cartridge tray 30 or the elevating duct 69 has been exemplified, but the cooling duct is not necessarily formed by the duct unit 60. In this case, the cooling duct 75 may be formed only by the cartridge tray 30 or the elevating duct 69.

In the embodiment described above, the intake port 203 is configured to directly intake air from the outside of the image forming apparatus 100 and directly exhaust air from the exhaust port 204 to the outside of the apparatus, but such a configuration is not necessarily required. For example, the intake port 203 may be configured to intake relatively low-temperature air from a space without a heat source such as the sheet cassette 12. In addition, the exhaust port 204 may also be configured to exhaust air to a space not affected by heat inside the image forming apparatus 100.

In addition, the intake fan 62 and the exhaust fan 63 are not necessarily required, and one or both of them may not be disposed, and the airflow may be circulated by the pressure difference between the exposure cooling airflow and the outside air.

In addition, the vertical direction of the unit and the component has been described according to the arrangement of each unit in the cross-sectional view of the image forming apparatus 100 illustrated in FIG. 2. However, a unit arrangement in which the photosensitive drum 2 is disposed above the intermediate transfer belt 9 and the exposure head 4 is further disposed above the photosensitive drum 2 as in an upper surface exposure method in which the photosensitive drum 2 is exposed from substantially above may be adopted. In this case, the up and down directions in the description of the embodiment are all reversed, and the duct unit 60 is configured to descend immediately before the assembling position.

In addition, although the guide portion 103 is a curved surface and the guided portion 208 is an inclined surface, the relationship may be reversed, or a combination of curved surfaces or inclined surfaces may be selected.

In the above-described embodiment, the configuration in which the harness opening portion 252 is provided on the drum unit 23 side has been exemplified, but the present invention is not limited thereto, and the harness opening portion may be provided on the developing unit 24 side. In this manner, by providing the harness opening portion 252 on the side of the developing unit 24 arranged in the vicinity of the exposure head, it is possible to prevent the influence on the airflow flowing along the drum unit 23.

In the above-described embodiment, the configuration in which the engagement claws 55*b* and 55*c* are provided in the housing support member 55 constituting the exposure head 4 has been exemplified, but the engagement claws may be provided in a component on the image forming apparatus 100 side. In this case, an L-shaped engagement claw may be provided in the elevating duct 69, and the engagement hole to be engaged with the engagement claw may be provided in the housing support member 55.

Further, in the above-described embodiment, the configuration in which the concave portion 55*f* is provided in the housing support member 55 constituting the exposure head 4 has been exemplified, but the concave portion may be provided in a component on the image forming apparatus 100 side. In this case, the concave portion may be provided in the elevating duct 69, and the convex portion engaged with the concave portion may be provided in the housing support member 55.

Further, in the above-described embodiment, the sliding operation for mounting the exposure head 4 is performed from the front side to the back side of the image forming apparatus 100, but may be configured to slide from the back side to the front side. In this case, the shapes of the engagement claws and the engagement holes may be reversed in the front-back direction.

In the above-described embodiment, the exposure head 4 is positioned in the axial direction of the photosensitive drum 2 and grounded by the positioning pin 45F on the front side, but may be positioned by the positioning pin 45B on the back side. Furthermore, in the earth connection, both the front and back positioning pins 45F and 45B may be used.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-037625, filed Mar. 10, 2022, which is hereby incorporated by reference herein in its entirety.

What is claimed is:

1. An image forming apparatus comprising:

a photoconductor configured to rotate about a rotation axis;

an exposure portion including a substrate that includes a plurality of light emitting portions to form a latent image by exposing surface of the photoconductor, and a support portion supporting the substrate, a developing unit to develop the latent image;

a door for accessing inside of the image forming apparatus by being opened; and a stay that moves in a direction parallel to the rotation axis, wherein the exposure portion being configured to move between an exposure position where the photoconductor is exposed and a first separating position shifted in a direction away from the photoconductor relative to the exposure position;

wherein the developing unit is movable between a developing position for developing the latent image and a second separating position separated from the photoconductor relative to the developing position, wherein the exposure portion moves from the exposure position to the first separating position in response to the door opening, wherein the developing unit moves from the developing position to the second separating position in response to the door opening, wherein the stay moves in response to the operation of the door, the exposure portion moves in response to the operation of the stay and the exposure portion moves between the exposure position and the first separating position in response to the movement of the stay.

2. The image forming apparatus according to claim 1, wherein the developing unit moves between the developing position and the second separating position in accordance with the movement of the stay.

3. The image forming apparatus according to claim 2, further comprising an arm that rotates about a pivot shaft extending along the direction of the rotation axis, wherein the developing unit moves between the developing position and the second separating position in accordance with the movement of the stay.

4. The image forming apparatus according to claim 1, further comprising a biasing member that biases the exposure portion toward the exposure position.

5. The image forming apparatus according to claim 1, wherein, when the door is open, an opening providing access to the inside of the image forming apparatus is revealed, and with the opening exposed, the photoconductor can be removed through the opening.

6. The image forming apparatus according to claim 1, wherein the plurality of light emitting portions is an organic electroluminescent (EL).

* * * * *